US010806997B2

(12) United States Patent
Winick

(10) Patent No.: US 10,806,997 B2
(45) Date of Patent: Oct. 20, 2020

(54) UNIVERSAL GAME CONTROLLER/CONSOLE

(71) Applicant: Tablet Console Games Inc., Toronto (CA)

(72) Inventor: Jayme Winick, Toronto (CA)

(73) Assignee: TABLET CONSOLE GAMES INC., Toronto, ON (CA)

( * ) Notice: Subject to any disclaimer, the term of this patent is extended or adjusted under 35 U.S.C. 154(b) by 200 days.

(21) Appl. No.: 16/120,143

(22) Filed: Aug. 31, 2018

(65) Prior Publication Data

US 2018/0369692 A1   Dec. 27, 2018

Related U.S. Application Data

(63) Continuation-in-part of application No. 15/910,467, filed on Mar. 2, 2018.

(Continued)

(51) Int. Cl.
*A63F 13/335*   (2014.01)
*A63F 13/235*   (2014.01)
(Continued)

(52) U.S. Cl.
CPC .......... *A63F 13/335* (2014.09); *A63F 13/235* (2014.09); *A63F 13/24* (2014.09);
(Continued)

(58) Field of Classification Search
CPC ...... A63F 13/335; A63F 13/235; A63F 13/24; A63F 2300/5526
See application file for complete search history.

(56) References Cited

U.S. PATENT DOCUMENTS 5,667,220 A * 9/1997 Cheng ............... A63F 13/06 273/148 B
6,512,511 B2 * 1/2003 Willner ............... A63F 13/06 345/169

(Continued)

FOREIGN PATENT DOCUMENTS

WO   2017039636 A1   3/2017

OTHER PUBLICATIONS

PCT Report on Patentability for prior application PCT/CA2018/000161, finding Claims 1-32 are novel which comply with PCT Article 33(2) and, involve an inventive step, which comply with PCT Article 33(3), and Claims 1-32, (same as current patent application claims).

(Continued)

*Primary Examiner* — Omkar A Deodhar
*Assistant Examiner* — Matthew D Hoel
(74) *Attorney, Agent, or Firm* — Venjuris PC

(57) ABSTRACT

An all-in-one mobile gaming console and controller and a method for providing such a gaming console/controller, to stream an online game, or download and run an offline game, and interface to any screen, such as mobile devices and tablets, are disclosed herein. A preferred embodiment of the all-in-one mobile gaming console/controller comprises two terminals to be coupled to the left and right edges of the screen and two or more computing architecture systems, such as ARM and x86, that can be switched and initializes by a scheduler based on the game to be rendered.

32 Claims, 49 Drawing Sheets

Related U.S. Application Data

(60) Provisional application No. 62/466,193, filed on Mar. 2, 2017.

(51) Int. Cl.
| | |
|---|---|
| *G06F 9/4401* | (2018.01) |
| *A63F 13/24* | (2014.01) |
| *G06F 9/455* | (2018.01) |
| *G06F 8/30* | (2018.01) |
| *H02J 7/34* | (2006.01) |
| *H02J 7/00* | (2006.01) |

(52) U.S. Cl.
CPC ............... *G06F 8/30* (2013.01); *G06F 9/441* (2013.01); *G06F 9/45508* (2013.01); *H02J 7/342* (2020.01); *A63F 2300/5526* (2013.01); *H02J 7/00* (2013.01)

(56) References Cited

U.S. PATENT DOCUMENTS

| | | | |
|---|---|---|---|
| 6,530,838 B2* | 3/2003 | Ha | A63F 13/06 |
| | | | 463/36 |
| 7,733,637 B1* | 6/2010 | Lam | G06F 1/1626 |
| | | | 361/679.08 |
| 7,833,097 B1* | 11/2010 | Maddox | A63F 13/23 |
| | | | 455/556.1 |
| 9,005,025 B2 | 4/2015 | Joynes et al. | |
| 9,005,026 B2 | 4/2015 | Joynes et al. | |
| 9,126,119 B2 | 9/2015 | Joynes et al. | |
| 9,216,349 B2 | 12/2015 | South | |
| 9,407,100 B2 | 8/2016 | Joynes et al. | |
| 9,757,647 B2* | 9/2017 | Fujita | A63F 13/21 |
| 10,258,879 B2* | 4/2019 | Iwao | A63F 13/98 |
| 10,328,350 B2* | 6/2019 | Furuike | A63F 13/98 |
| 10,583,356 B2* | 3/2020 | Koizumi | G06F 3/02 |
| 10,596,454 B2* | 3/2020 | Ikuta | A63F 13/24 |
| 10,610,776 B2* | 4/2020 | Iwao | A63F 13/92 |
| 10,661,160 B2* | 5/2020 | Fujita | A63F 13/213 |
| 2001/0045938 A1* | 11/2001 | Willner | A63F 13/06 |
| | | | 345/156 |
| 2002/0145590 A1* | 10/2002 | Paolucci | G06F 1/1626 |
| | | | 345/156 |
| 2003/0109314 A1* | 6/2003 | Ku | A63F 13/98 |
| | | | 463/47 |
| 2004/0082361 A1 | 4/2004 | Rajagopalan | |
| 2006/0237209 A1* | 10/2006 | Horinouchi | G06F 1/1686 |
| | | | 174/50 |
| 2006/0279039 A1* | 12/2006 | Krieger | A63F 13/54 |
| | | | 273/148 B |
| 2007/0045392 A1* | 3/2007 | Youens | G06F 3/021 |
| | | | 235/145 R |
| 2007/0293318 A1* | 12/2007 | Tetterington | A63F 13/06 |
| | | | 463/37 |
| 2008/0002350 A1* | 1/2008 | Farrugia | G06F 1/1632 |
| | | | 361/679.43 |
| 2008/0153593 A1* | 6/2008 | Ikeda | A63F 1/1626 |
| | | | 361/679.08 |
| 2012/0058821 A1* | 3/2012 | Lan | A63F 13/92 |
| | | | 463/30 |
| 2012/0088582 A1* | 4/2012 | Wu | A63F 13/211 |
| | | | 463/37 |
| 2012/0113034 A1* | 5/2012 | McDermid | G06F 1/1632 |
| | | | 345/173 |
| 2013/0267322 A1 | 10/2013 | South | |
| 2014/0206451 A1* | 7/2014 | Helmes | A63F 13/24 |
| | | | 463/39 |
| 2014/0274394 A1* | 9/2014 | Willis | G06F 3/0338 |
| | | | 463/37 |
| 2014/0302920 A1 | 10/2014 | Beckett | |
| 2015/0018101 A1* | 1/2015 | Schoenith | A63F 13/98 |
| | | | 463/37 |
| 2015/0084900 A1* | 3/2015 | Hodges | G06F 1/1632 |
| | | | 345/173 |
| 2015/0281422 A1* | 10/2015 | Kessler | H04M 11/007 |
| | | | 455/557 |
| 2016/0361632 A1* | 12/2016 | Fujita | A63F 13/98 |
| 2016/0361633 A1* | 12/2016 | Fujita | A63F 13/98 |
| 2016/0361640 A1* | 12/2016 | Iwao | A63F 13/98 |
| 2016/0361641 A1* | 12/2016 | Koizumi | A63F 13/23 |
| 2017/0052750 A1* | 2/2017 | Koizumi | G06F 3/0346 |
| 2018/0117460 A1 | 5/2018 | Townley et al. | |
| 2018/0369692 A1* | 12/2018 | Winick | G06F 9/45508 |

OTHER PUBLICATIONS

Klosowski, Thorin, "How to Build a Raspberry Pi Retro Game Console". Website: Lifehacker.com Sep. 2, 2017 (Feb. 9, 2017) [online] https://lifehacker.com/how-to-turn-your-raspberry-pi-into-a-retro-game-console-498561192 [See whole document].

\* cited by examiner

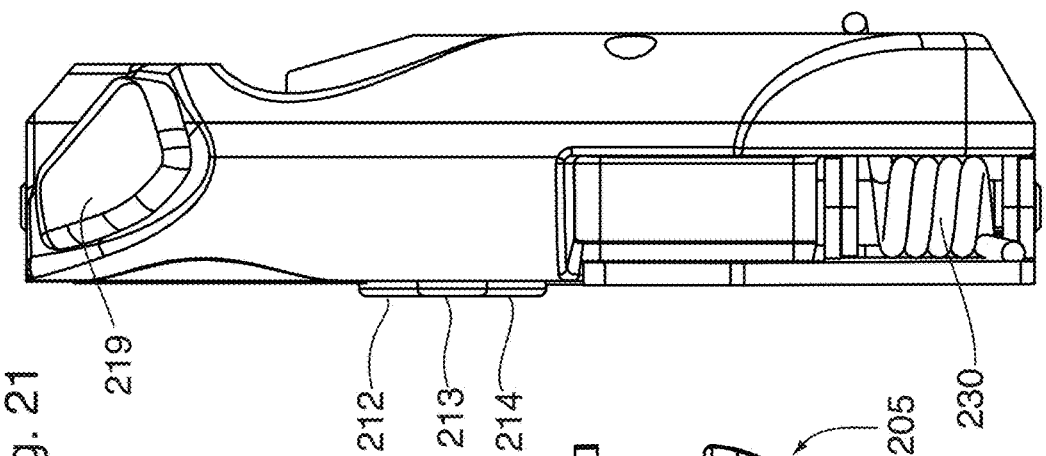
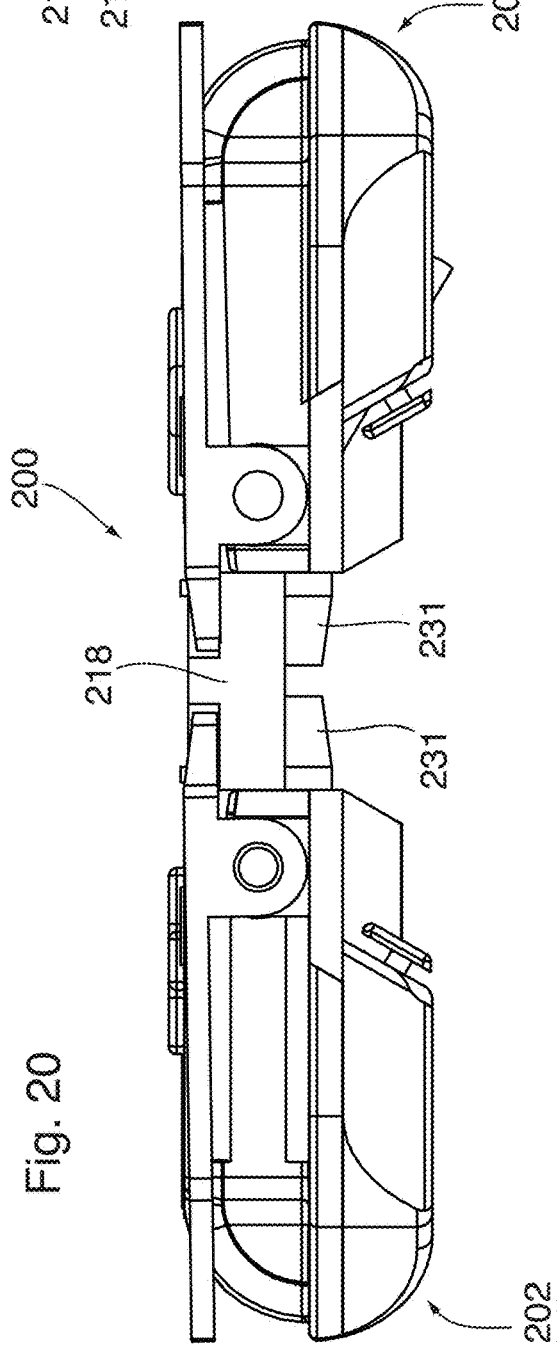

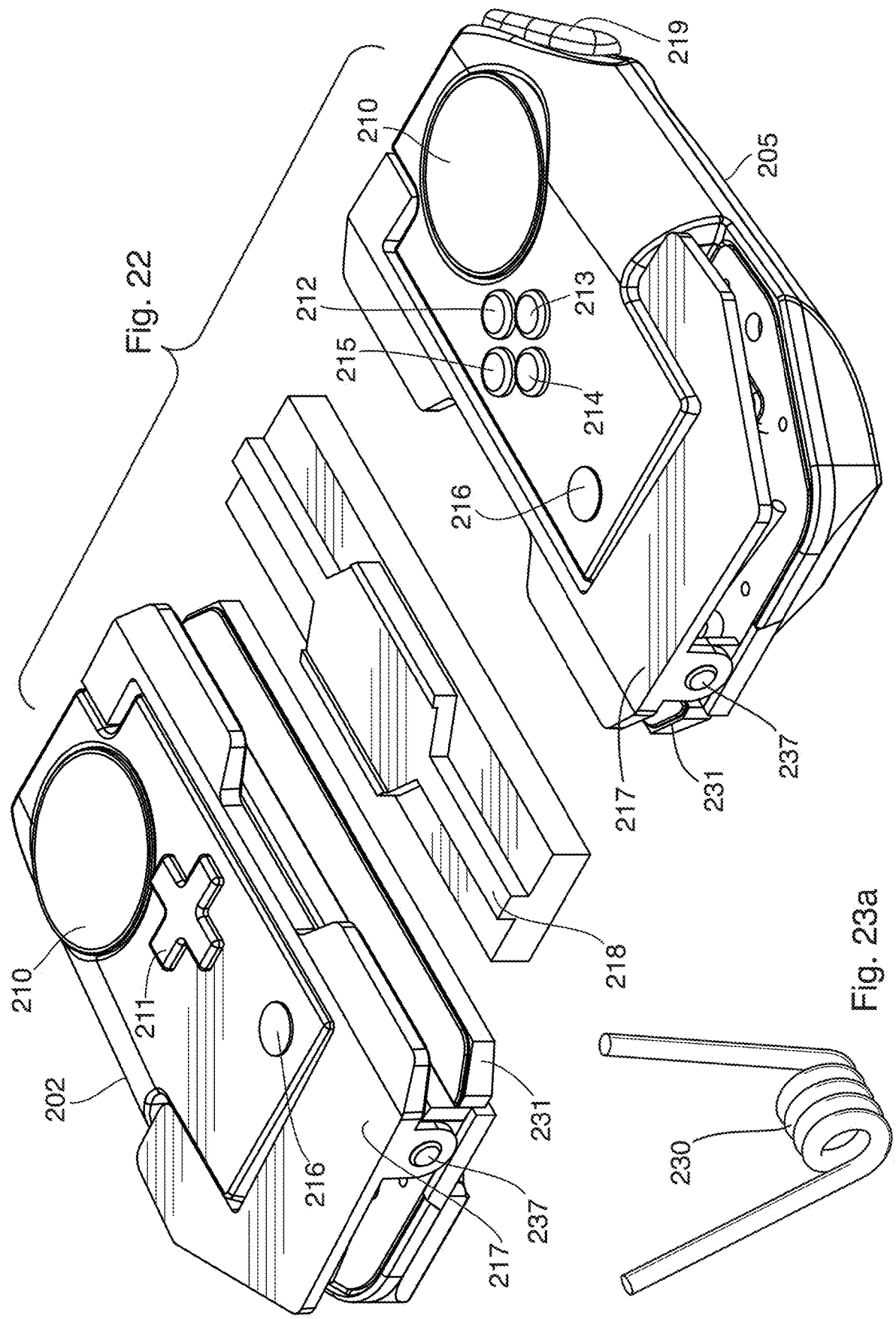

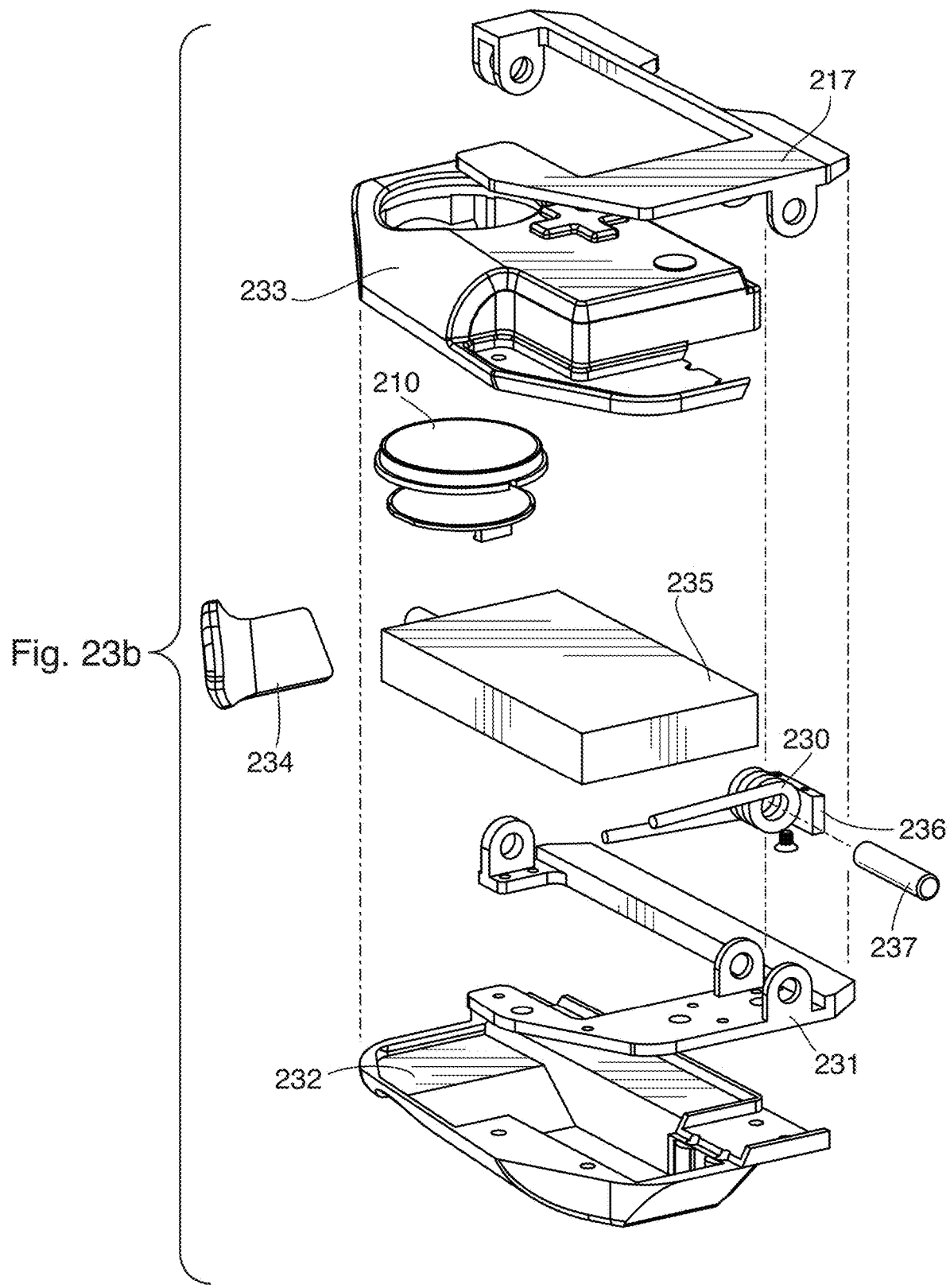

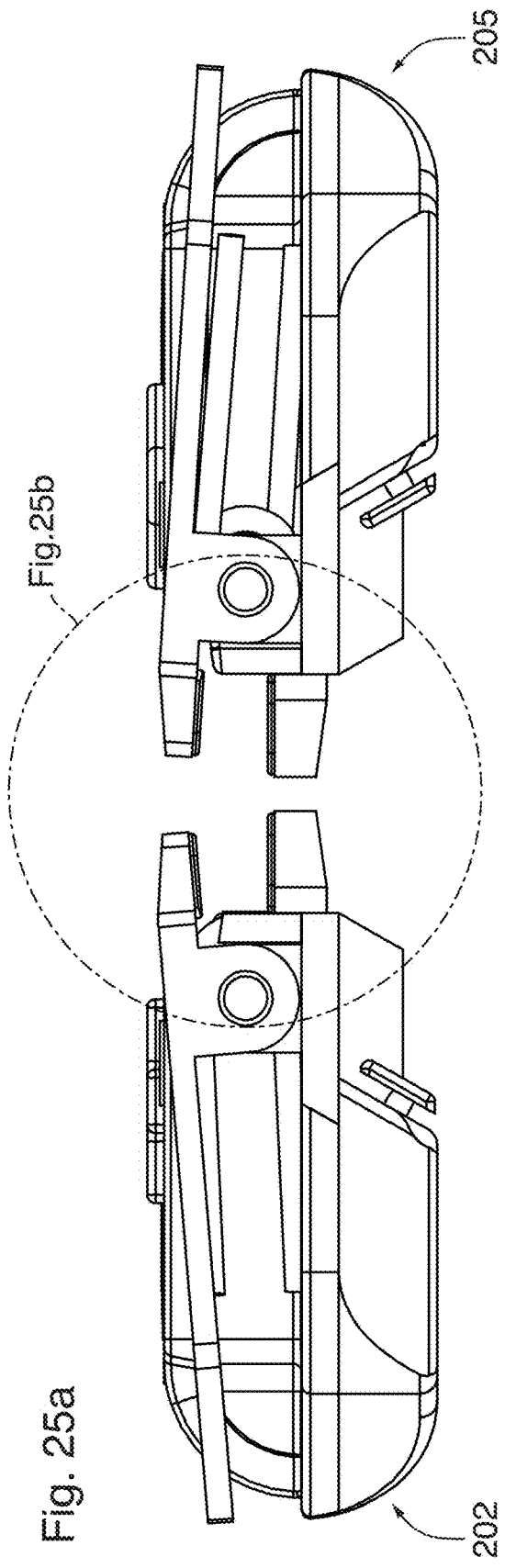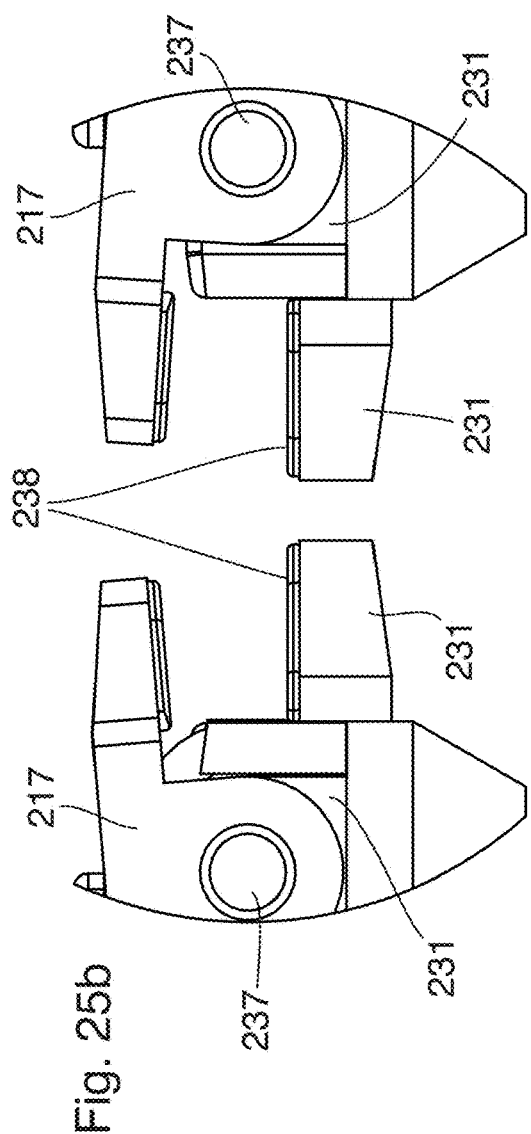

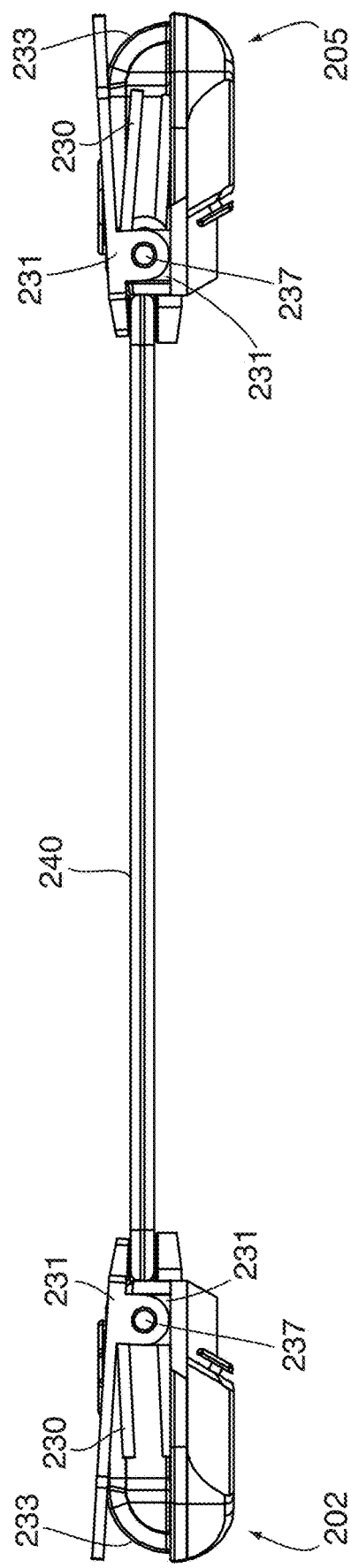

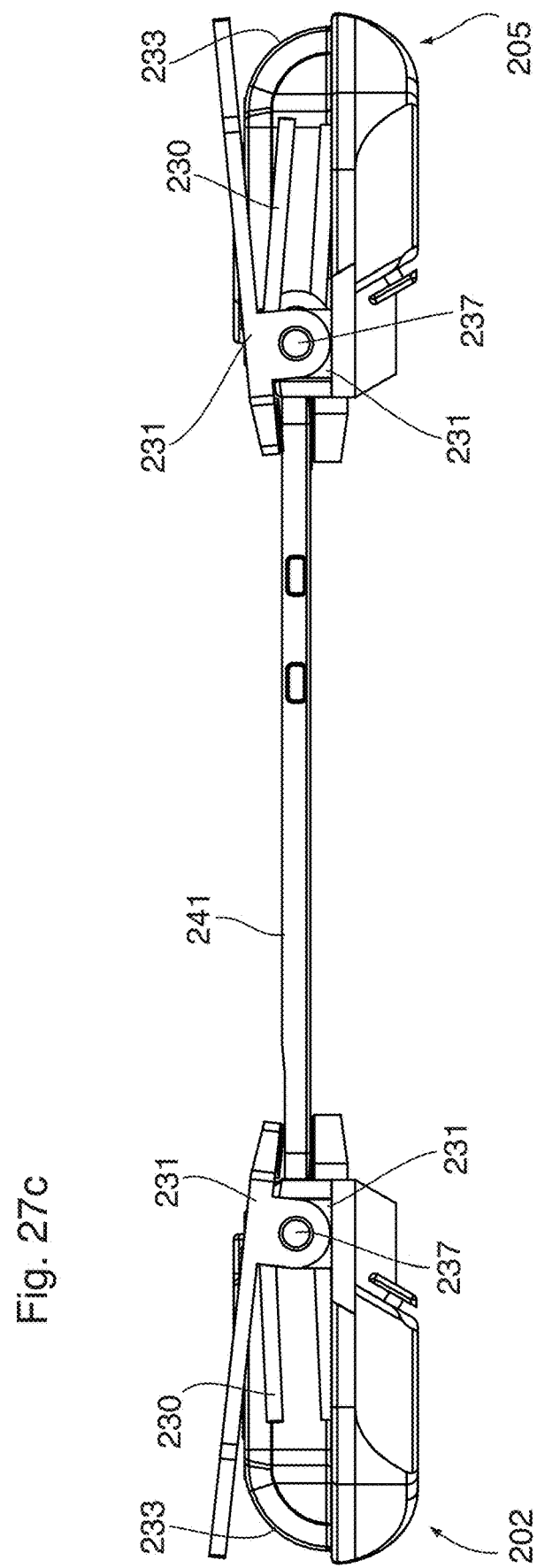

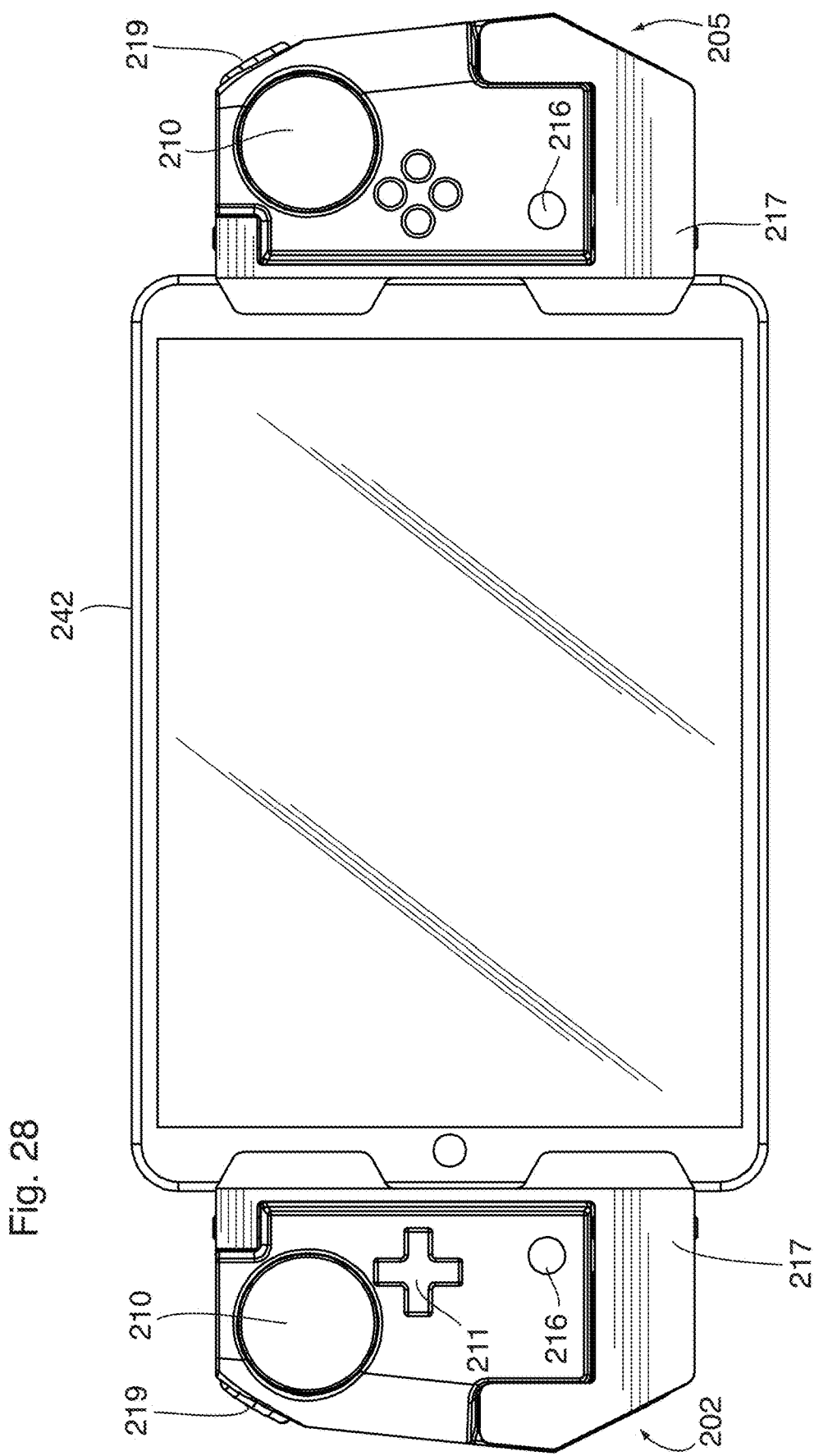

Hardware Instruction Set Architecture Block Diagram

Memory and Battery Controller

Side A and Side B Hardware Wi-Fi Connectivity

LED Signals

Firmware Scheduler

Software Services

Server Application

API Service Core Components

Service Core

Streaming Engine

Streaming Connectivity – Mode 1

Streaming Connectivity – Mode 2

Download and Offline Connectivity

Core Architecture

Core Streaming

Game Rendering and Game Processing

Http Live Streaming Engine

UNIVERSAL GAME CONTROLLER/CONSOLE

FIELD OF THE INVENTION

The present invention relates to game controllers and consoles and more specifically to a game console that is also a controller and operates with various portable devices.

BACKGROUND OF THE INVENTION

Game controllers and game consoles are unique to the individual game developer and not interchangeable with systems from other game developers.

There are game controllers capable of accommodating an information processing device therein. U.S. Pat. No. 9,126,119 discloses a controller capable of accommodating a mobile telephone, with a left key plate and a right key plate sandwiching the mobile telephone there between. The controller can communicate with the mobile telephone by connecting the connection terminal of the controller to the mobile telephone. The controller, as currently marketed, is compatible with various models of smartphones as well as numerous mobile apps. The controller does not, however, work with existing video game consoles or with its associated games.

U.S. Pat. No. 9,757,647 discloses the primary controllers of a video game console. In particular, the controllers consist of two individual units that can be used while attached to the main console unit, or detached and used wirelessly. Like other game controllers and game consoles, these controllers are unique to the individual game developer and not interchangeable with systems from other game developers.

Both the controllers of U.S. Pat. Nos. 9,126,119 and 9,757,647 are controller systems with parts that attach to two sides of an electronic device, such as a smartphone or tablet, that fit into a user's hands and have gaming controls. Neither of those controllers are a combined controller and console system, nor are they a universally usable system.

SUMMARY OF THE INVENTION

The present invention is incorporated in a game console which is both a console and controller.

The game console comprises a left controller/console and a right controller/console.

The left controller/console and right controller/console each have a clamping mechanism for attachment to a display screen.

The present invention is also incorporated in a game console in which a left controller/console and right controller/console together act as a controller for use with a separate display screen.

The game console of the present invention is comprised of a pair of game consoles for use in holding any portable device with a display screen between the pair of game consoles.

The display screen may be a tablet computer or mobile phone.

The left and right controller/consoles of a game console of the present invention are sized to fit in the palm of a left hand and right hand; are slimmer at the midpoint, and additionally comprise play buttons from about the midpoint angling slightly outward to glide pad buttons.

The sealable glide pad has precise positioning ability, does not have any moving parts and does not require contact pressure.

The left controller/console is chargeable and capable of charging the right controller/console.

In an embodiment of the invention, the left controller/console comprises two tabs with metal contacts which fit into two receiving ports on the right controller/console for receiving charging.

An embodiment of the invention may also be a handheld game console that comprises a computing module, an input module, a communication module, and a housing. An exemplary computing module of this embodiment may include one or more processors and at least one non-transitory storage for storing computer instructions to be executed by the processors. The computer instructions for this embodiment may include at least those for streaming a game from a remote server, rendering the game to a display device, and downloading offline games, and may further include those for upgrading firmware of this embodiment, authenticating user with the remote server, rendering user interfaces for game selection, user account management, and/or service subscription, and so forth. The display device may be a tablet, a mobile phone, or any portable devices with screens.

The input module of this embodiment is configured to receive the user's one or more gaming commands. In this embodiment, a gaming command may be as simple as pushing a button on the input module or a full rotation of a directional glide pad on the input module, or it may include a combination of inputs from different components on the input module, such as holding two buttons at the same time.

In this embodiment, the communication module is configured to communicate with the remote server and the display device, preferably wirelessly, by Wi-Fi, Bluetooth, or any suitable wireless protocols known in the art. The communications between the embodiment and the remote server and/or the display devices may include exchanging commands to establish the communication network(s), streaming game data, downloading software/firmware for upgrading the embodiment, and so forth.

Furthermore, in this embodiment, the housing is configured to be held by a user's hands, preferably ergonomic to fit into the user's palms. The components of the input module are also preferably arranged with improved ergonomics.

Additionally, this embodiment may include two, or more, separate terminals (e.g., left and right controller/consoles)—a first terminal and a second terminal, and the aforementioned elements all include sub-elements located in the first and second terminals respectively. That is, each terminal of this embodiment has its own computing sub-module, input submodule, communication submodule, and sub-housing. These sub-elements in this embodiment are configured to work together, coordinated by the computing submodule in the first terminal.

In this embodiment, the first terminal and second terminal may each further comprise a clamping mechanism configured to couple to the display device, and the clamping mechanism preferably can be locked/unlocked to prevent it from inadvertently opening. An exemplary clamping mechanism comprises a top hinge and a bottom hinge configured to clamp onto an edge (preferably the left or right edge) of the display device and a stiff torsion spring that is located between the hinges and configured to apply a clamping force. An exemplary locking mechanism for this exemplary clamping mechanism may be a pin, a peg, or any similar structure that can slide in/out to prevent/allow the clamping mechanism to open. It is preferred that the inner edges of the top and bottom hinges of this exemplary clamping mechanism are properly configured that they obscure little, if not none, screen/camera space of the display device, that they do not block any buttons of the display device, and that they do not damage the display device.

Moreover, the first terminal and second terminal of this embodiment preferably each further comprises a rechargeable battery. In this embodiment, the batteries may be charged by an adapter connected to a power outlet or a charging battery (e.g., a separate battery of an embodiment or an external power bank). An exemplary embodiment may comprise a charging battery configured to charge one or both of the batteries of the first and second terminals, and the charging battery is preferably configured to be located/clamped between the terminals when charging the terminals. For such an embodiment, any suitable connectors may be adopted to electronically connect the charging battery and a terminal. For instance, the first and second terminals of this embodiment may each comprise a male connector to be received by a corresponding female connector of the charging battery, such as two tabs with metal contacts to fit into two receiving ports, and vice versa.

In an embodiment with a charging battery, the charging battery is configured to charge the terminals, and it may further be configured to charge an external device, such as the display device. In addition to input components provided above, such as buttons and glide pad, an alternate embodiment may further comprise other types of input/output components such as a switch, a joystick, a speaker, an audio jack, a microphone, an accelerometer, a vibration motor, and so forth.

An embodiment is preferably further configured to support various games, even those on different platforms and architectures. For instance, in addition to the features stated above, a preferred embodiment is configured to render games written in different gaming languages, such as OpenGL, Vulkan, DirectX, ARM, Unity, and Unreal, for different architectures, such as ARM and x86. This preferred embodiment comprises two or more computing architecture systems and an automatic scheduler. The multiple computing architecture systems each include its own processor configured to execute computer instructions defined in that computing architecture (e.g. an ARM processor is configured to execute RISC instructions). The scheduler of this embodiment comprises a processor that executes software/firmware to: identify a computing architecture and a game engine corresponding to the game; initialize one of the computing architecture systems corresponding to the identified computing architecture; and load an operating system with the game engine to be executed on the one of the computing architecture systems. Depending on the implementation, the multiple computing architecture systems and the scheduler of this embodiment may be located in one terminal only (e.g., the first terminal) so that the other terminal (e.g., the second terminal) only processes user inputs. Alternatively, some computing architecture system(s) may be the placed in one terminal while the other(s) located in the other terminal, etc.

A preferred embodiment of this invention is a universal game console/controller that comprises two handheld terminals—the first terminal and the second terminal. In this preferred embodiment, the first terminal comprises a plurality of computing architecture systems (e.g., ARM and x86) and an automatic scheduler, as in the embodiments discussed above, and is configured to:
1. receive user inputs;
2. wirelessly communicate with the remote server and the display device;
3. stream/download game data from the remote server;
4. render the game data, while incorporating the gaming commands based on the user inputs, on the specific computing architecture system with the proper operating system and game engine, identified based on the game selected; and
5. broadcast/stream the game data to the display device.

Additionally, the first terminal of this embodiment may be further configured to:
1. render user interfaces for the user to manage his/her account with the remote server, pay a subscription fee, browse or search games available for streaming/downloading, and so forth; and
2. download and upgrade computer-readable instructions in its non-transitory storage(s), including the firmware, software, and/or the operating system(s) with game engines.

The second terminal of this embodiment, on the other hand, is only configured to receive user commands and wirelessly communicate with the first terminal by sending the user inputs received for the first terminal to render gaming commands based on the user inputs. The first and second terminals of this embodiment are ergonomic and configured to couple to the display device on two opposite edges (e.g., preferably left and right, if the display device is a mobile device). The first and second terminals of this preferred embodiment may also each comprise the other components discussed above, such as clamping mechanisms with locking mechanisms, various input/output components (buttons, glide pads, joysticks, speakers, accelerometers, audio jacks, and so forth), and so on.

An embodiment of this invention may be a method for supporting video games of various platforms. This embodiment preferably comprises the steps of:
1. providing a plurality of computing architecture systems, each of computing architecture systems being configured to execute computer instructions defined in a corresponding computing architecture;
2. when a user command selecting a game to be rendered is received, identifying a computing architecture and a game engine corresponding to the game;
3. initializing an identified computing architecture system corresponding to the computing architecture, among the computing architecture systems;
4. loading an operating system with the game engine to be executed on the identified computing architecture system;
5. progressively downloading the game from a streaming server into the identified computing architecture system;
6. reconstructing game data of the game; and
7. live streaming the reconstructed game data to a display device.

Such an embodiment may further comprise the step of providing a first terminal and a second terminal, each configured to:
a. execute one or more computer-readable instructions of the game,
b. receive a user's one or more inputs,
c. communicate with the streaming server, the display device, and each other, and
d. be held by a user's hand.

For this embodiment with two, or more, terminals, it may further comprise the steps of: combining the one or more user inputs received by the first and second terminals into one or more gaming commands; and rendering the one or more gaming commands into the reconstructed game data to be live streamed to the display device.

An object of this invention is to provide a game console that may work as a console and controller at the same time.

Another object of this invention is to provide a game console that supports games developed for different game engines and computer architectures.

BRIEF DESCRIPTION OF THE FIGURES

These and other aspects of the present invention will be apparent from the brief description of the drawings and the following detailed description in which:

FIG. 20 is a bottom view of the Universal Game Controller/Console of FIG. 17;

FIG. 21 is a left-side view of the Universal Game Controller/Console of FIG. 17;

FIG. 22 is a perspective view of a Universal Game Controller/Console of FIG. 17 separated from the battery;

FIG. 23a is a spring from either the left controller/console or right controller/console of the Universal Game Controller/Console of FIG. 17

FIG. 23b is an exploded view of a right side of the Universal Game Controller/Console of FIG. 17;

FIG. 25a is a bottom view of the Universal Game Controller/Console of FIG. 24;

FIG. 25b is a magnified view of the clamping mechanism of the Universal Game Controller/Console of FIG. 25a;

FIG. 26c is a bottom view of the Universal Controller/Console of FIG. 24 clamped around a mini tablet;

FIG. 27c is a bottom view of the Universal Controller/Console of FIG. 24 clamped on a mobile phone;

FIG. 28 is the Universal Game Controller/Console of FIG. 24 clamped on a tablet;

DETAILED DESCRIPTION OF THE EMBODIMENTS

Figure 1:
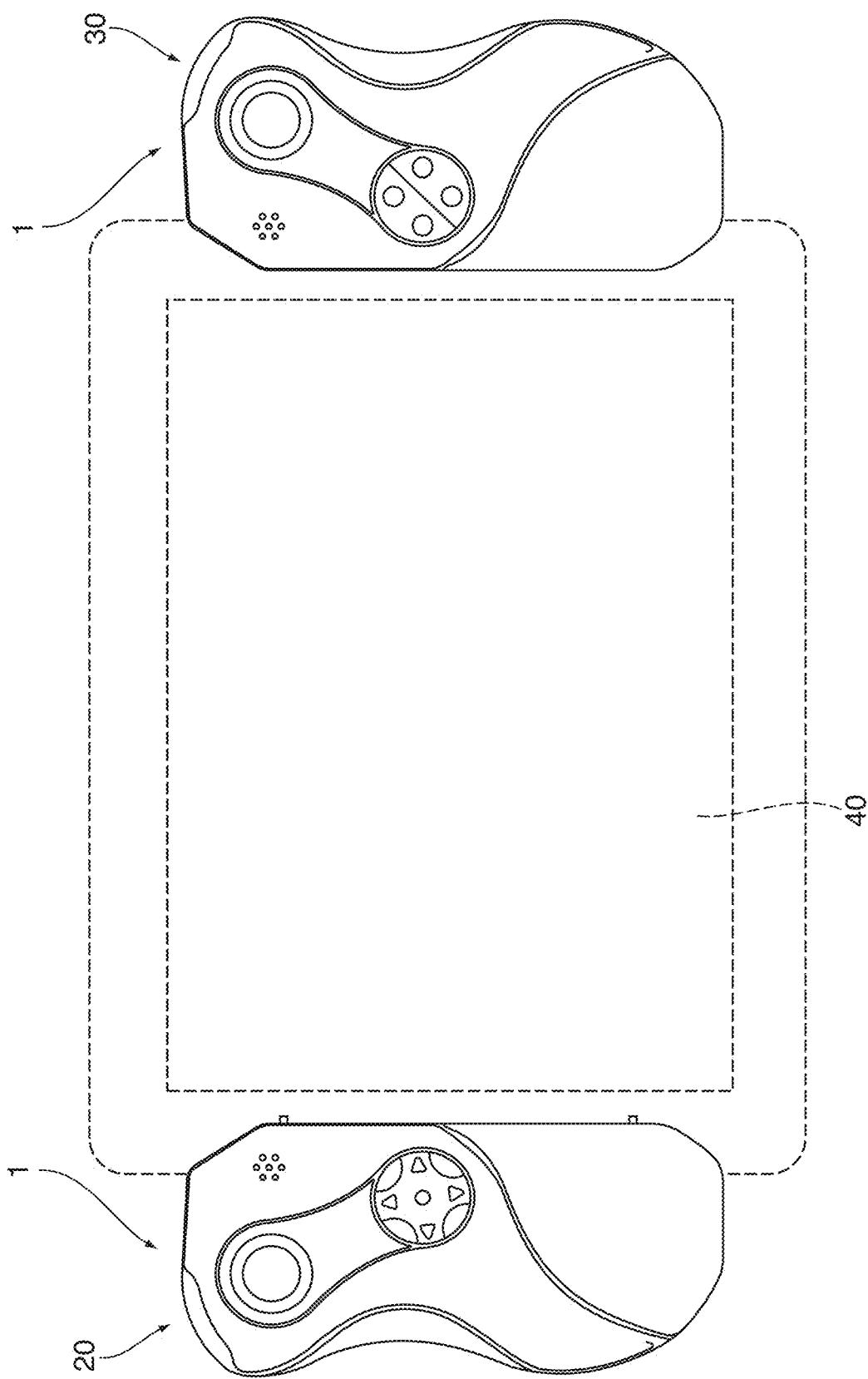
FIG. 1 is a front view of a Universal Game Controller/Console of the present invention, shown in a first position with a portable device.

As shown in FIGS. 1-8, a preferred embodiment, the Universal Game Controller/Console 1, of the present invention is an all-in-one mobile gaming console and controller which utilizes any screen and is capable of playing any game. The Universal Game Controller/Console 1 is comprised of a left controller/console 20 and right controller/console 30 capable of clamping onto any screen 40, e.g. smart phone or electronic tablet. As shown in FIG. 1, the Universal Game Controller/Console 1 clamps onto any mobile or tablet 40 and is screen docked to the mobile or tablet device and interacts through wireless technology.

Figure 2:
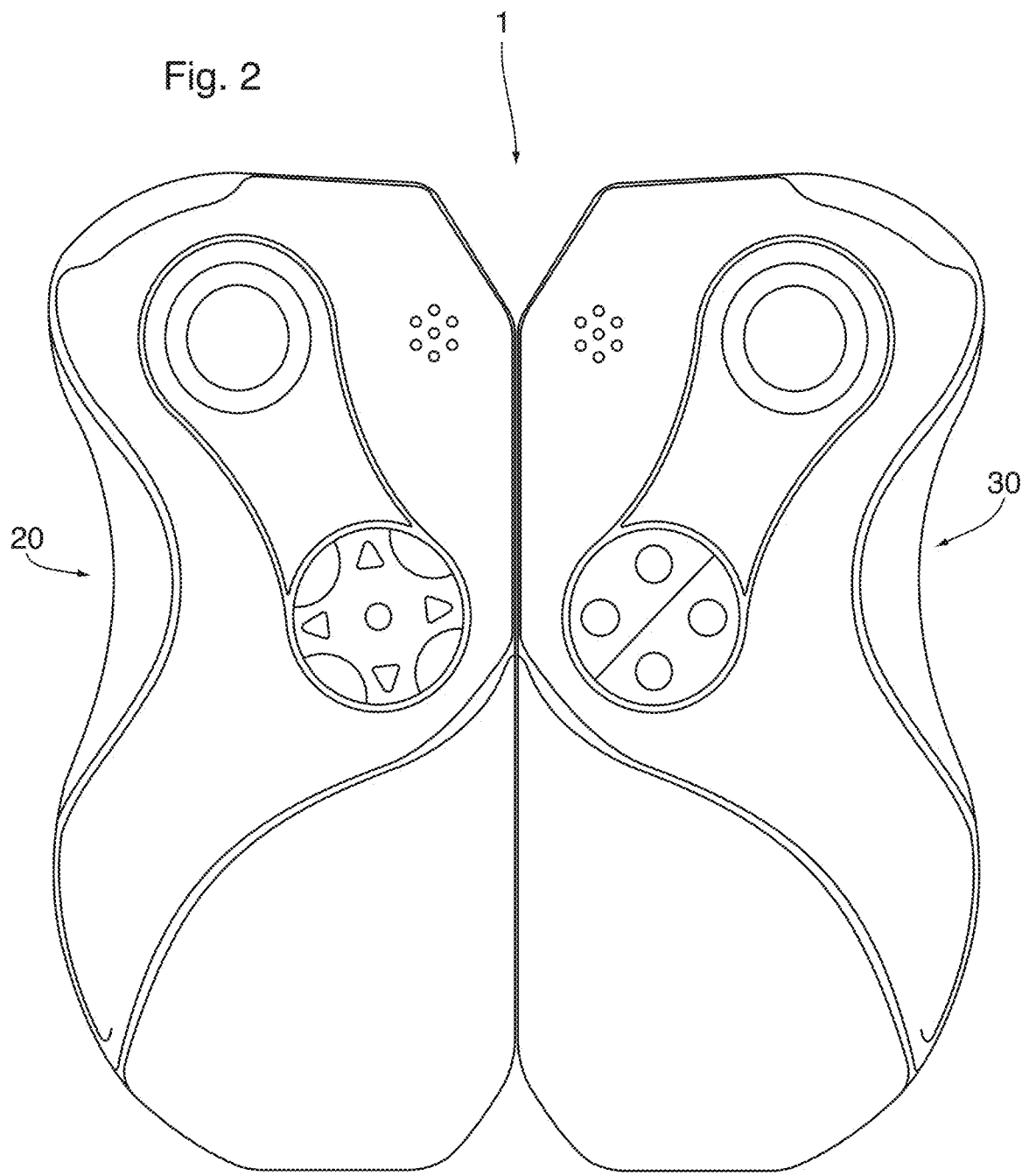
FIG. 2 is a front view of a Universal Game Controller/Console of the present invention in a second position.

As shown in FIG. 2, the Universal Game Controller/Console 1 is operational for gaming when the left controller/console 20 and right controller/console 30 are joined together and in this case utilizes an independent screen e.g. computer monitor or television screen.

The Universal Game Controller/Console of the present invention does not have a display, but the gamer connects with any smart phone or smart TV through an App.

Figure 3:
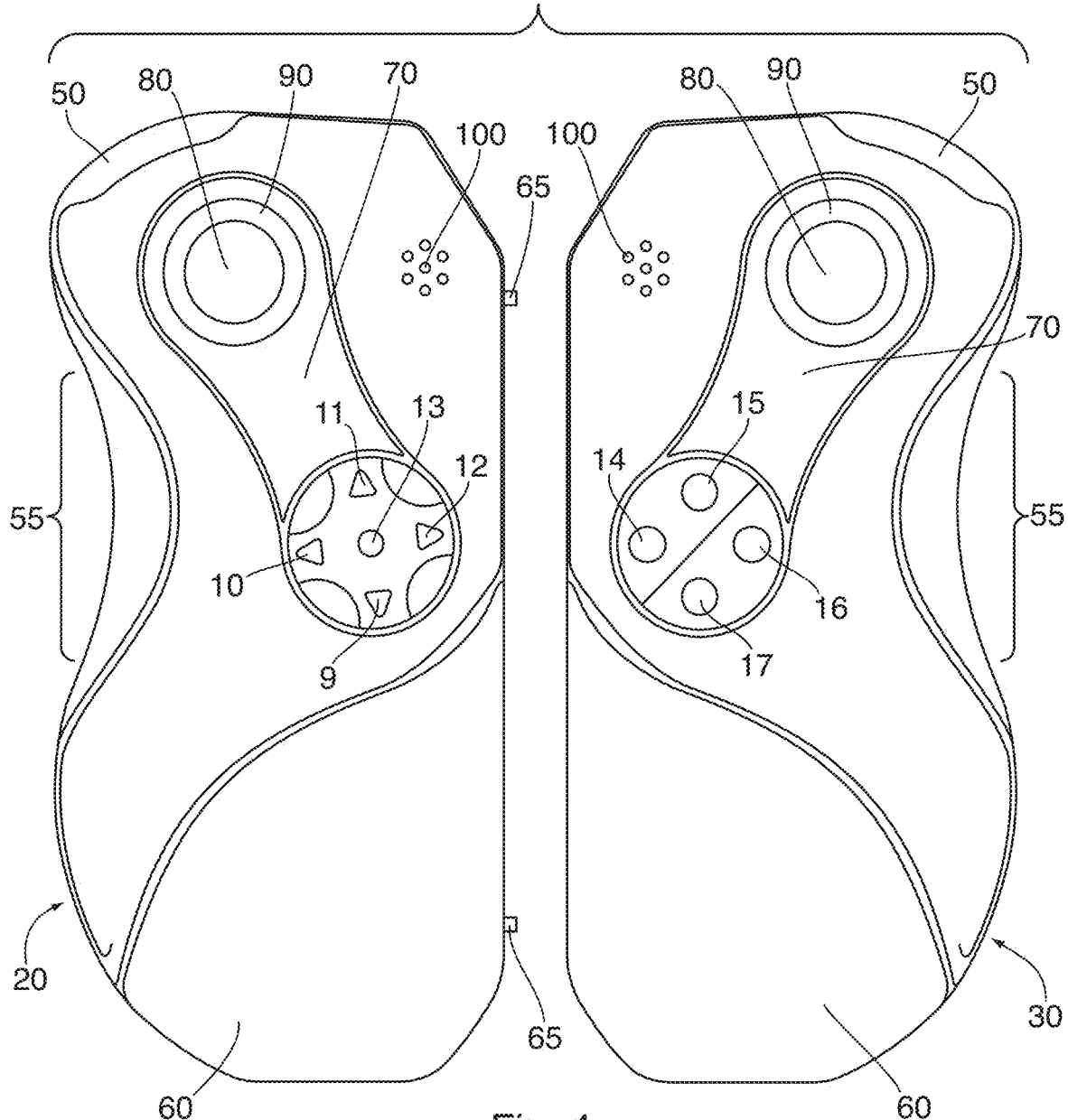
FIG. 3 is a front view of a Universal Game Controller/Console of the present invention in a third position.

The Universal Game Controller/Console 1 comprising left controller/console 20 and right controller/console 30 is shown at rest in FIG. 3. The game control platform 70 on the left and right controller/console 20, 30 both have a trigger button 50, a glide pad 70 surrounded with LED light 90, palm grip 60 and ergonomic curve 55. The left controller/console 20 additionally comprises a D-pad 13 with four directional buttons, namely, down directional button 9, left arrow directional button 10, up directional button 11 and right directional button 12, and further comprises two contacts 65 which may be made of a copper alloy. The right controller/console 30 additionally comprises an X play button 14, Y play button 15, A play button 16 and B play button 17, and further two receiving ports (not shown) for receiving the contacts 65.

The Universal Game Controller/Console 1 is ergonomically designed for user comfort.

Figure 4:
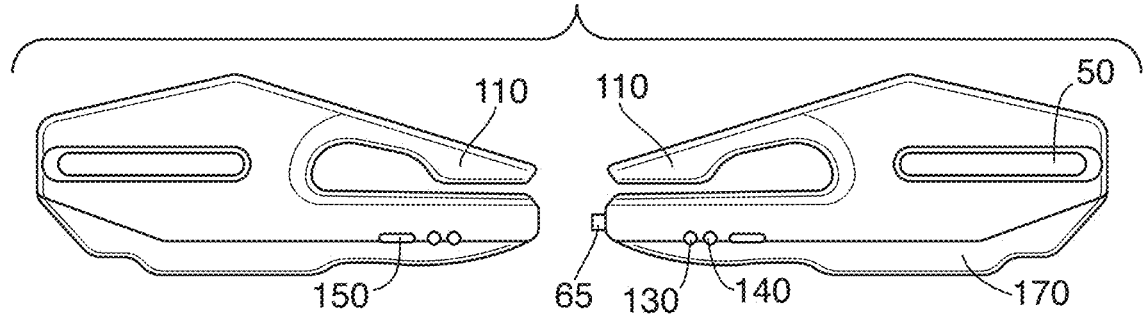
FIG. 4 is a top view of the Universal Game Controller/Console in FIG. 3.

As seen in FIG. 4, the left and right controller/console 20,30 both have a power indicator LED light 150 to indicate that the power is on, a Bluetooth® indicator LED light 130 to indicate if Bluetooth® is active and a Wi-Fi indicator LED light 140 to indicate if Wi-Fi is active.

Figure 5:
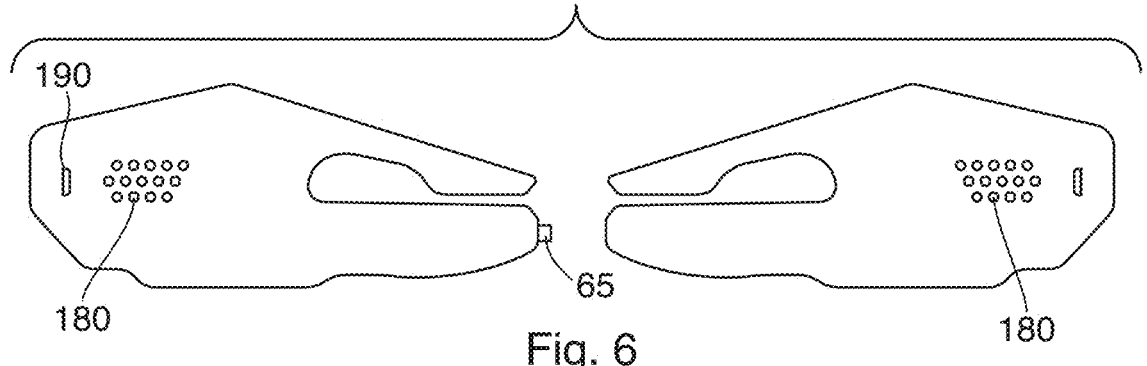
FIG. 5 is a bottom view of the Universal Game Controller/Console in FIG. 3.
Figure 6:
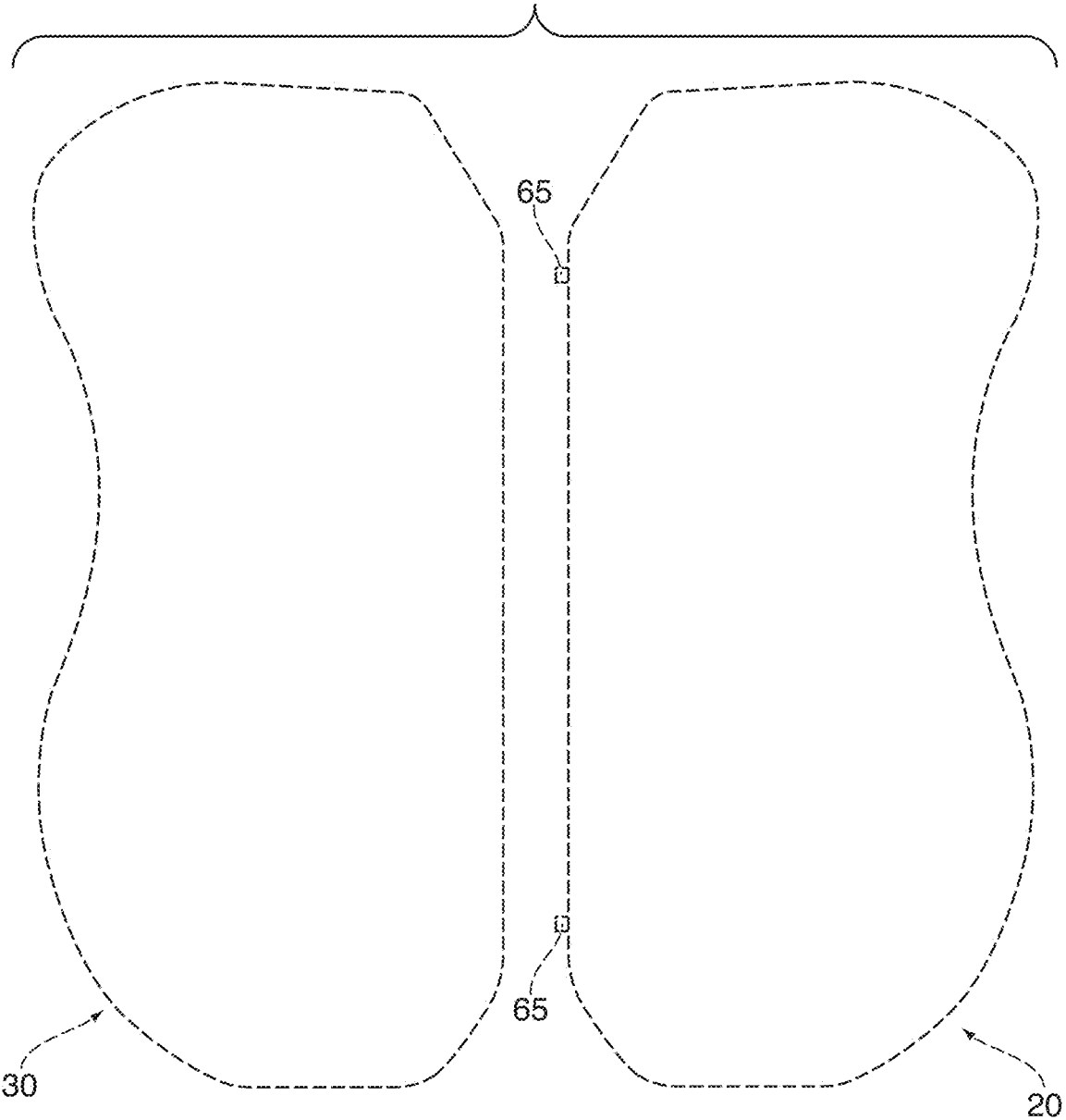
FIG. 6 is a back view of the Universal Game Controller/Console in FIG. 3.
Figure 7:
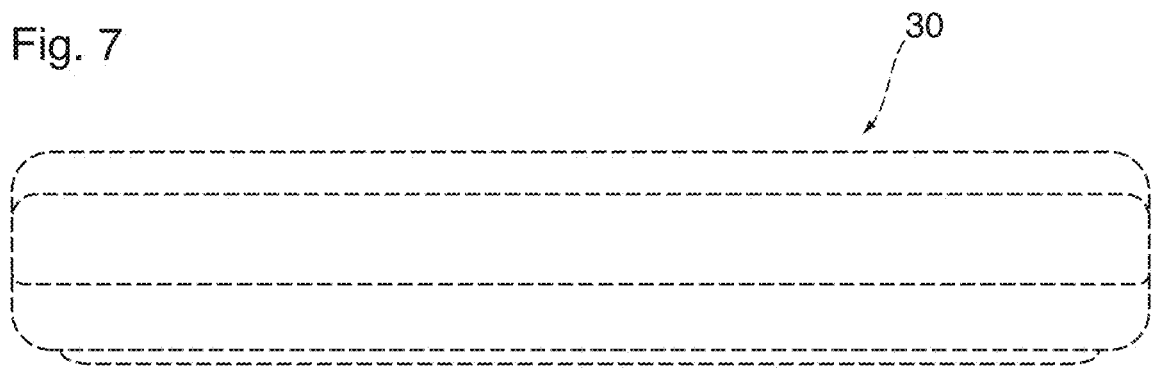
FIG. 7 is a left side view of the Universal Game Controller/Console in FIG. 3.
Figure 8:
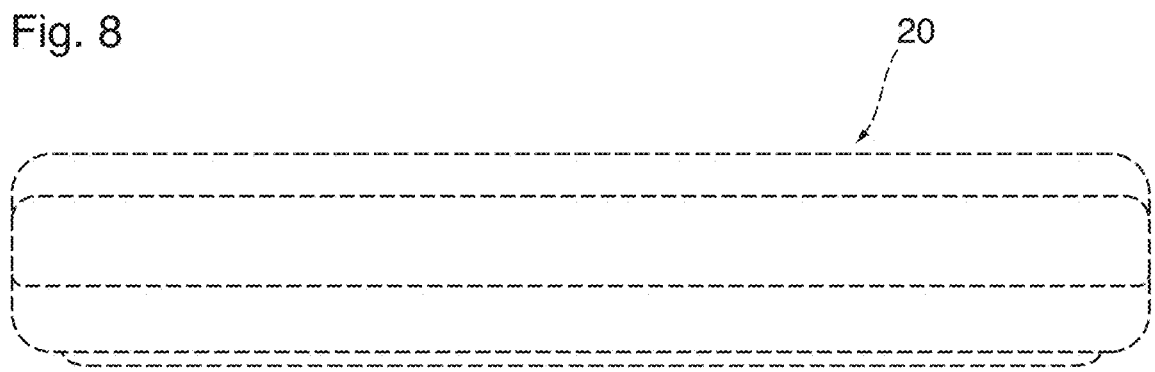
FIG. 8 is a right side view of the Universal Game Controller/Console in FIG. 3.

As shown in FIG. 5, the left and right controller/console 20, 30 both have a USB port 190 and heat vents 180. However, the USB port may only be on the left controller/console 20.

The Universal Game Controller/Console 10 is easily attached to any mobile or tablet via the universal clamping mechanism 110.

When the left and right controller/console 20, 30 halves are together the console is in one piece, the two contacts 65 are connected with the two receiving ports (not shown) and the charge gets transferred from one side to the other. As such it is only needed to have one micro USB slot on one side of the console for charging since the other side is charged through the contacts when inserted into the ports. USB connectivity charges the device as well as transferring data to a secondary memory for the user of the Universal Game Controller/Console. An audio jack (not shown) provides stereo audio through headphones.

The buttons on Universal Game Controller/Console can be classified into two parts depending on the usage and functionality. One set of buttons is used for gaming and the other for configuring functionality and connecting the Universal Game Controller/Console to a mobile or tablet. Universal Game Controller/Console connects with any screen through wireless mode.

Figure 9:
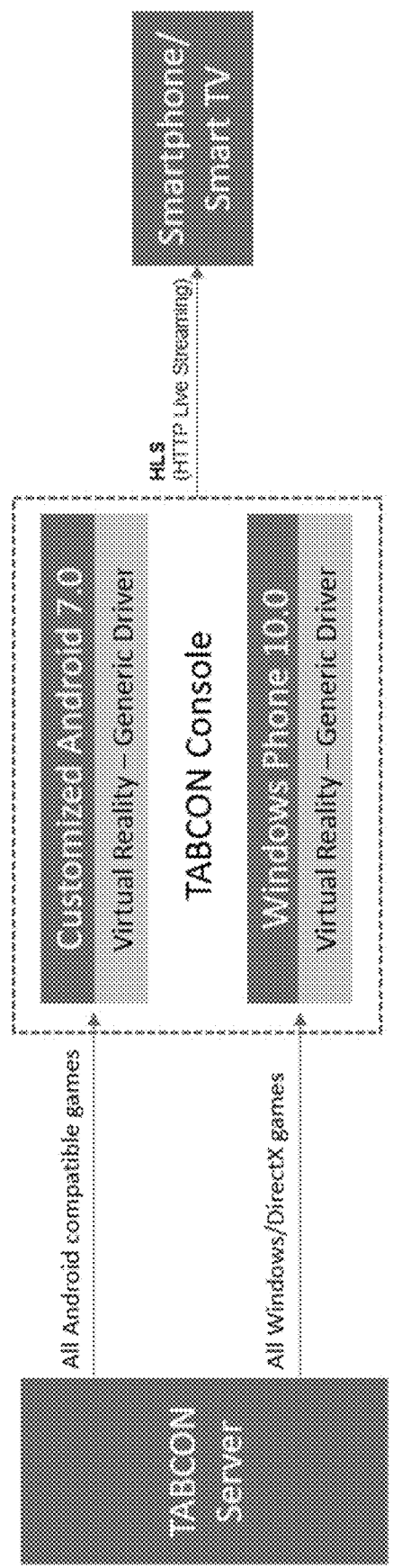
FIG. 9 is a display broadcasting flow chart.

FIG. 9 shows the use of the Universal Game Controller/Console ("TABCON™ Console") wherein a TABCON™ Server delivers Android® compatible or Windows/DirectX® games to the Universal Game Controller/Console for game user's play which is transmitted wirelessly to and viewed on a smartphone (held by the controller/consoles) or smart TV (separate from the controller/consoles). TABCON is a trademark used in association with the Universal Game Controller/Console as well as parts and systems of the present invention.

LEDs

The purpose of the LEDs in the Universal Game Controller/Console is to give visual indications to the user on the status of the device from switching on, Bluetooth status, pairing, Wi-Fi connection, connectivity issues and so on In an embodiment of the invention, the left controller/console 20 (Side A) has the only Power Indicator LED 150 and the right controller/console 30 (Side B) has the only the Bluetooth® and Wi-Fi LED 130,140.

Turning the power on results in an LED going on (for example, green), a blinking Wi-Fi LED and blinking BLUETOOTH® LED indicates successful pairing and connections. However, a low battery is indicated by red blinking power LED and BLUETOOTH® LED, but one skilled in the art will understand that other colors may be used.

Switches

Power Button

This is a switch to turn on the device similar to a power ON/OFF button.

Volume Button

The volume control of the device is a volume rocker switch, with up/down control of the volume. Vibration intensity is also controllable through this rocker switch Gameplay Buttons The trigger button 50 is a press to trigger button which is a push button. The Side A (left controller/console 20) and Side B (right side controller/console 30) game control buttons are used to play the games and are in unison. Accelerometer chips in both controller/consoles translate the motions made by the user on the x, y and z-axis to the screen.

Speakers

There are speakers 100 on each controller/console (side A and side B) to listen to the sounds of a game. The speaker volume is controlled through the volume up down rocker switch.

Vibration Motor

There is one vibration motor (not shown) on both sides (side A and side B) to experience the shakes or knocks in the game. The intensity level is controlled through the volume rocker switch Glide Pad Sensor The glide pad 80 in the device transforms the game play actions to the system. This serves for movement, trigger and all the standard actions in gaming. In an embodiment of the present invention there is a sealable glide pad having precise positioning ability and not having any moving parts and not requiring contact pressure Bluetooth®

Bluetooth® is used in this system to communicate between the side A and B (left and right controller/console 20, 30) as well as with any device connected/attached to the Universal Game Controller/Console 1. The Bluetooth® chipset is at least

- Bluetooth® version 4.2 with backward compatibility for other older versions
- Small form factor
- Ultra low power consumption
- Receiver sensitivity and selectivity
- Compliance with worldwide radio regulations
- Programmable power output Low voltage operation
Minimum external components for the chip
Security of the communication
ESD tolerance
Minimum antenna footprint on the pcb
RoHS (Restriction of Hazardous Substances Directive) compliant chip
Mesh networking capabilities A chipset that supports wireless functionality may be used, for example CC2640 from Texas instruments, or less preferably CC2650.

A network is established within the Bluetooth® devices to help enable the connection to be established simultaneously in Universal Game Controller/Console between side A and side B in addition to the communication with other devices. This is required since Bluetooth® by technology has been a point to point connection since its inception.

Technology such as Smart Mesh is used which defines an interoperable mesh networking solution using Bluetooth® Low Energy.

Wi-Fi

Wi-Fi is the mode of connection for the Universal Game Controller/Console 1 to connect to the internet. Wi-Fi communication transfers all data traffic to the internet as well as between the left and right controller/consoles. The IEEE 802.11 standard is implemented and the Wi-Fi chipset has at least:

Supports common security modes
Integrated IPv4 TCP/IP stack with BSD socket APIs for simple Internet connectivity with any MCU
802.11b/g/n integrated radio
Ultra-low leakage
Good power management
Ultra low power consumption
Energy efficient when inactive or Enter low-power deep sleep
Receiver sensitivity and selectivity
Compliance with worldwide radio regulations
Good temperature profile/Thermal management
Minimum external components for the chip
ESD tolerance
Minimum antenna footprint on the pcb
RoHS compliant chip For example, the CC3100MOD SimpleLink from Texas Instruments can be used. The CC3100MOD integrates all protocols for Wi-Fi and Internet, which greatly minimizes host MCU software requirements. With built-in security protocols, the CC3100MOD provides a robust and simple security experience. Additionally, the CC3100MOD is a complete platform solution. The Wi-Fi network processor subsystem features a Wi-Fi Internet-on-a-Chip and contains an additional dedicated ARM MCU that completely offloads the host MCU. This subsystem includes an 802.11 b/g/n radio, baseband, and MAC with a powerful crypto engine for fast, secure Internet connections with 256-bit encryption. The CC3100MOD module supports Station, Access Point, and Wi-Fi Direct modes. The module also supports WPA2 personal and enterprise security and WPS 2.0.

Low-Power Consumption at 3.6 V
Hibernate With Real-Time Clock (RTC): 7 μA
Standby: 140 μA
RX Traffic: 54 mA at 54 OFDM
TX Traffic: 223 mA at 54 OFDM

CPU

A NVidia® Tegra® 4i-ARM Cortex-A9 r4-Clock speed 2 GHz can be used, or a Qualcomm® Snapdragon® 820 MSM8996-Clock speed 2.2 GHz, or an Intel® Core™ m7-6Y75.

When not in use, the Universal Game Controller/Console can be detached from the mobile or tablet and stored in a small protective travel pouch.

Software

The Universal Game Controller/Console (with streaming services) is a mobile game console that utilizes any screen giving a gamer a wide arena to play any game. Universal Game Controller/Console's operating system allows streaming of games cross-platform as well as to play any current game on the market. The Universal Game Controller/Console application bridges the gap between mobile and console gaming. The universality of the operating system opens up formerly and existing closed market systems. A cloud-based service that hosts the gaming content with a virtual pop-up application delivers content right to the user.

The front-end design is web and application based. This is where the users create their customizable community to connect with the world through gaming. It is a new form world gaming. Creating communities through multi-player interaction no matter what type of gaming type is preferred by the user—app games, PC/Online games, or console games.

24/7 Game Streaming

The ability to pay for downloads when gamers are offline

Games for the Universal Game Controller/Console are licensed games from all game developers, and game developers may submit their games to the streaming game store.

The Universal Game Controller/Console offers two functions that are integrated into one. The first is the sleek and portable physical console. The second is integrated software that enhances mobile gaming.

Universal Game Controller/Console users may play as many games as they choose on any smart device, whether it is a tablet, phablet or smartphone. They may play new games launched on the service and have a wide library to choose from. The Universal Game Controller/Console gives users options of different genres, grades and styles of games through a large library. Users who download games may access the content even when their device is 'offline'.

The Universal Game Controller/Console has three services available to the smart device gaming public. The first service is the "all-you-can-play" streaming subscription based service. This allows the subscriber to connect to the system through the app (either by Wi-Fi or a data connection) and the subscriber or user than has unlimited access to a complete library of games. This service is a monthly fee based model. Through the all-you-can-play service, users have the ability to download games into their personal library stored on the cloud. These games are available in their personal library as long as they subscribe to the service.

The second service is a mobile gaming download based service, which can be described as an "al la carte" service, allowing the user of this service to purchase games from a complete library when they would like to game offline. As an added feature of this service, games that users purchase are stored in a user's "cloud" account. The games offered on the streaming service are exclusive content that is only available through the Universal Game Controller/Console.

Functional Requirements

Figure 10:
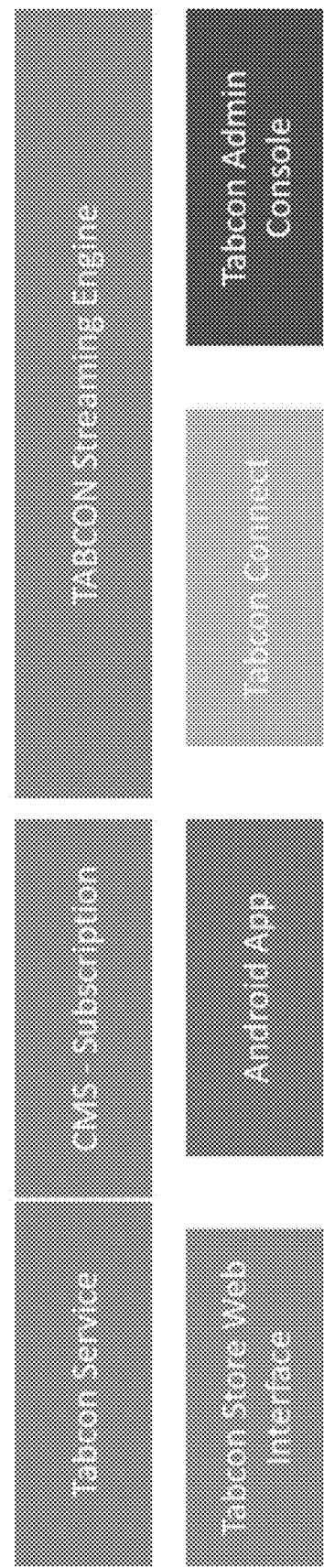
FIG. 10 is a services chart.

As shown in FIG. 10, the software services available with the Universal Game Controller/Console consist of the following software modules:

1. TABCON™ Service: A versioned web API service layer with core business logic.
2. TABCON™ Streaming Service: For all real time streaming needs. TABCON™ Game streaming engine is the backbone of TABCON™ Cloud gaming/Gaming on demand service. Cloud gaming based on file streaming (progressive downloading) deploys a thin client in which the actual game is run on the user's Universal Game Controller/Console.
3. TABCON™ App: Mobile app showcases all TABCON™ games, search and filter options, initiates game services for the subscriber for iOS, Android and Windows. TABCON™ android app is the client app version of TABCON™ Store Web Interface-user may login, see the available games, saved/purchased games, top games, either download or stream games to play, buy games etc. TABCON™ app is exclusively for TABCON™ enhanced games which are available in the TABCON™ Cloud store. Top 10 Games, New/Updated Games, Popular Games, and Recommended for You, Try a Top Seller, From familiar faces, Adventure Games, New Game Releases categories help users to pick the right game for them. A separate category called 'Featured' lists the game advertisements.
4. TABCON™ Connect: TABCON™ Connect is a Web Interface for Game Developers to submit games, see sales dashboard, setup bank account etc.
5. TABCON™ Web Interface: is a Web extension of the TABCON™ Mobile App-Games are available through TABCON™ store either free of charge or at a cost. They are downloaded directly to a Universal Game Controller/Console through the TABCON™ Store mobile app, or by deploying the game to a Universal Game Controller/Console from the TABCON™ store website. User either downloads or streams games.
6. TABCON™ Admin Console: TABCON™ admin console provides dashboard analytics features for the admin. Data Mining; collecting data from users and streamed & downloaded games etc.

TABCON™ Services

Figure 11:
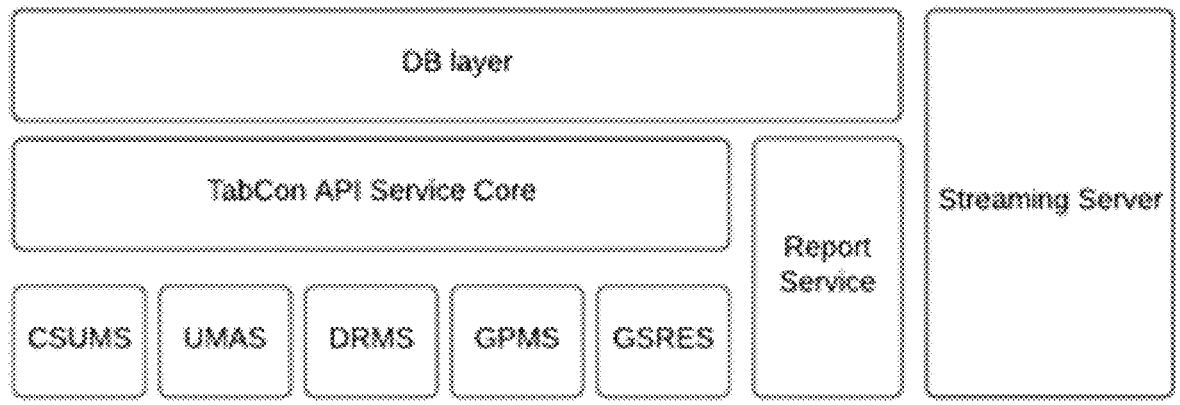
FIG. 11 is a software platforms chart.
Figure 12:
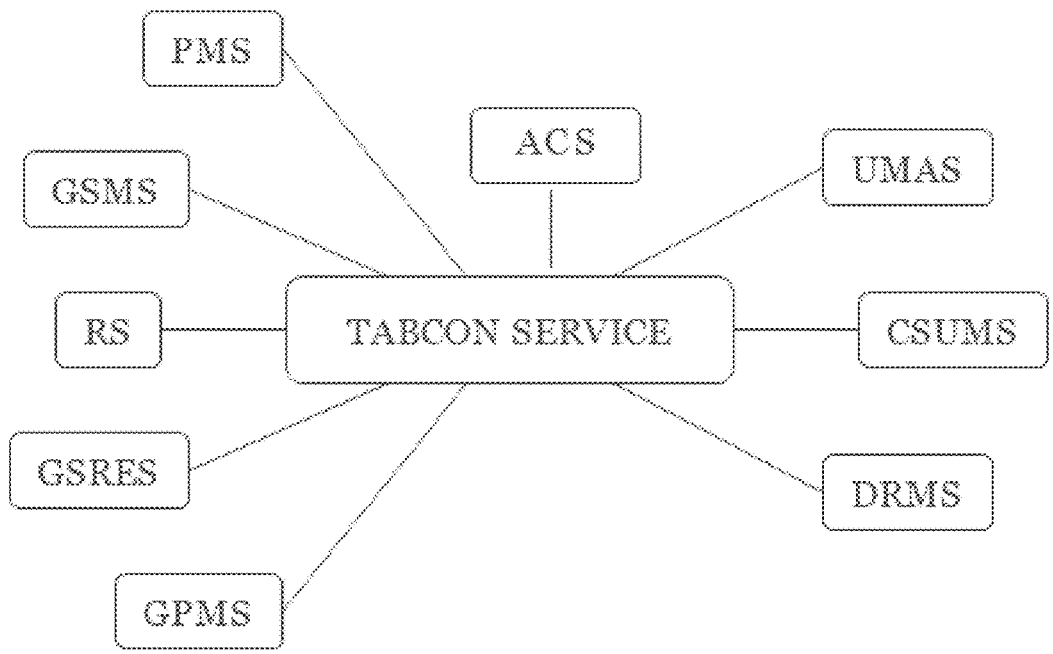
FIG. 12 is an available services chart.
Figure 13:
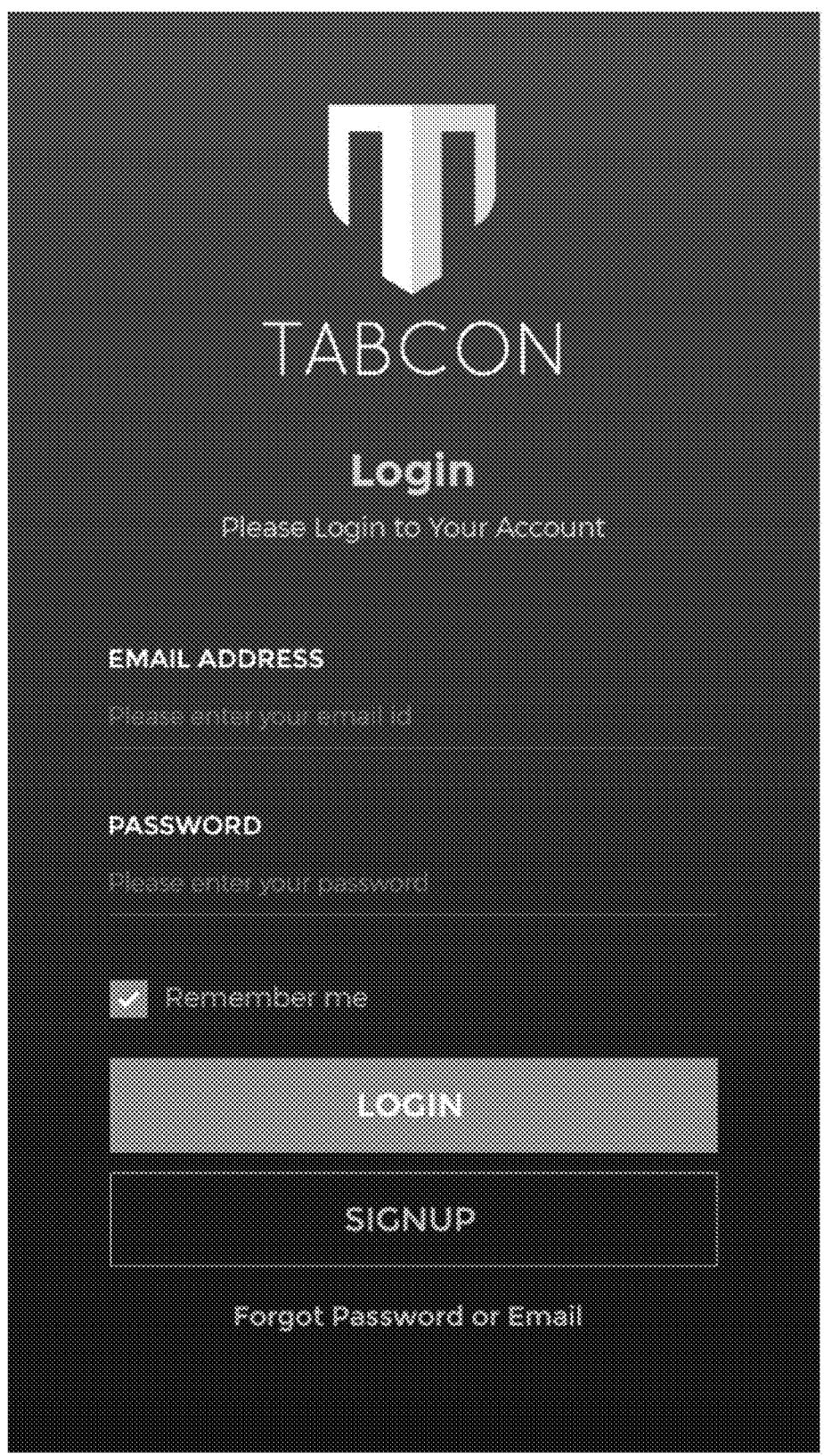
FIG. 13 is a screenshot of a Home page.
Figure 14:
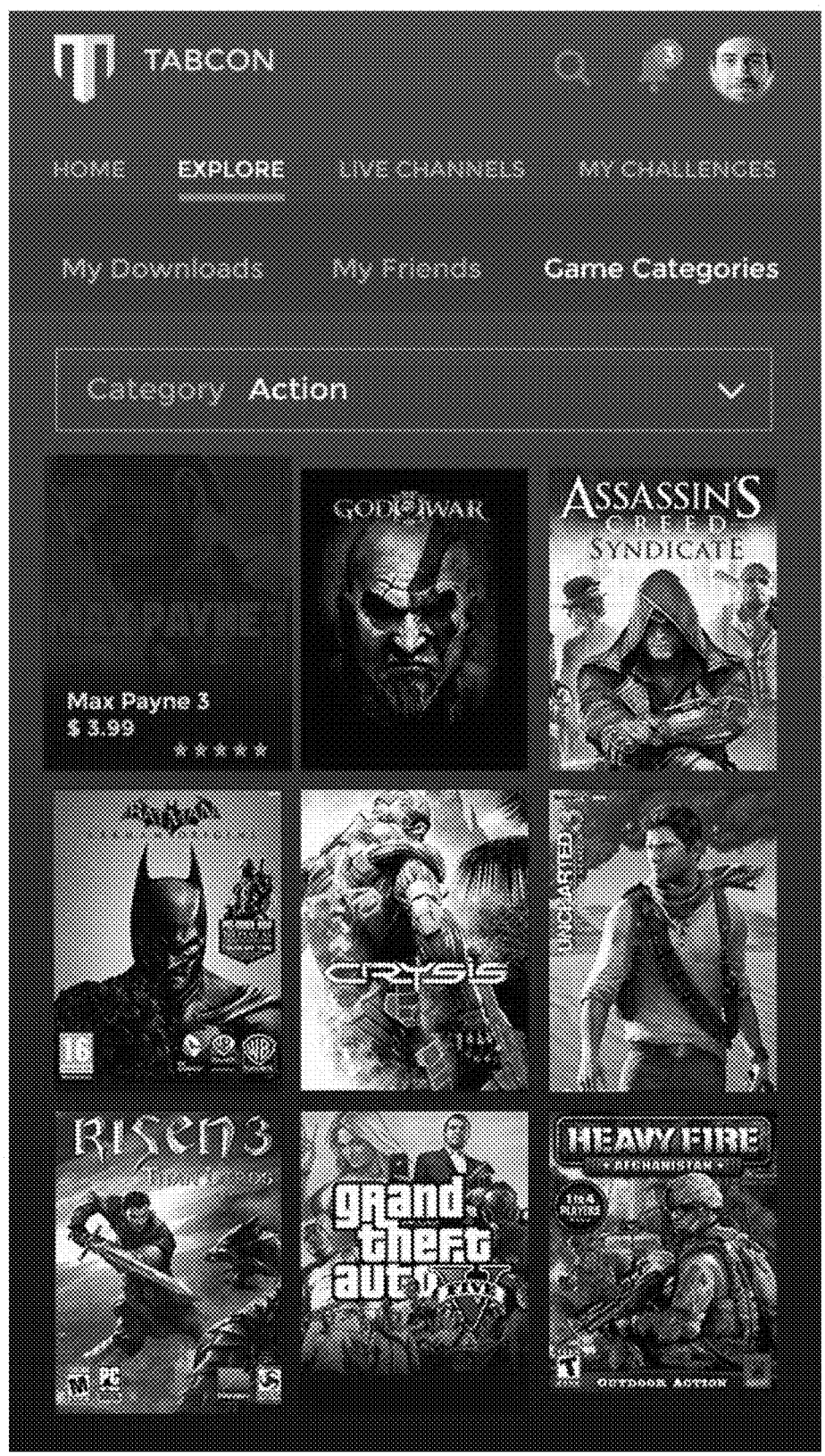
FIG. 14 is a screenshot of a page to Explore available games.
Figure 15:
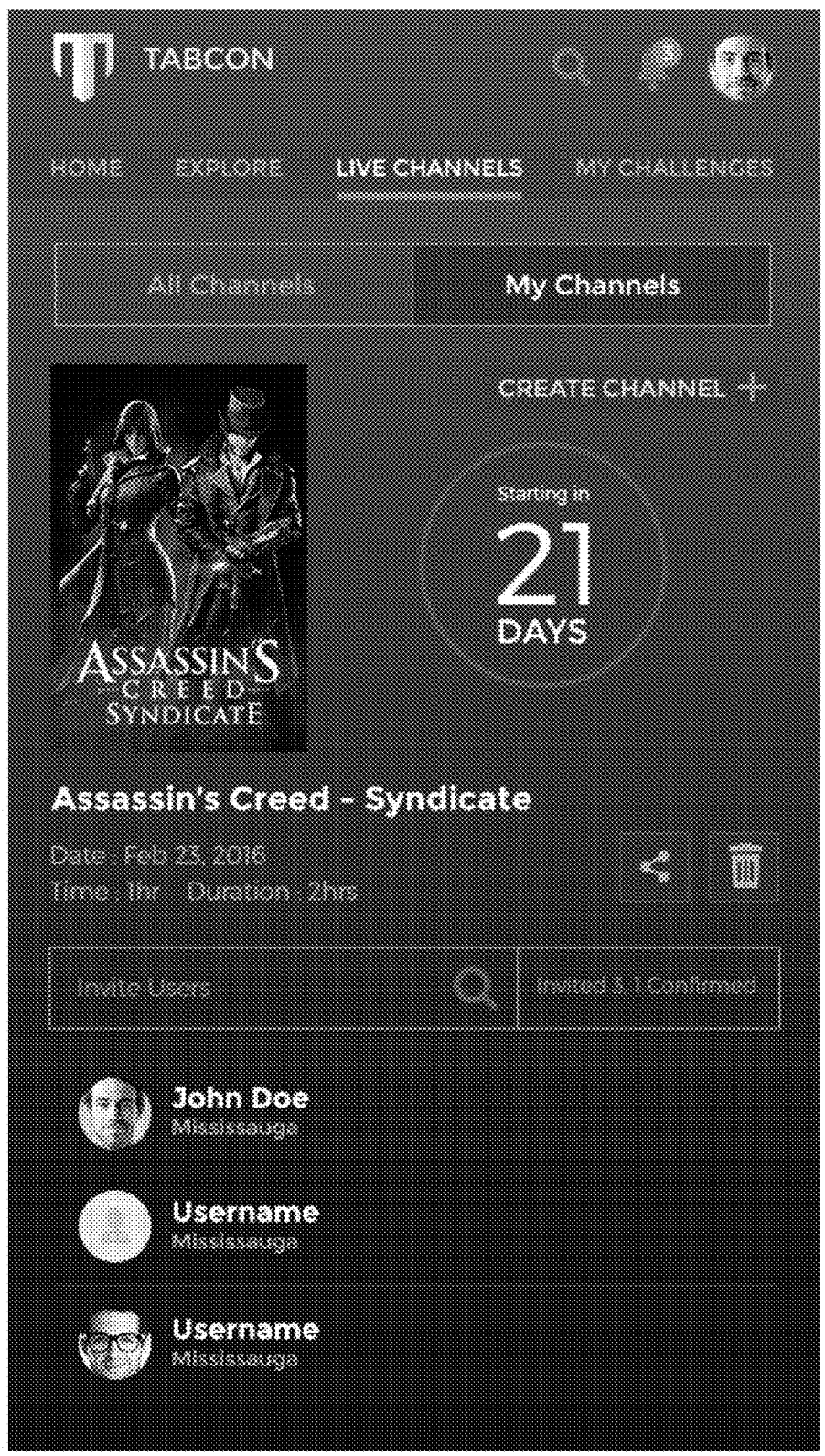
FIG. 15 is a screenshot of a Live Channels page.
Figure 16A:
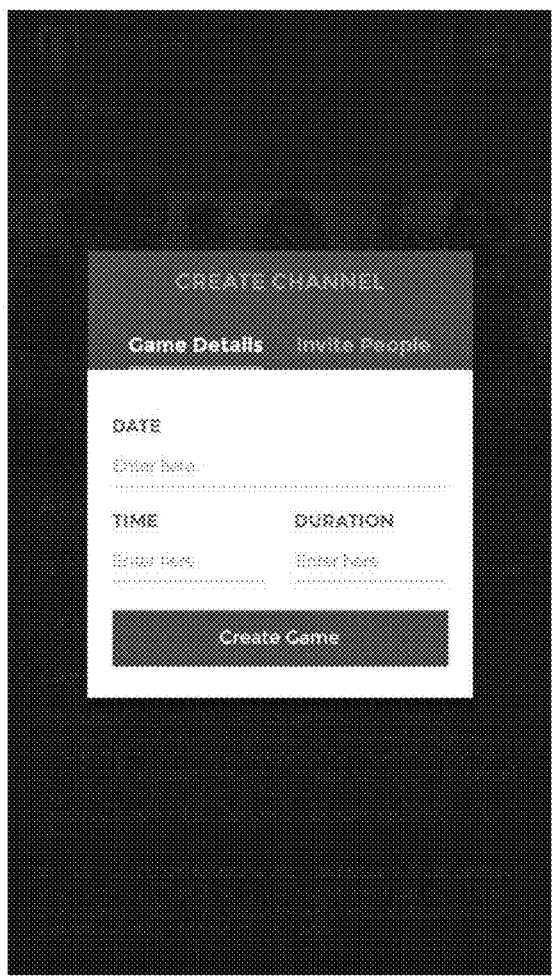
FIG. 16a is a screenshot of a Create Channels—Game Details page.
Figure 16B:
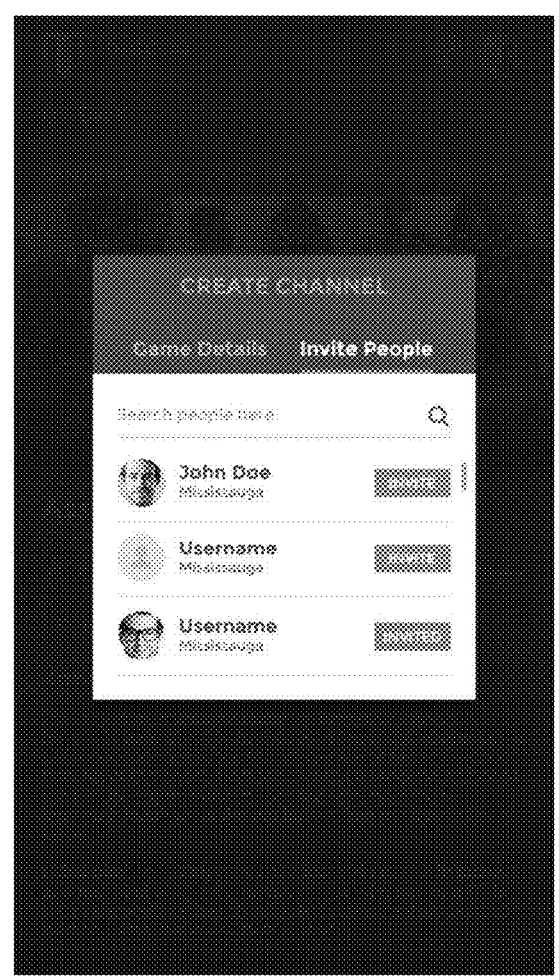
FIG. 16b a screenshot of a Create Channels—Invite page.

The software platform is shown in FIG. 11.

TABCON™ REST ("Representational State Transfer") Web service is responsible for all business logic (including algorithm for game listing, sorting, rating, suggestion mechanism etc.), developer and subscriber accounts/profile management, payment gateway integration Configuration/Software Update Management Services—CSUMS
  Dynamic parameters configuration based on geographic location, time, model, version etc.
  Check for the device firmware version updates required.
  Device validation locking/unlocking based on certain parameters.
Device Registration Management Services—DRMS
  Device registration for first time configuration and after reset
  Managing device/user specific configuration remotely
Game Publishing Management Services—GPMS
  Publishing games
  Publisher profile management
Agreement/Payment Configuration
  Game Static Content Management
  Price management
  Game review and approval process
Game Search and Recommendation Engine Services—GSRES
  Searching games based on name, keywords etc.
  Algorithm for recommending "You may also like" and "Customer also viewed" categories
Report Services—RS
  Real time data for currently active sessions
  Finance reports
  Active user and transaction report
  TC devices reports
Game Streaming Management Services—GSMS
  API's for initiating streaming with the TABCON devices, IP-TV, Mobile Phones
  Services/API's to support RTP/RTCP/HLS
  Content Management and Delivery services are part of GSMS
Payment Management Services—PMS
  Integration with Payment Aggregators
  Manage User Subscriptions
  PMS takes care of the payment gateway integrations as well.
Ad Campaign Services—ACS
  Manage Game Developer's ad campaigns
  APIs retrieve concerned Ads for each specific user
  Ad Campaign Revenue and Analytics APIs
TABCON™ Connect
  TABCON™ Connect SDK is the core module in TABCON™ Connect.
Connected Services—CSUMS-GSMS
  SDK has "Must Implement" functions and as well as "Optional Functions"
  Game after implementing the "Must Implement" functions becomes compatible with TABCON™ hardware
  "Must Implement" has function to validate game with the server and also streaming support functions
  "Optional Functions" are functions such as using central game score board, social network integration with TABCON™ social media sites.
  This SDK with user manual is provided to the game publisher for integration
TABCON™ Store-Web Interface
  TABCON™ Store is the Web extension of the TABCON™ Mobile App-Games are available through TABCON™ store either free of charge or at a cost. They are downloaded directly to a Universal Game Controller/Console through the TABCON™ Store mobile app, or by deploying the game to a device from the TABCON™ store website. User can either download or stream games.
  TABCON™ Mobile application consumes the following services: CSUMS-DRMS-GSRES-GSMS-PMS.
1. Create/edit user profile
2. Pair with Universal Game Controller/Console using PIN/Pass Key
3. List/Search/View Games using GSES
4. View GDP—Game Detail Page
5. Download games to phone
6. Sync-up downloaded games to TABCON using Bluetooth® or Wi-Fi
7. Suggestions—"You may like" and "Customer also viewed" categories
8. Review/Rate the games
9. Direct connectivity with Universal Game Controller/Console using Wi-Fi for real time game streaming
10. Payment Integration—PMS
11. Client side caching optimizes the performance
Admin Console
  TABCON™ admin console provides dashboard analytics features for the administration, Data Mining collecting data from users and streamed and downloaded games etc.

Screenshots

Demonstration screenshots are shown in FIGS. 13 to 16b.

User Experience and UI

All web interfaces are fully responsive. Use Login Forms, Popup styles, Model and Modeless windows Material Design Pattern, Parallax Scrolling Font Roboto Thin, Roboto Condensed, Robot Light Fonts are used throughout the application.

Color Theme

TABCON connect ef6262

3d3c3c f7f6f6

TABCON store—web interface

3a97d0

3d3c3c f7f6f6 admin console

3a97d0

3d3c3c f7f6f6

TABCON Android Mobile app

3a97d0

3d3c3c f7f6f6

Technologies

Web UI

The most powerful HTML, CSS and JS framework with Sass (CSS pre-compiler) and single page UI MVC framework—Angular IS was used to develop the web interface (UI).

Web API

RESTful, versioned web API service developed using Django-Python.

Business Layer

The business layer handles the core backend logic in Python. Message Queue layer (Active MQ or Rabbit MQ) improves the backend performance.

Database & In Memory Cache

PostgreSQL is the main database. The open source 'Memcached' is a cache for storing frequently used information to save (into RAM) from loading (and processing) information from slower sources, such as disks or a database as a dedicated situation or as a method of using up spare memory in an existing environment. The use of Memcached speeds up the application processes.

Standards

Coding Standard

Python: Standard coding guidelines

Google® Angular JS Style Guide

Apple iOS® Best Practice guidelines by Apple®

Android® Best Practice Guidelines by Google®

The Universal Game Controller/Console of the present invention is portable, consists of two separate controller/consoles that work together simultaneously, and utilizes wireless technology to connect to any screen (smart phone, tablet, computer monitor, or smart television screen). This wireless technology consists of a customized dual boot operating system with ARM and X86/X64 architecture/instruction set controllers. At the core of the Universal Game Controller/Console is streaming technology. The streaming technology consists of a dual boot architecture system that allows for the playing of large format PC and Console style games on the go. The streaming technology has three parts. The first part consists of progressively downloading a game from a streaming server into the console part of the core of the Universal Game Controller/Console, where all the game data is reconstructed within the console. The second part consists of broadcasting the reconstructed game and live streaming the game from the console into an App and/or website onto any screen for game play. The third part consists of the streaming technology integrating the internal intranet (offline) system to enable the left and right sides of the Universal Game Controller/Console to communicate with each other which allows for seamless game play of the invention.

In order to play any games, the Dual Architecture system allows the Universal Game Controller/Console to run and support software from different instruction set families (ARM, X86/X64) to have a seamless Universal Game play and support all gaming engines through the hardware. The Scheduler is comprised of software and firmware that allows the Universal Game Controller/Console to automatically switch between ARM and X86/64 controllers.

The Universal Game Controller/Console of the present invention is it is an all in one portable mobile console that can host any game on the go (that is, it can be used anywhere). The Universal Game Controller/Console of the present invention gives gamers the ability to choose where they can play not only console style games but also PC games. Gamers have the versatility and the option to play multiple different games from multiple different platforms and architectures. By virtue of a Dual boot architecture of the present invention, the Universal Game Controller/Console of the present invention is completely universal. The Dual boot architecture for ARM and X86 of the present invention was used to develop routines to play games written in all gaming languages, including OpenGL, Vulkan, DirectX, ARM, Unity, and Unreal.

The Universal Game Controller/Console of the present invention renders games and make them playable on any screen. Rendering or image synthesis is the automatic process of generating a photorealistic or non-photorealistic image from a 2D or 3D model (or models in what collectively could be called a scene file) by means of computer programs. Also, the results of displaying such a model can be called a render. The Universal Game Controller/Console of the present invention can access all styles of games.

There has never been a console that is not one unit. The Universal Game Controller/Console of the present invention has two separate sides that work simultaneously together as one cohesive console. The console of the Universal Game Controller/Console of the present invention is comprised of two separate pieces and this provides the universality aspect whereby a user can clamp any phone or tablet to the console to play on-the-go. The Universal Game Controller/Console of the present invention is a one-unit console that fits any phone or tablet.

A platform is a computer system specially made for playing video games. A platform is a console. The Universal Game Controller/Console of the present invention is a platform. In addition to the outer visible physical aspects, the Universal Game Controller/Console of the present invention comprises a software content-delivery platform. This coupling removes the requirement to buy and store games on physical devices. It provides the user with the opportunity to have access to a variety of games. The Universal Game Controller/Console of the present invention can be combined with a subscription to access a library of games. The Universal Game Controller/Console of the present invention provides the option of switching seamlessly from use with a portable screen to a large display, for example from phone to tablet or phone to TV. Game developers providing games for use with the Universal Game Controller/Console of the present invention can launch their game products digitally, without having to pay upfront for SDKs (software development kits), or developers to port their game to a new platform. The Universal Game Controller/Console of the present invention supports all gaming engines. Currently available processors enable the Universal Game Controller/Console of the present invention to deliver high-end portable graphics in consumer level mobile systems.

The Universal Game Controller/Console of the present invention is a universal console and controller consisting of two parts, the right-side or Side A and the left side or Side B. Both of these sides work together to complete the task of game streaming from the cloud to the console to the user's screen, whatever screen that may be. Specifically, the software system is integrated in the hardware layers of the console. The main side is Side A which houses the GPU chip and talks to Side B. Side A is where most of the firmware is ported to the hardware chips. Side B supports Side A and houses one battery and the controller set with which one plays the games.

There are two aspects to the game streaming technology. The first level is through a streaming server. Here there is enhanced streaming of the games from the server to the console of the present invention. Aspects of the game are reconstructed in the Dual bootstrap architecture and dual chips in the console of the present invention. The Dual system consists of two operating layers. The first is an ARM™ based gaming content delivery network (an ARM processor is one of a family of CPUs based on the RISC (reduced instruction set computer)). The second layer is an X86/X64 bit content delivery network. Within the operating system there are multi-layers for the ability to play any game written in any language. In the second layer, the console of the present invention is then broadcasting the re-constructed game and live streaming the game from the console unit to the app or website for game play.

As shown in FIGS. 17-30, the Universal Game Controller/Console 200 of a further embodiment of the present invention is an all-in-one portable gaming console and controller separated into two parts which utilizes any screen and is capable of playing any game. This controller/console may additionally include a battery.

Figure 17:
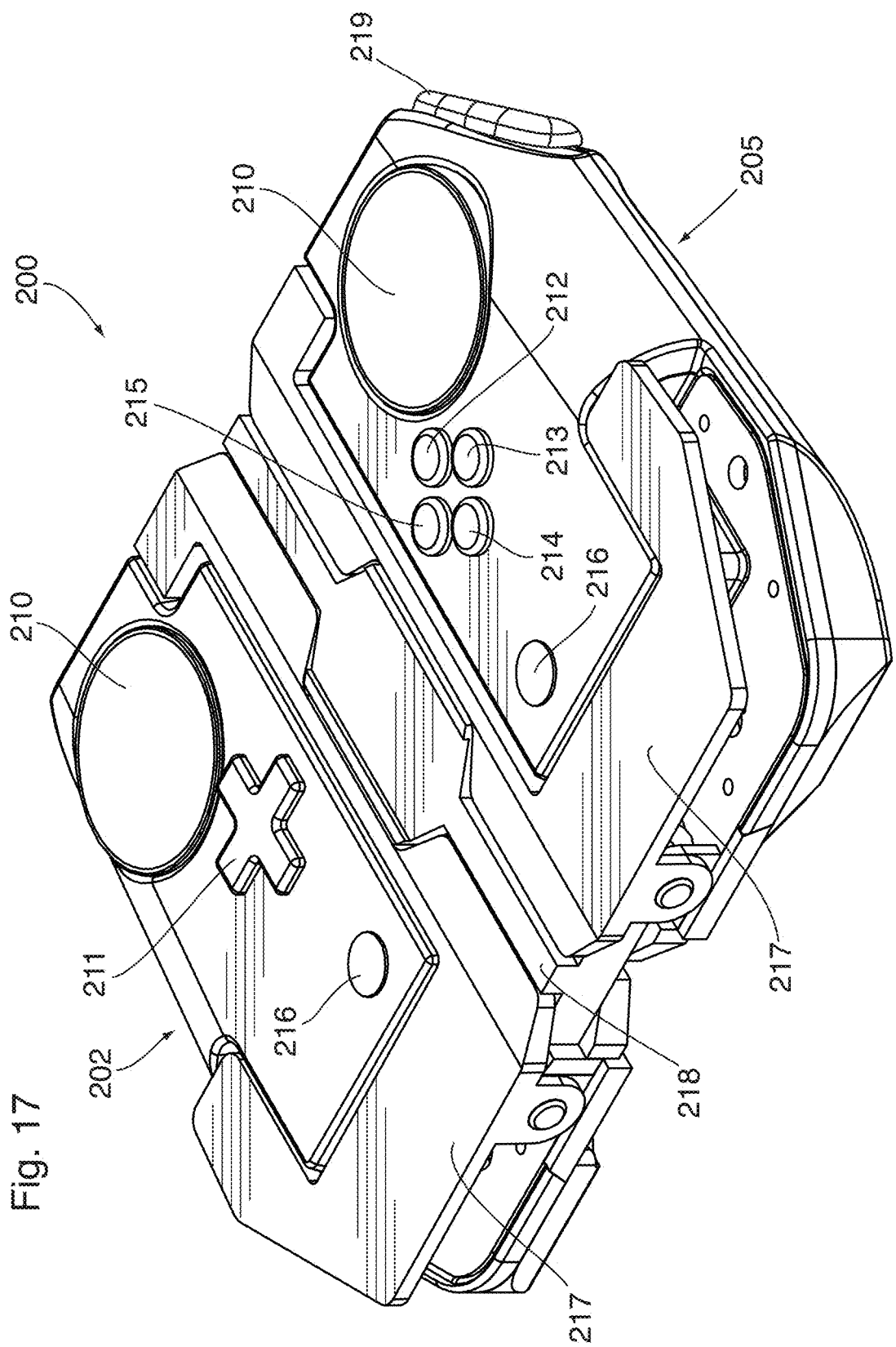
FIG. 17 is a perspective view of a further embodiment of a Universal Game Controller/Console shown as one unit comprising a left controller/console and right controller/console clamped onto a middle battery.
Figure 18:
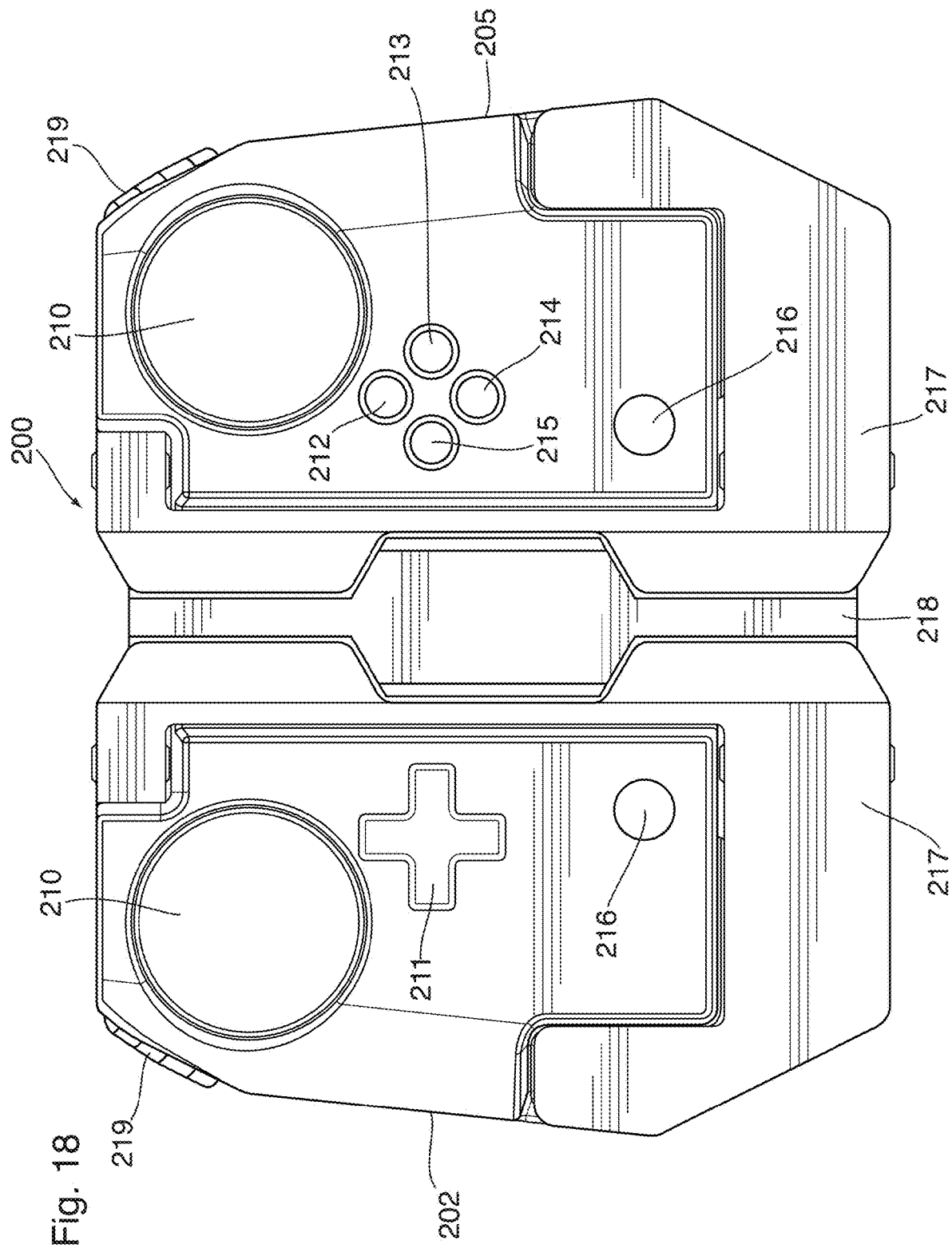
FIG. 18 is a front view of the Universal Game Controller/Console of FIG. 17.

The Universal Game Controller/Console 200 comprising a right controller/console 202 and left controller/console 205 is shown at rest in FIGS. 17 and 18 with a middle battery 218. The right and left controller/console 202, 205 both have a trigger button 219. The right controller/console 202 additionally comprises a D-pad 211 with four directional buttons, namely, down directional button, left arrow directional button, up directional button, and right directional button, a power button 216 and a "thumb press" is the visible portion of the top hinge 217 in a spring mechanism for the clamping of the Controller/Console onto any user's screen. The left controller/console 205 additionally comprises an A play button 215, B play button 212, X play button 214 and Y play button 213, a power button 216, and a thumb press 217 for the spring mechanism for the clamping of the Controller/Console onto any user's screen. The power button 216 turns on and off the power for the right and left sides 202, 205 of the controller/console independently and may be a push button that is flush with the top housing 233. It will be understood that the play and trigger buttons and controls could be added to and re-arranged.

Figure 19:
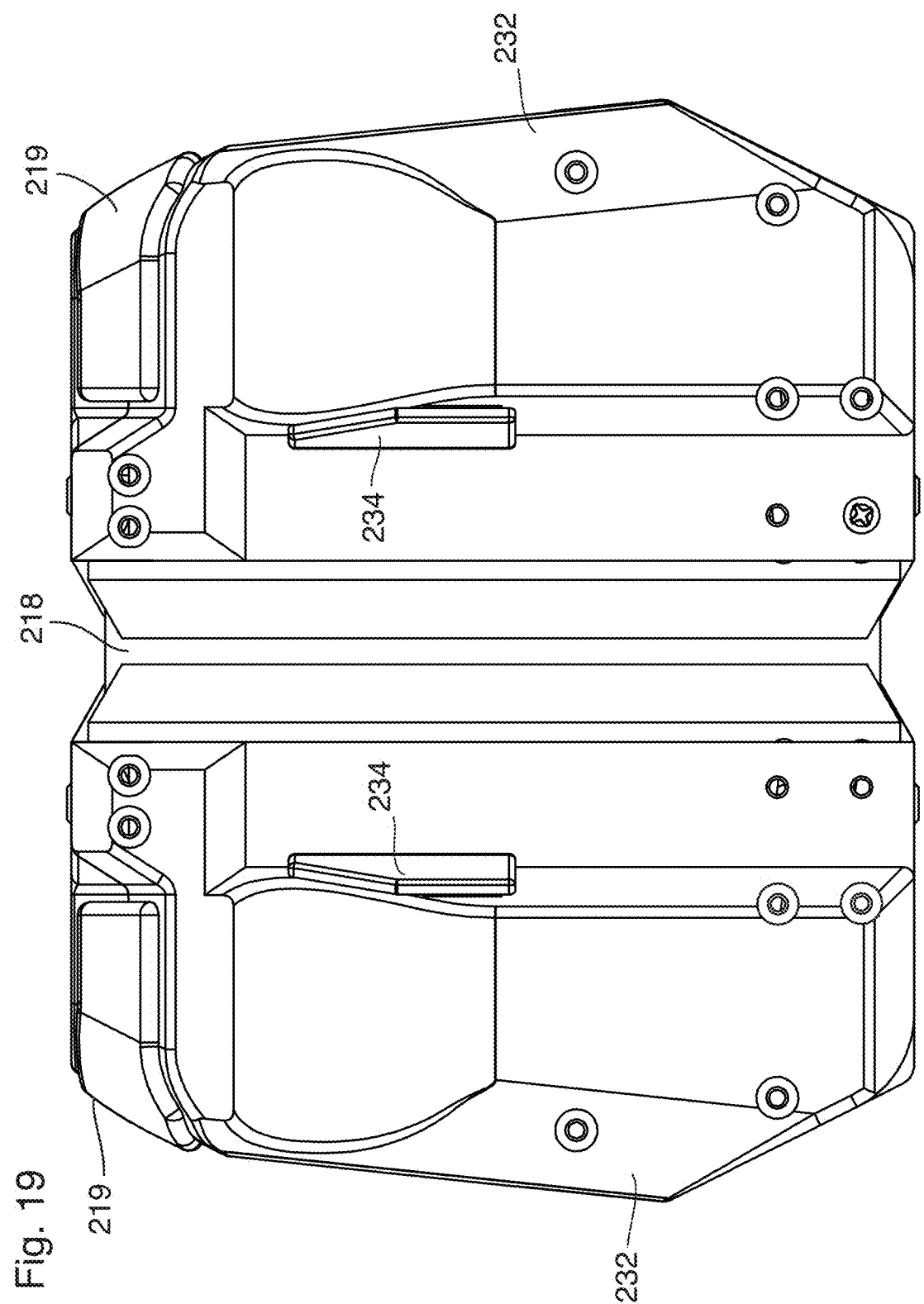
FIG. 19 is a back view of the Universal Game Controller/Console of FIG. 17.

As seen in FIG. 19, the back of the console comprises of two trigger buttons, two on the right side of the Controller/Console, and two on the left side of the Controller/Console. The back of the Universal Game Controller/Console is ergonomic to fit into the user's palm. The console houses a middle battery 218. The left and right-side trigger buttons 129 and 234 are shown.

FIG. 20 shows the right and left sides 202, 205 of the controller/console gripping onto the middle battery 218. FIG. 21 shows the single torsion spring 230. The universal clamping mechanism comprises a top hinge 217 and a bottom hinge 231 with the spring 230. The clamps utilize a single torsion spring 230 to apply clamping force on the device e.g. mobile phone or tablet (or middle battery). The clamps can be opened by squeezing the outer edge of the top hinge 217 referred to as a "thumb press" with the thumb of one hand on each side. The clamp formed by the inner edges of the top hinge 217 and bottom hinge 231 accommodates devices ranging from small phones to large tablets, and allow the clamps to open without the use of more than one hand per side. The clamps obscure very little screen space on the mobile phone or tablet device, nor any front facing cameras, and does not cover any buttons along the side of the mobile phone or tablet device.

A stiff torsion spring 230 and/or clamp locking mechanisms can be used to prevent the clamps from opening inadvertently while in operation. The controller handles utilizing the clamps are ergonomic and accommodate a wide audience of hand sizes, reducing the risk of misusing the controllers.

In FIG. 22 the separate components of the Universal Game Controller/Console of the present invention 200 are shown with the middle battery 218 component separated from the right controller/console 202 and left controller/console 205 with game play buttons 212, 213, 214, 215.

On the right side 202 there is a glide pad 210, a D-pad 211 for direction arrows, a power button 216, the top hinge 217 and bottom hinge 231 of the clamping mechanism, and 233 the top housing unit for the left side of the console which houses component. The left side of the controller 205 shows a glide pad 2210, A play button 215, B play button 212, X play button 214 and Y play button 213, a power button 216, and the top hinge 217 and bottom hinge 231 of the clamping mechanism.

FIG. 23a shows the single torsion spring 230. FIG. 23b shows the components of the right controller/console 202 which fit within a top housing 233 and a bottom housing 232 including a battery housing 235 comprising a GPU, battery and internal PCB 235 as well as a glide pad 210, a back trigger button 234. A pin 236 and a dowel 237 keep the single torsion spring 230 in place.

Figure 24:
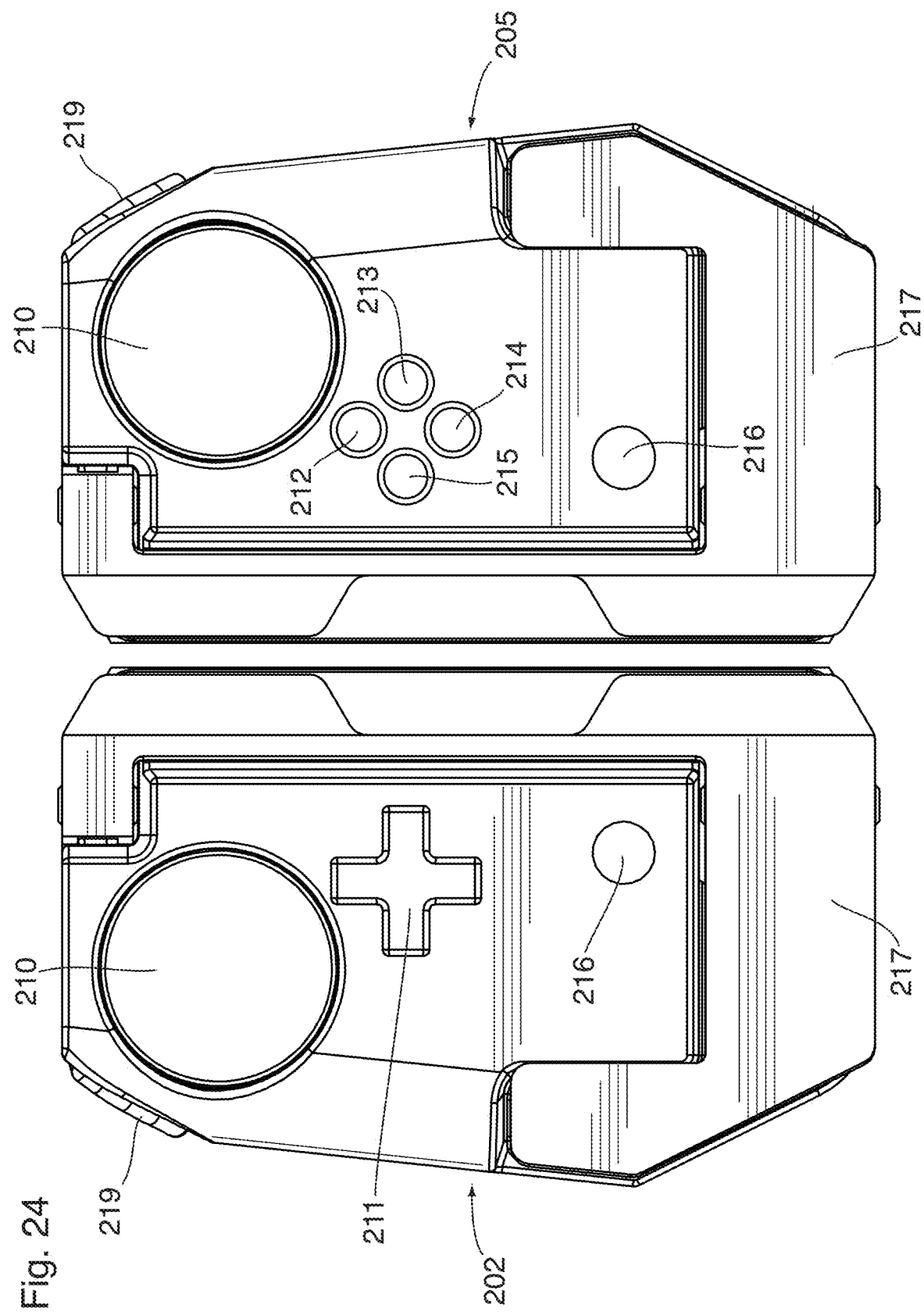
FIG. 24 is a front view of the Universal Game Controller/Console of FIG. 17 without the middle battery.

FIG. 24 is the Universal Game Controller/Console without the middle battery 218. The left and right controller/console 202, 205 both have a trigger button 219, The right controller/console 202 additionally comprises a D-pad 211 with four directional buttons, namely, down directional button, left arrow directional button, up directional button, and right directional button, a power button, 216. A thumb press portion of the top hinge 217 is visible which when pressed utilizes the spring mechanism for the clamping of the Controller/Console onto any user's screen. The left controller/console 205 additionally comprises an A play button 215, B play button 212, X play button 214 and Y play button 213, a power button 216, and a thumb press portion of the top hinge 217 is visible.

FIGS. 25a and b show the Universal Game Controller/Console clamping mechanism. The clamping mechanism comprising the top hinge 217 and bottom hinge 231 can be made of any stiff material, for example, but not limited to steel, aluminum, zinc alloy, titanium, carbon fibre etc. There is a gripping material 238 on the interior aspects of the inner edges of the top hinge 217 and bottom hinge 231 which forms the clamp. The gripping material 238 may be textured to provide adequate grip on devices ranging from phones to tablets. Gripping material 238 can be made of any soft rubbery material such as neoprene rubber that may or may not be textured. The action of attaching the controllers using the clamps is easy for a user because it only requires one hand on each side to open and close the clamps. Devices are secured due to clamping forces provided by the clamps, and also because the devices are held between textured gripping materials. The clamps and gripping material is non-destructive to phones and tablets, due to the dampening properties of the gripping material 238. The gripping material 238 is softer than glass, or metal, so that it will not scratch, nor scuff the devices with which it is used. The pin 237 keeps the torsion spring 230 in place.

Figure 26A:
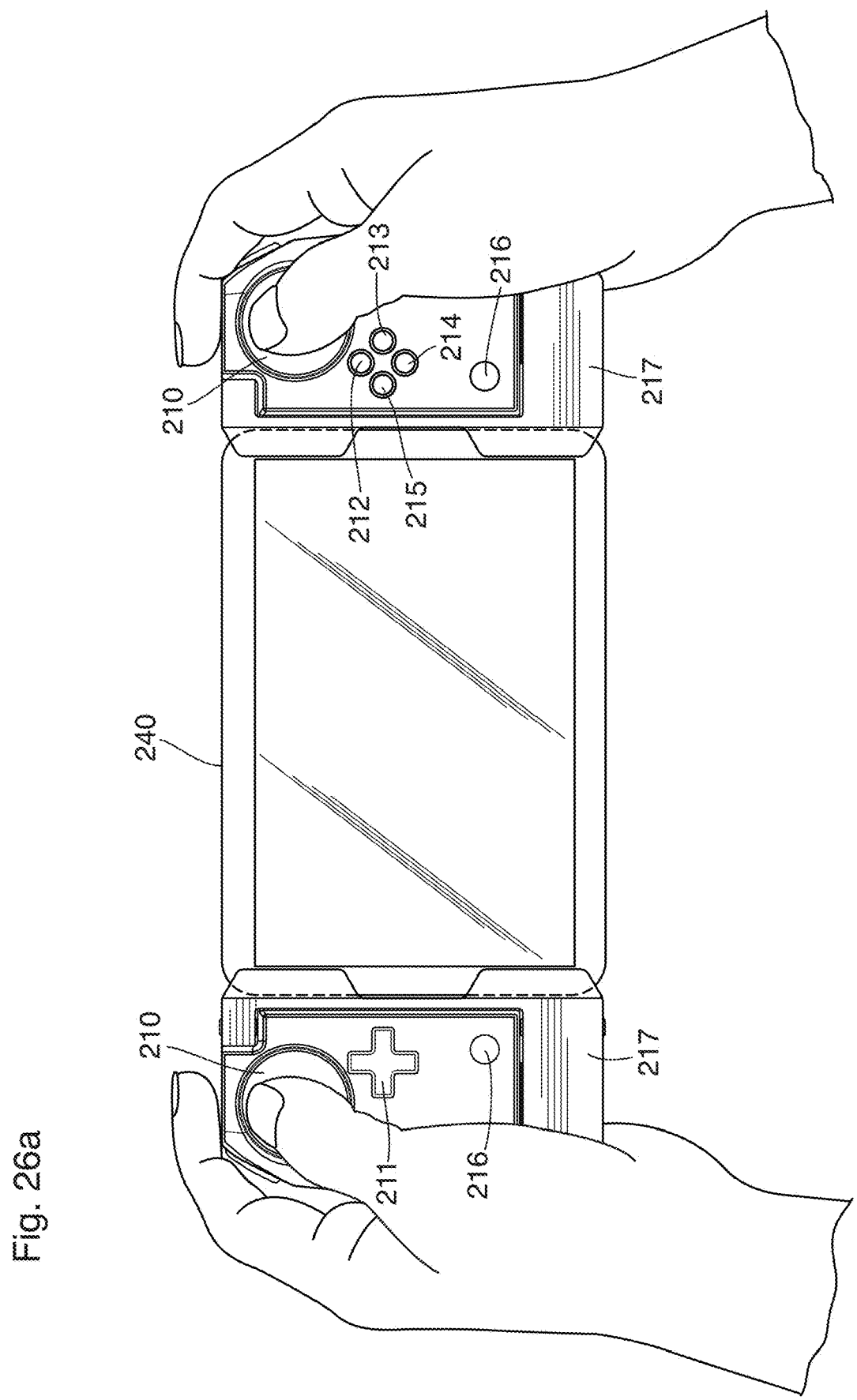
FIG. 26a is the Universal Game Controller/Console of FIG. 24 clamped on a mini tablet showing the positioning of a user's hands.
Figure 26B:
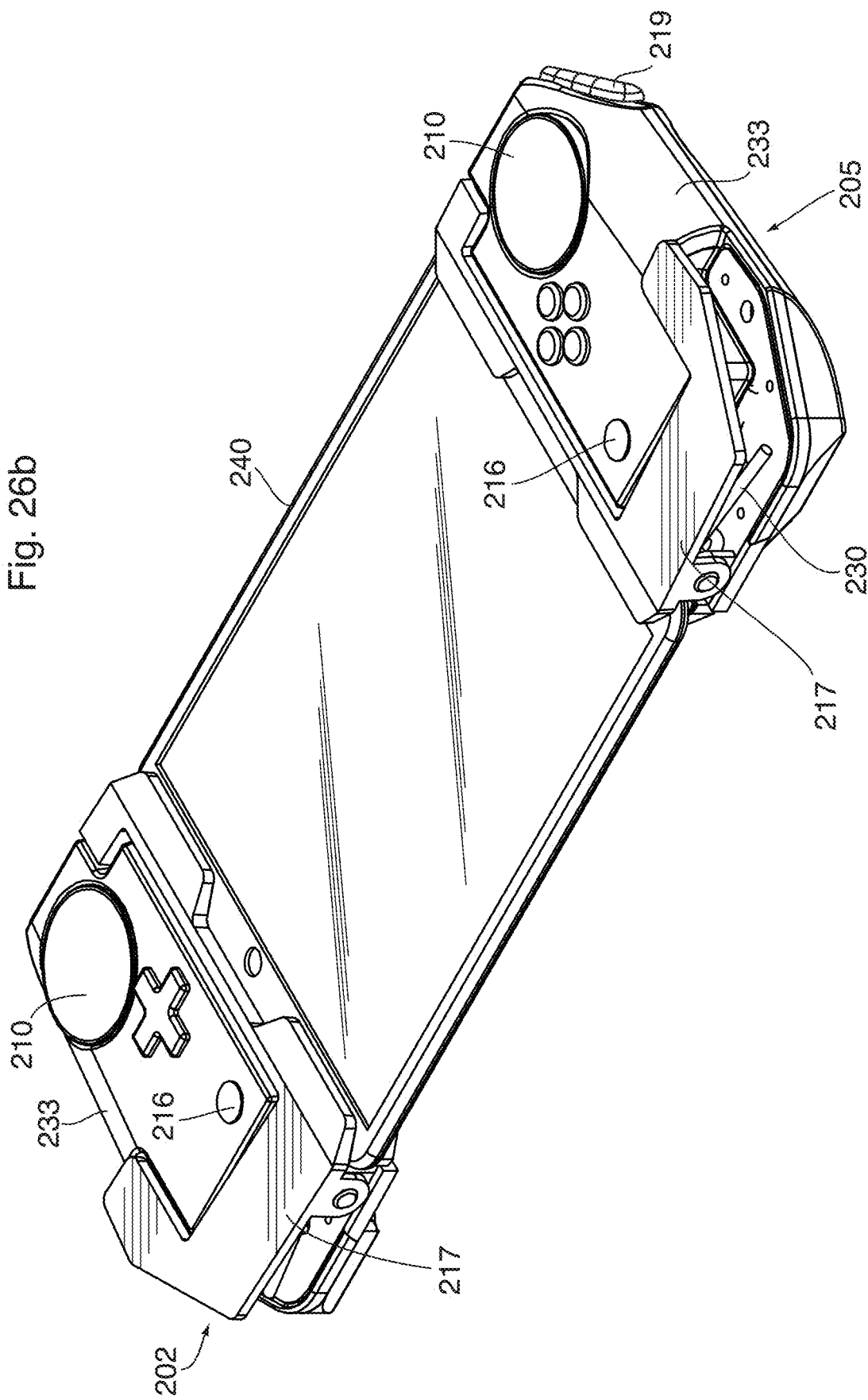
FIG. 26b is a perspective view of the Universal Controller/Console of FIG. 24 clamped on a mini tablet.

FIGS. 26a, b and c show the Universal Game Controller/Console clamped on each side of a mini tablet 240.

FIG. 26a additionally shows the positioning of the hands of a user on the right side 202 and left side 205 of the Universal Game Controller/Console. The thumbs are shown on the glide pads 210 and can be shifted over the play buttons and to the thumb press portion of the top hinge 217.

Figure 27A:
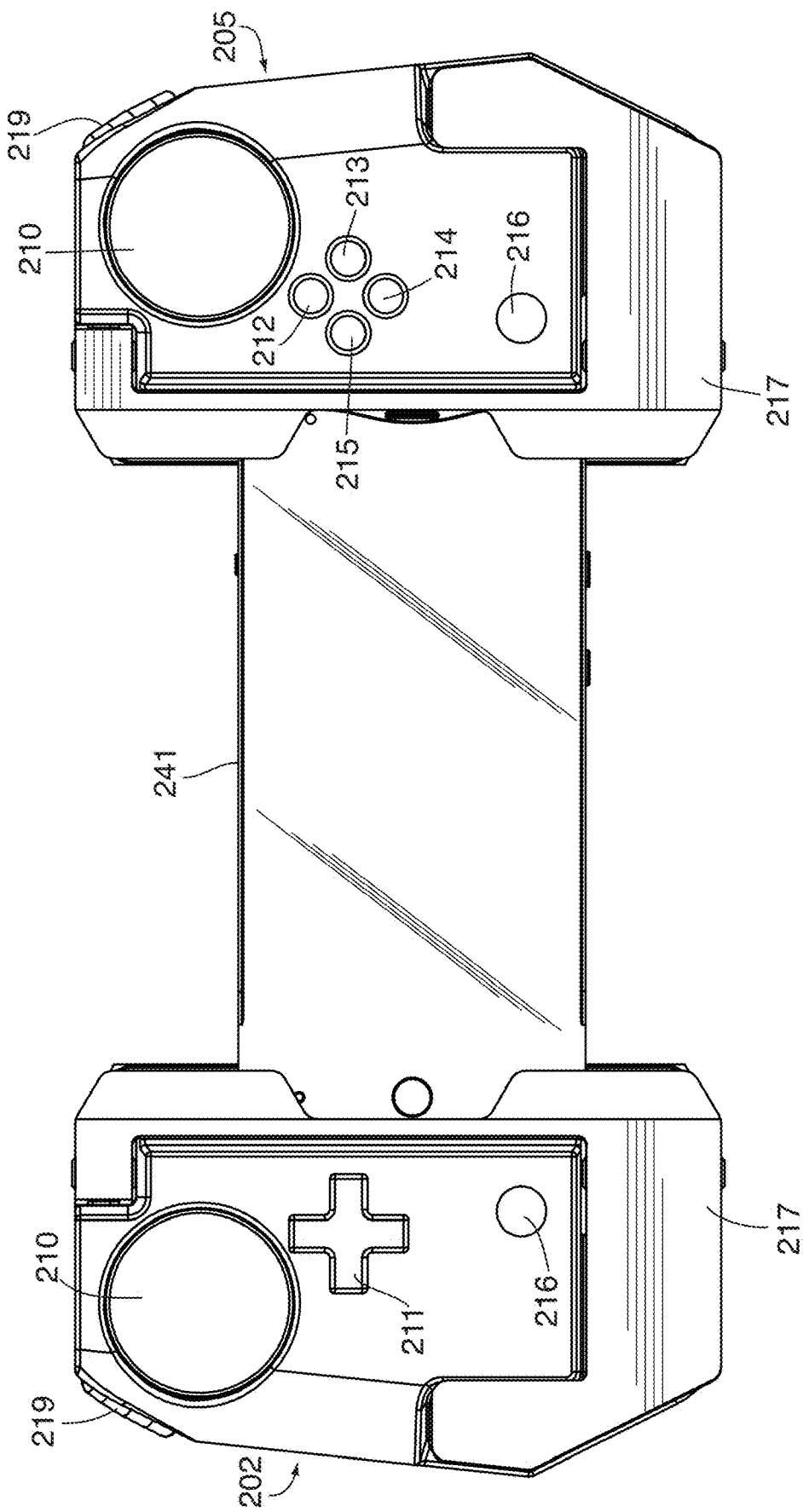
FIG. 27a is a front view of the Universal Controller/Console of FIG. 24 clamped on a mobile phone.
Figure 27B:
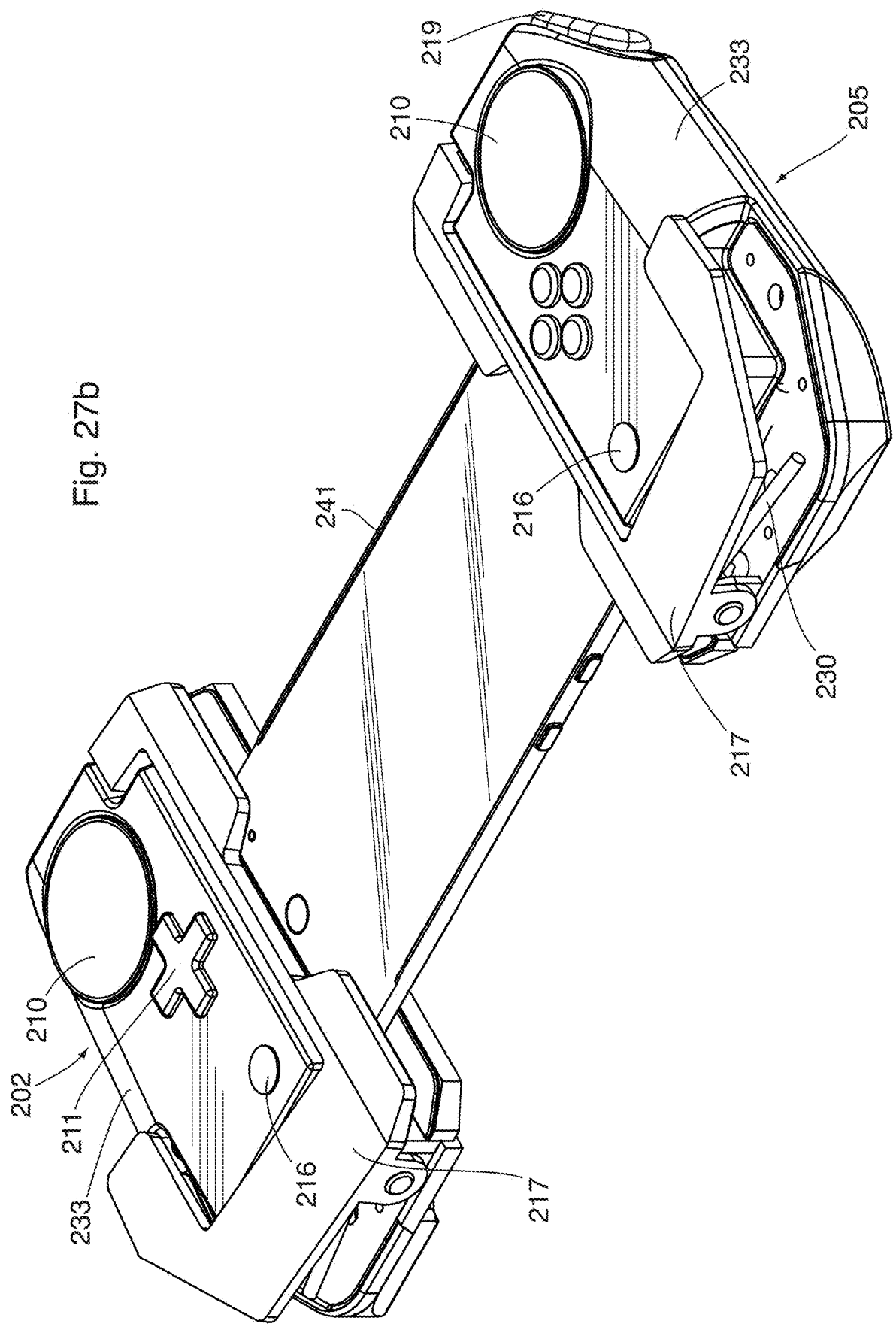
FIG. 27b is a perspective view of the Universal Controller/Console of FIG. 24 clamped on a mobile phone.

FIGS. 27a, b, and c show the Universal Game Controller/Console clamped on a mobile phone 241.

Figure 29:
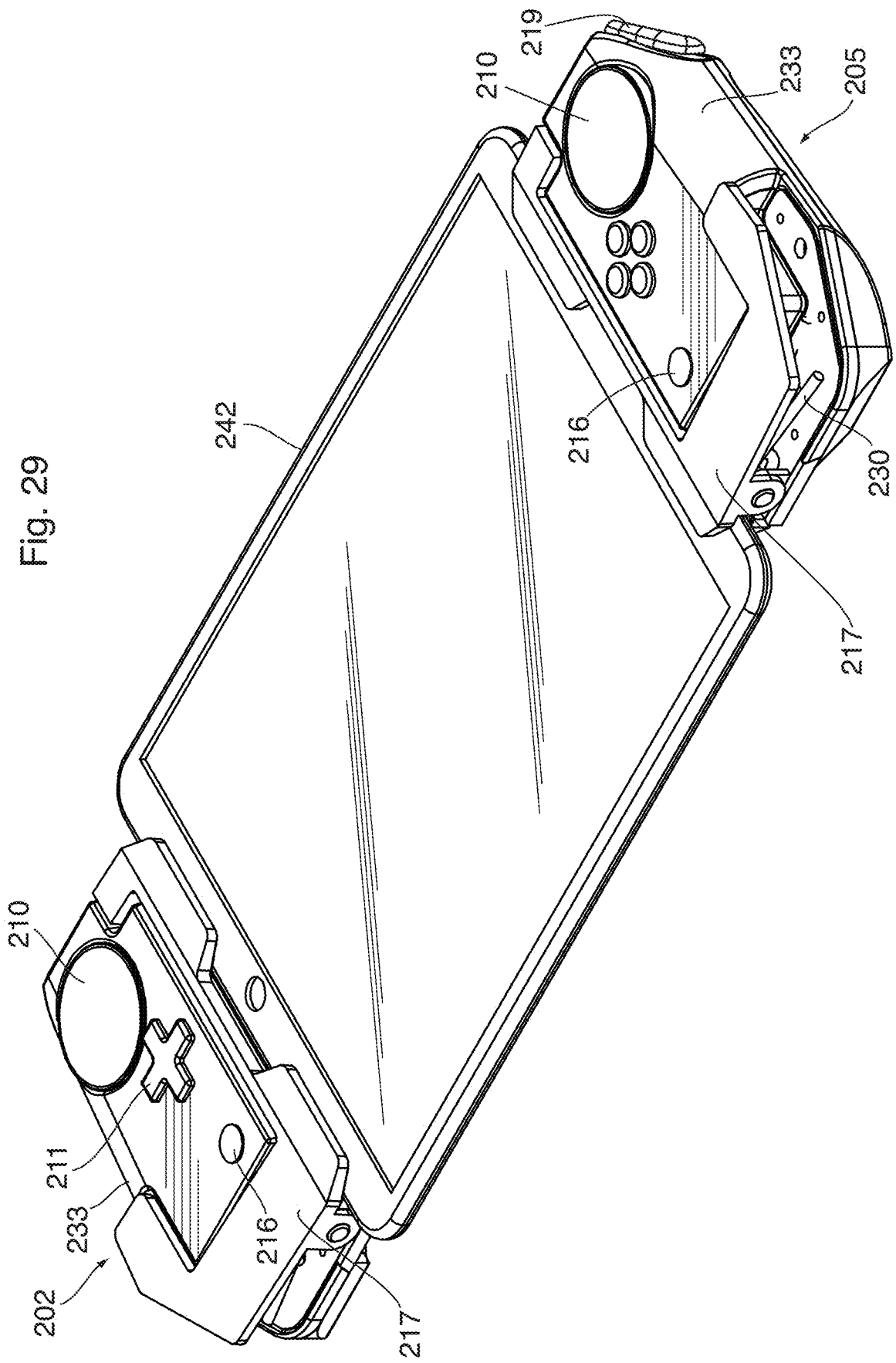
FIG. 29 is a perspective view of the Universal Controller/Console of FIG. 24 clamped on a tablet.
Figure 30:
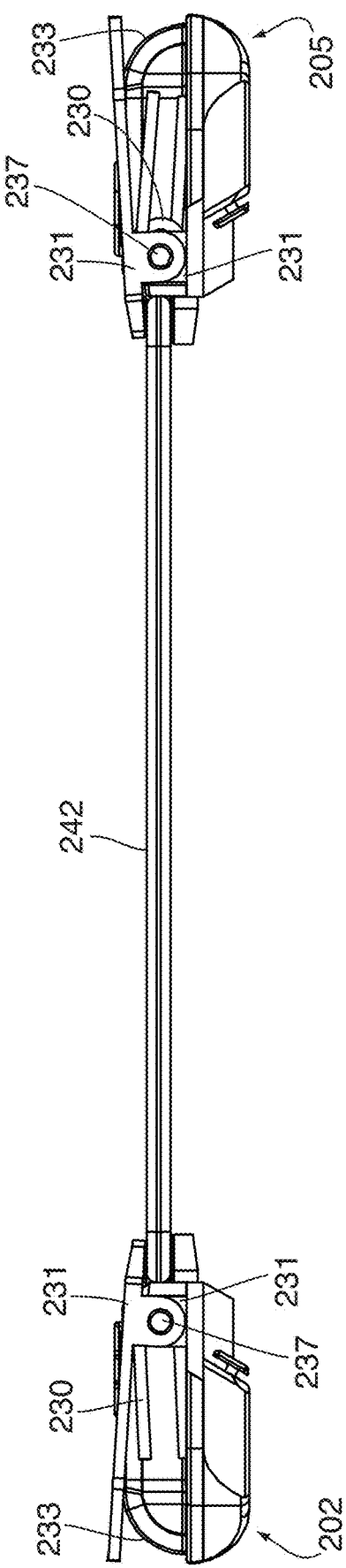
FIG. 30 is a bottom view of the Universal Controller/Console of FIG. 24 clamped around a tablet.

FIGS. 28, 29 and 30 show the Universal Game Controller/Console clamped to a tablet 242.

Figure 31:
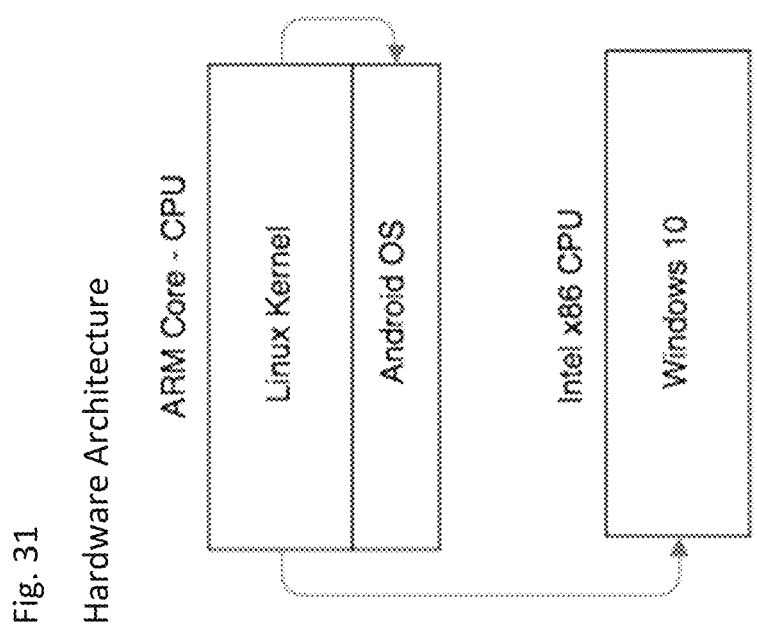
FIG. 31 is a block diagram of an embodiment of a hardware architecture of the Universal Controller/Console of FIG. 17.

FIG. 31 describes the hardware architecture of the Universal Game Controller/Console. The Universal Game Controller/Console is powered with ARM™ and x64/86 architecture-based CPUs or ARM™ core CPU which is capable of handling up to both x64-86 and A64 instruction set to support Linux, Android and Windows™ family operating systems. The Linux kernel supports both Android and Windows™ in order to play all games across all gaming languages.

Custom Linux Kernel

The OS (operating system) for this device is based on a Linux kernel modified on the basis of standard Linux customization procedures. Linux is an open-resource OS and supports diverse valuable applications packages and device drivers. Linux is a layer-based OS. Application is on the top layer and sends a request to the next layer. A typical Linux OS is written in C, requests OS services through library calls. The library of the Linux OS was developed and a library call graph made. This library call graph is a directed graph which represents a program's static structure.

When a Linux system is booted, the Linux boot loader (LILO) loads the kernel. When called by LILO, the kernel is decompressed, the display device is initiated, and the kernel starts checking for hardware in which the system is attached. As it finds hardware devices, it loads kernel modules to provide support for these devices. Once hardware support is loaded, the kernel mounts the root (/) filesystem as read-only. If no problems are detected in /, the root filesystem is mounted as read-write.

Android OS Customization

Android is an open source software stack for a wide range of mobile devices and a corresponding open source project led by Google. The Android OS for the Universal Game Controller/Console of the present invention is a customized version of Android Operating System. Hardware Abstraction Layer and Application Layer is customized to the Universal Game Controller/Console.

Figure 32:
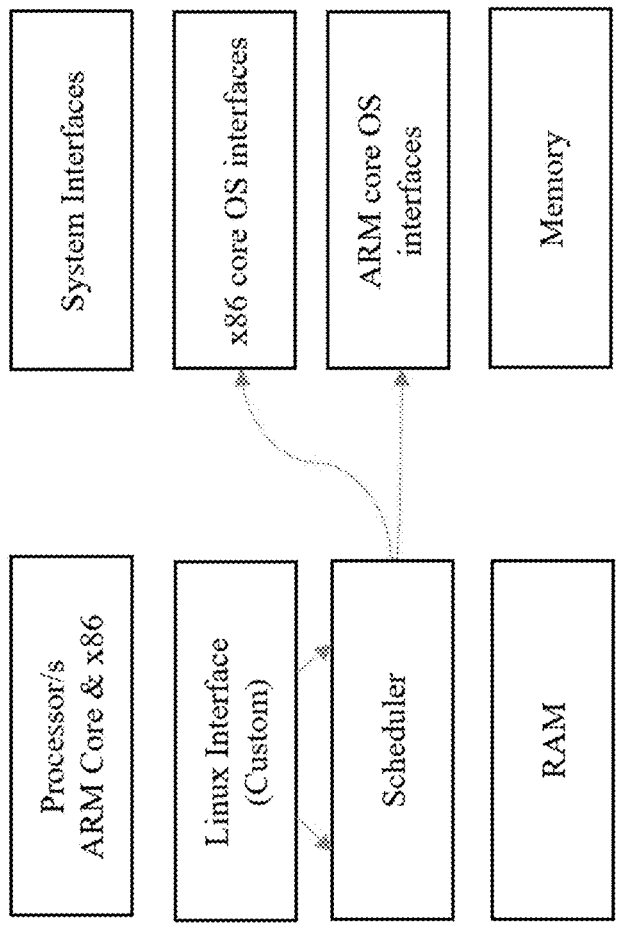
FIG. 32 is a block diagram of an embodiment of a hardware instruction set architecture of the Universal Controller/Console of FIG. 17.

FIG. 32 In order to support both Windows and Android/Linux OS, the Universal Game Controller/Console has ARM™ Core architecture-based Processor and x86 architecture-based controller. A firmware scheduler sits with the architecture processors of ARM and X86/X64. The scheduler is responsible for automatically switching the architecture and signalling the operating system when it detects a specific game engine (Open GL, Vulkan, SDL, SlimDX, DirectX, Unity, SIO2, Unreal, and Cocos2D). This enables the Universal Game Controller/Console to support all gaming engines. The hardware architecture of the Universal Game Controller/Console has the following interfaces to allow dual boot capabilities with dual OS functions: ARM™ processor (version 8 or higher) and x86/x64 architecture.

ARM™ CORE V8. The ARM architecture has evolved significantly since its introduction, and ARM continues to develop it. ARMv8 introduces major changes to the ARM architecture, while maintaining a high level of consistency with previous versions of the architecture. In ARMv8 the possible instruction sets depend on the Execution state; AArch64 state supports only a single instruction set, called A64. This is a fixed-length instruction set that uses 32-bit instruction encodings. From ARMv8.2, an implementation of the ARMv8.0 Cryptographic Extension can include either or both of: The AES functionality, including support for multiplication of 64-bit polynomials. The ID_AA64ISAR0_EL1.AES field indicates whether this functionality is supported. The SHA1 and SHA2-256 functionality. The ID_AA64ISAR0_EL1.{SHA2, SHA1} fields indicate whether this functionality is supported. ARM's Advanced Microcontroller Bus Architecture (AMBA) has the following 3 buses; AHP (Advanced High-performance Bus), ASB (Advanced System Bus), APB (Advanced Peripheral Bus). When an instruction is decoded inside the ARM core and how a particular instruction is executed by interacting with the internal registers file and then send result out of the registers. When an instruction set is sent to the ARM architecture it is decoded for its parts and data inside of the ARM core, then the particular data that is needed is executed by interacting with all parts of the ARM architecture core and sends the results to the top level operating system.

x86 & x64 Architecture. The x86 architecture is an instruction set architecture (ISA) series for computer processors. x86 architecture defines how a processor handles and executes different instructions passed from the operating system (OS) and software programs. The x86 architecture primarily handles programmatic functions and provides services, such as memory addressing, software and hardware interrupt handling, data type, registers and input/output (I/O) management. Classified by bit amount, the x86 architecture is implemented in multiple microprocessors, including 8086, 80286, 80386, Core 2, Atom and the Pentium series. Additionally, other microprocessor manufacturers, like AMD and VIA Technologies, have adopted the x86 architecture. The x86 architecture has 8 General-Purpose Registers (GPR), 6 Segment Registers, 1 Flags Register and an Instruction Pointer. 64-bit x86 has additional registers. The x64 architecture is a backwards-compatible extension of x86. It provides a legacy 32-bit mode, which is identical to x86, and a new 64-bit mode. x64 extends x86's 8 general-purpose registers to be 64-bit, and adds 8 new 64-bit registers. The 64-bit registers have names beginning with "r", so for example the 64-bit extension of eax is called rax. The new registers are named r8 through r15.

The addressing modes in 64-bit mode are similar to, but not identical to, x86.

Instructions that refer to 64-bit registers are automatically performed with 64-bit precision. (For example mov rax, [rbx] moves 8 bytes beginning at rbx into rax.)

A special form of the mov instruction has been added for 64-bit immediate constants or constant addresses. For all other instructions, immediate constants or constant addresses are still 32 bits.

X64 provides a new rip-relative addressing mode. Instructions that refer to a single constant address are encoded as offsets from rip. For example, the mov rax, [addr] instruction moves 8 bytes beginning at addr+rip to rax.

Figure 33:
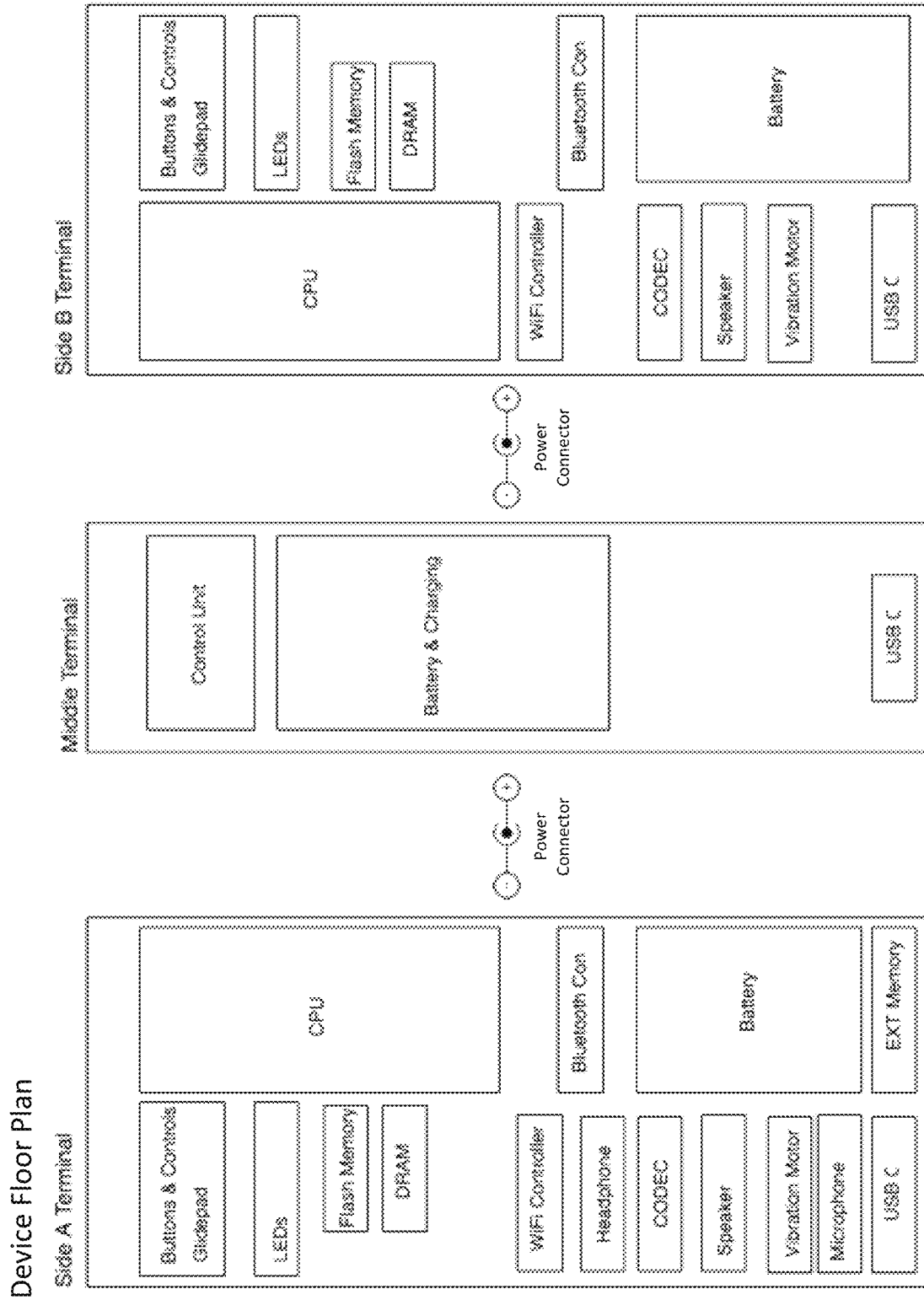
FIG. 33 is a high-level block diagram an embodiment of a device floor plan of the Universal Controller/Console of FIG. 17.

FIG. 33 shows the floor plan of the Universal Game Controller/Console which outlines all separated components within the Universal Game Controller/Console. The Side A Terminal shows the floor plan for the right side controller/console 202, the Side B Terminal shows the floor plan for the left side controller/console 205 and the Middle Terminal shows the floor plan for the middle battery 218.

In an embodiment of the invention there is a speaker (not shown) in the right side and a speaker in the left side of the controller/console in order to hear the sounds of the games, but it is understood that modifications may be made including using one or more than two speakers and placement of one or both sides. The volume control of the device may be a volume rocker switch or other volume control button (not shown). The volume switch can integrate dual functionality with another required control of the device, for example, a long press of the UP control will invoke some other functionality in the device. Vibration intensity may also be controllable through this rocker switch.

The game control buttons are the main buttons that are used to play the games on the Universal Game Controller/Console. Side B has four action Buttons (A, B, X, Y) and Side A has Arrow Buttons (All 4 directions ←↑→↓). Side A and B each have a Glide Pad (Cirque (CRQ) Glide Pad) (Haptic Feedback comes with the controller). However, it is understood that game buttons and trigger buttons may be changed or modified.

Eccentric Rotating Mass vibration motors, also commonly known as ERMs or pager motors are extremely popular in smart phones and may be included in the Universal Game Controller/Console to add to the enjoyment of games that may be played using the Universal Game Controller/Console.

Wireless technology is used in both the right and left sides of the Universal Game Controller/Console. The wireless technology is used to create an intranet system between Side A and Side B. This is used to share gaming data and inputs of the buttons and controllers in order to seamlessly play a game. For example, a CC2640 device, a wireless MCU targeting Bluetooth application, may be used to provide wireless technology. The devices are members of the CC26xx family of cost-effective, ultralow power, 2.4-GHz RF devices. Very low active RF and MCU current and low-power mode current consumption provide excellent battery lifetime and allow for operation on small coin cell batteries and in energy-harvesting applications.

The CC2640 device contains a 32-bit ARM Cortex-M3 processor that runs at 48 MHz as the main processor and a rich peripheral feature set that includes a unique ultralow power sensor controller. This sensor controller is ideal for interfacing external sensors and for collecting analog and digital data autonomously while the rest of the system is in sleep mode. Thus, the CC2640 device is ideal for a wide range of applications where long battery lifetime, small form factor, and ease of use is important.

The Bluetooth Low Energy controller is embedded into ROM and runs partly on an ARM Cortex-MO processor. This architecture improves overall system performance and power consumption and frees up flash memory for the application. The CC2650 device is a wireless MCU targeting Bluetooth, ZigBee® and 6LoWPAN, and ZigBee RF4CE remote control applications. The device is a member of the CC26xx family of cost-effective, ultralow power, 2.4-GHz RF devices. Very low active RF and MCU current and low-power mode current consumption provide excellent battery lifetime and allow for operation on small coin cell batteries and in energy-harvesting applications. The CC2650 device contains a 32-bit ARM Cortex-M3 processor that runs at 48 MHz as the main processor and a rich peripheral feature set that includes a unique ultralow power sensor controller. This sensor controller is ideal for interfacing external sensors and for collecting analog and digital data autonomously while the rest of the system is in sleep mode. Thus, the CC2650 device is ideal for applications within a whole range of products including industrial, consumer electronics, and medical.

The Bluetooth Low Energy controller and the IEEE 802.15.4 MAC are embedded into ROM and are partly running on a separate ARM Cortex-M0 processor. This architecture improves overall system performance and power consumption and frees up flash memory for the application.

Multi Point Connection/Networking

A network has to be established within the Bluetooth devices to help enable the connection be established simultaneously between multiple devices to take care of the communication in the Universal Game Controller/Console between side A and side B in addition to the communication with other devices. This is required since Bluetooth by technology has been a point to point connection since its inception. Technology such as Smart Mesh may be used which defines an interoperable mesh networking solution using Bluetooth Low Energy.

WiFi

Wi-Fi is a mode of connection in the Universal Game Controller/Console to connect to the internet. The IEEE 802.11 standard is acceptable for use in the controller/console. The desired requirements of the Wi-Fi chipset for the Universal Game Controller/Console are:

Supports common security modes
Integrated IPv4 TCP/IP stack with BSD socket APIs for simple Internet connectivity with any MCU
802.11b/g/n integrated radio
Ultra-low leakage
Good power management
Ultra-low power consumption
Energy efficient when inactive or Enter low-power deep sleep
Receiver sensitivity and selectivity
Compliance with worldwide radio regulations
Good temperature profile/Thermal management
Minimum external components for the chip
ESD tolerance
Minimum antenna footprint on the pcb
Tools and Development support
Easier upgrades to Bluetooth version 5
RoHS compliant chip
Sufficient production inventory considering future production The CC3100MOD integrates all protocols for Wi-Fi and Internet, which greatly minimizes host MCU software requirements. With built-in security protocols, the CC3100MOD solution provides a robust and simple security experience. Additionally, the CC3100MOD is a complete platform solution. The Wi-Fi network processor subsystem features a Wi-Fi Internet-on-a-Chip and contains an additional dedicated ARM MCU that completely off-loads the host MCU. This subsystem includes an 802.11 b/g/n radio, baseband, and MAC with a powerful crypto engine for fast, secure Internet connections with 256-bit encryption. The CC3100MOD module supports Station, Access Point, and Wi-Fi Direct modes. The module also supports WPA2 personal and enterprise security and WPS 2.0.

Low-Power Consumption at 3.6 V
  Hibernate With Real-Time Clock (RTC): 7 µA
  Standby: 140 µA
  RX Traffic: 54 mA at 54 OFDM
  TX Traffic: 223 mA at 54 OFDM The Wi-Fi network processor subsystem features a Wi-Fi Internet-on-a-Chip and contains an additional dedicated ARM MCU that completely offloads the applications MCU. This subsystem includes an 802.11 b/g/n radio, baseband, and MAC with a powerful crypto engine for fast, secure Internet connections with 256-bit encryption. The CC3200 device supports Station, Access Point, and Wi-Fi Direct modes. The device also supports WPA2 personal and enterprise security and WPS 2.0. The Wi-Fi Internet-on-a-chip includes embedded TCP/IP and TLS/SSL stacks, HTTP server, and multiple Internet protocols.

Accelerometer

An accelerometer may be included on one or both sides of the controller/console for game movements based on the movements detected in the controller/console. The BMI 160 is a highly integrated, low power inertial measurement unit that provides precise acceleration and angular rate (gyroscopic) measurement. The BMI 160 integrates 16 bit digital triaxial accelerometer and 16 bit digital triaxial gyroscope.

Battery Monitor

A battery cell protection device may be included in each of the left side controller/console, right side controller/console and middle battery. For example, a bq2970 battery cell protection device may be used since it provides an accurate monitor and trigger threshold for overcurrent protection during high discharge/charge current operation or battery overcharge conditions. The bq2970 device provides the protection functions for Li-Ion/Li-Polymer cells, and monitors across the external power FETs for protection due to high charge or discharge currents. In addition, there is overcharge and depleted battery monitoring and protection. These features are implemented with low current consumption in NORMAL mode operation.

USB Connector

Each of the left side controller/console, right side controller/console and middle battery have a USB port and TE Connectivity Splashproof Micro USB 3.1 Type C Connectors protect consumer products from water and dust by sealing gaps around the opening and inside the connector shell. These new TE IP 54 splashproof micro USB connectors with sealing gasket feature the best protection and optimized user performance without sacrificing size. With dimensions of 8.2×5×3.8 mm, these splashproof connectors are only slightly larger than their non-splashproof counterparts.

Microphone

The Universal Game Controller/Console may have a microphone which may be an omnidirectional microphone with a frequency range 50-15,000 cycles. The microphone gain can be adjusted from −16 dB to 30 dB.+. Audio recorded from the microphone is presented as a stereo data stream with the same data appearing on both the left and right channels.

Audio Jack 3.5 MM

The Universal Game Controller/Console may have an audio jack. A phone connector, also known as phone jack, audio jack or jack plug, is a common family of connector typically used for analog signals, primarily audio. It is cylindrical in shape, typically with two, three, four and, recently, five contacts.

Internal & Extended Memory

The Universal Game Controller/Console has internal memory, for example 64GB of internal memory and supports external memory for example through a Micro SD Card slot which is compatible with microSD/microSDHC/microSDXC memory cards.

Figure 34:
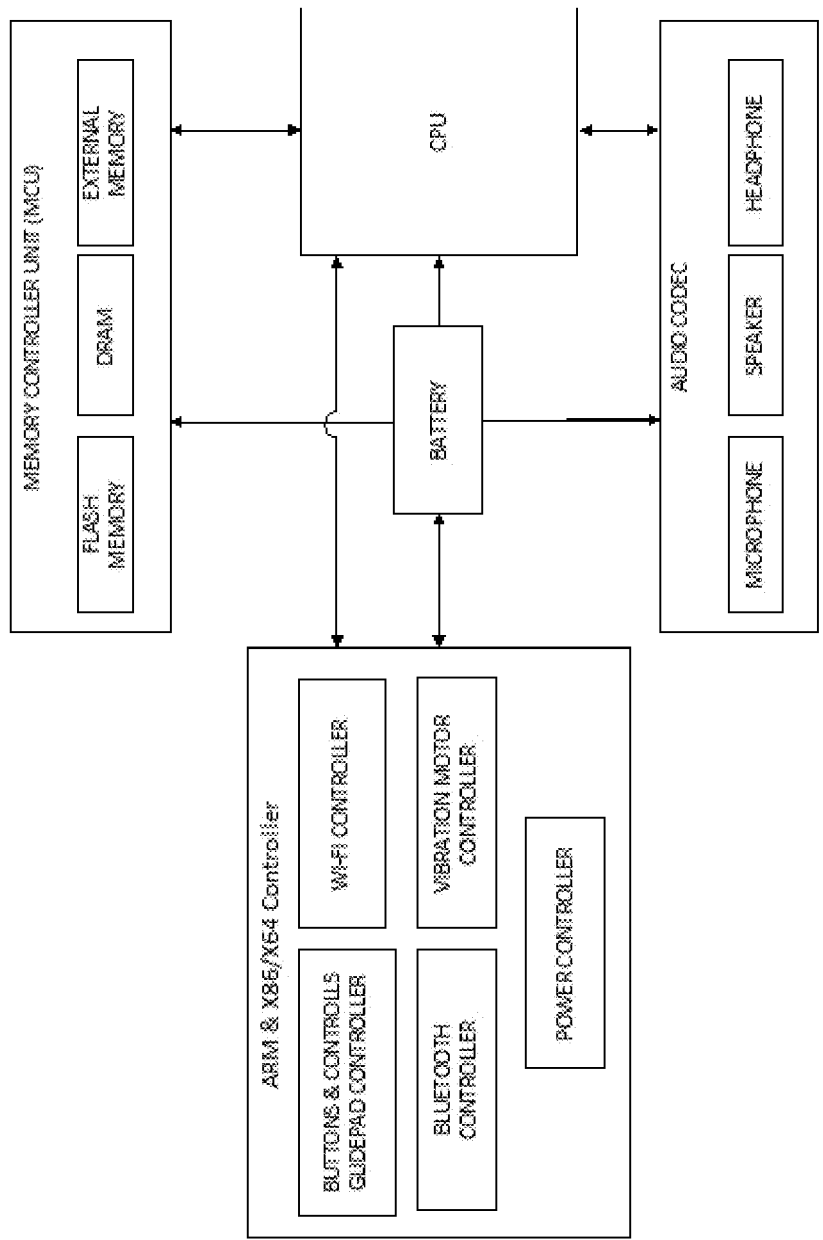
FIG. 34 is a functional block diagram of an embodiment of a memory and battery controller of the Universal Controller/Console of FIG. 17.

FIG. 34 describes how the Memory Controller Unit, ARM Controller and X86/X64, Audio CODEC is controlled by CPU and how power consumption by all the components is managed by ARM and X86/X64 Controller which is dependent on the CPU Power management unit. This is replicated in both Side A and Side B 202, 205.

Side A & Side B 202, 205 of the Universal Game Controller/Console may communicate with each other by the following means:

Wi-Fi: Device to Device (D2D) communications facilitate proximal devices to directly communicate with each other in the ISM (Industrial, Scientific & Medical) frequency band, bypassing cellular network or access points, and bring many benefits such as improvement in both spectral efficiency and energy efficiency. Among existing D2D enabling techniques, WiFi offers high data rate D2D communications in local areas.

Bluetooth: Because Bluetooth uses radio waves, Bluetooth devices can communicate with each other without line-of-sight. The Bluetooth standard is part of the IEEE 802.15 family of standards for wireless personal area networks (PANs). Both Side A and B of the Universal Game Controller/Console have Bluetooth wireless transceivers and control functions are embedded in a microchip. When switched on, both Side A & B Bluetooth devices find each other by transmitting a message which alerts other Bluetooth devices in the vicinity.

The middle battery 218 terminal connects with Side A & Side B.

Figure 35:
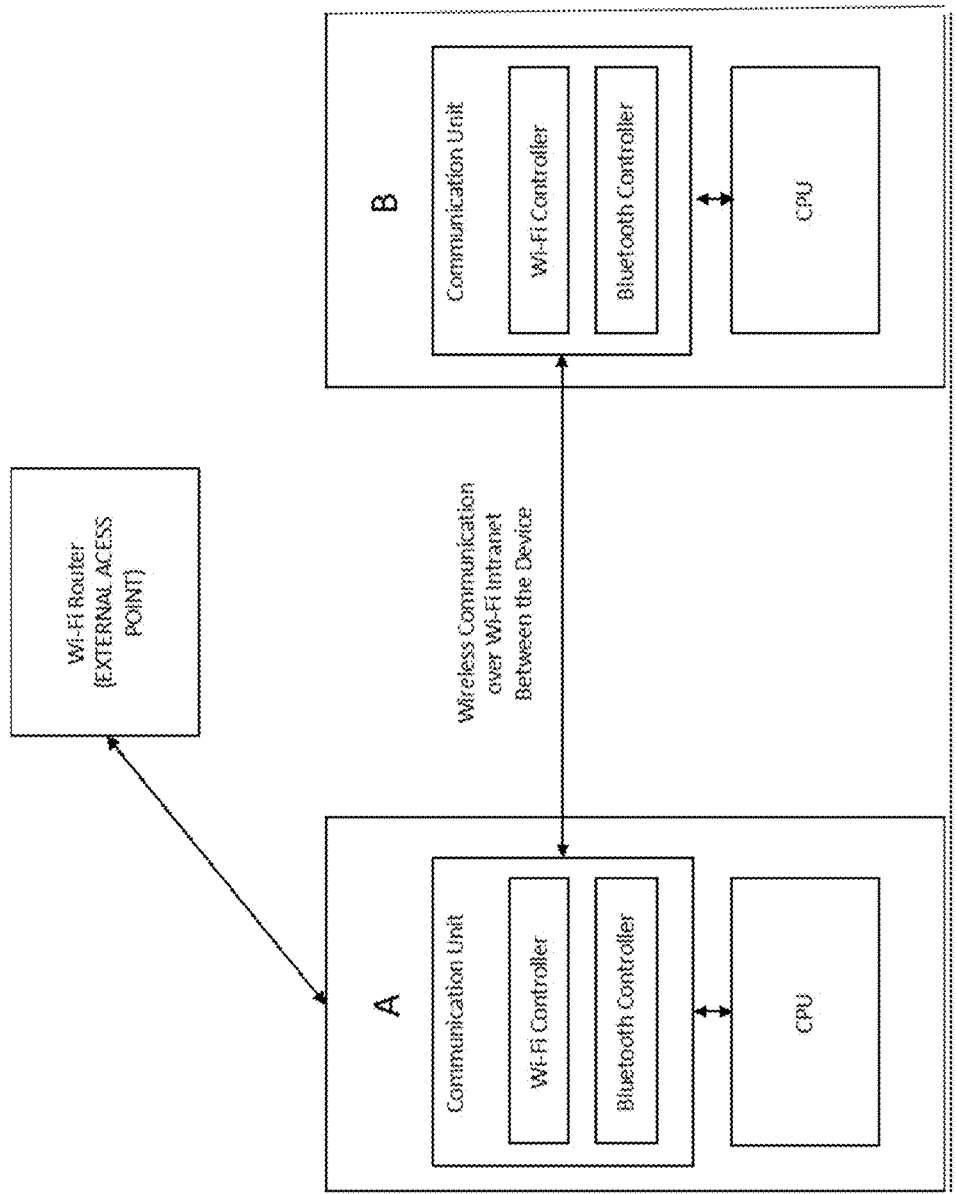
FIG. 35 is a high-level block diagram of an embodiment of a communication network between a Wi-Fi router and Side A, as well as the connectivity between Side A and Side B Terminal of the Universal Controller/Console of FIG. 17.

FIG. 35 shows that the Communication Unit is responsible for setting up Side A Terminal to Side B Terminal communication for game play and syncing Side A Terminal to Side B Terminal s. This occurs though Wi-Fi and Bluetooth Protocol communication. The Wi-Fi module in Side A Terminal can connect to the external access point or Router for Internet communication. Side A Terminal connects to Side B for creating an internal intranet connectivity that allows both Terminals to communicate simultaneously with each other. This then creates data sharing over wi-fi and Bluetooth with Device to Device communication for seamless game play.

Figure 36:
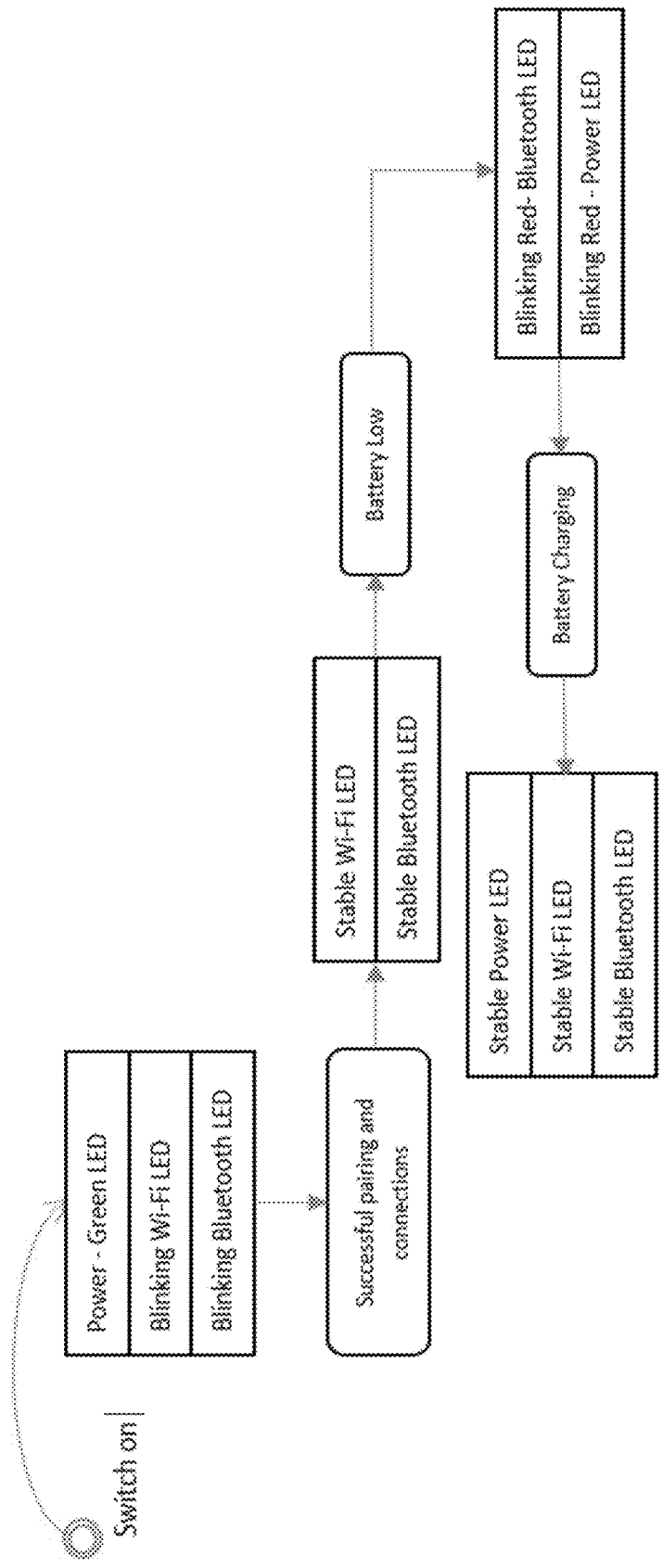
FIG. 36 is a high-level block diagram an embodiment of LED signals of the Universal Controller/Console of FIG. 17.

FIG. 36 describes the Universal Game Controller/Console LED drivers and uses. There are LEDs within the Universal Game Controller/Console and an LED about the midpoint of the middle Battery 218. This may be multi-colored to indicate the battery life of the middle battery. An LED driver is a chip to regulate the power to an LED. An LED driver responds to the changing needs of the LED, or LED circuit, by providing a constant quantity of power to the LED as its electrical properties change with temperature. An LED driver is a self-contained power supply which has outputs that are matched to the electrical characteristics of the LED or LEDs. LED drivers may offer dimming by means of pulse width modulation circuits and may have more than one channel for separate control of different LEDs or LED arrays.

Figure 37:
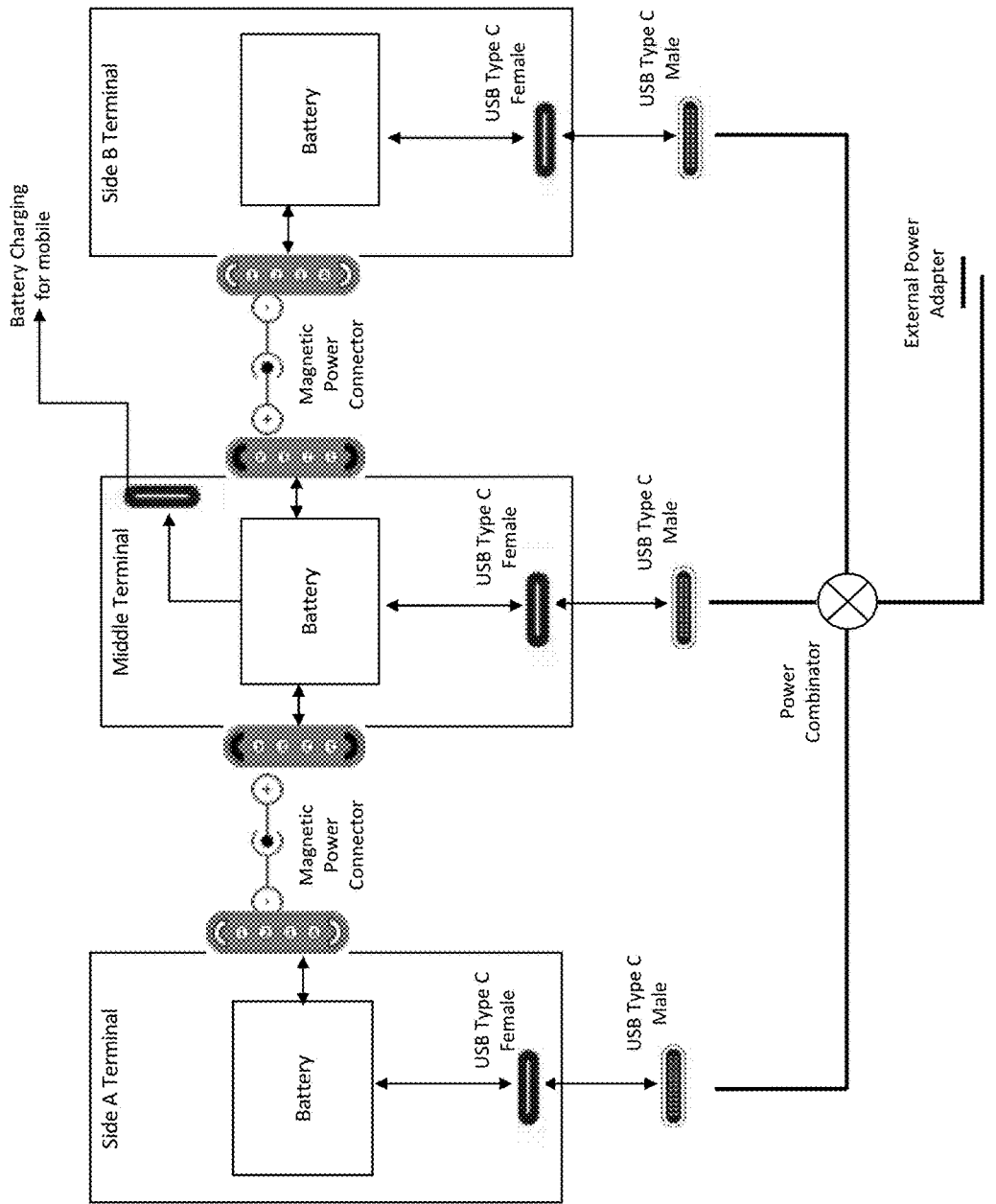
FIG. 37 is a block diagram of an embodiment of battery charging terminals of the Universal Controller/Console of FIG. 17.

FIG. 37 shows the Universal Game Controller/Console battery terminals. Lithium-Ion battery may be used in the right side controller/console 202, left side controller/console 205 and middle battery 218 with following specification:

| | |
|---|---|
| Rating | 4300-5000 mAh(Side A Terminal) |
| | 2000-3000 mAh(Side B Terminal) |
| | 2000-3000 mAh(Middle Terminal) |
| Life | Approximately 4-6.5 hours |
| | The battery life depends on the games played. High asset games consume more power and discharge battery quickly. |
| Charging Time | Maximum 3 hours when device is in Sleep mode. |

Middle Battery Module—Side A and Side B controller/consoles can be connected together through the middle Battery module for charging the Universal Game Controller/Console 200. The Middle Battery may have two functions:
1. The ability to add extended battery live to the Universal Game Controller/Console
2. The ability to charge user's phone or tablet A mobile phone or tablet may be plugged into the middle battery either when the middle battery is connected to the side A and side B controller/consoles or not. When the middle battery is connected to the left side and right side (through the magnetic power connectors) and is also connected to a device (mobile phone or tablet) through a cord, it provides charge to the left side and right side as well as the device, and does so either from the middle battery storage of charge or through the middle battery being plugged in at the time.

A triple connector cable with single charging adapter may be used with the Universal Game Controller/Console to charge the middle battery, left side and right side console/controller at the same time from an external power source. The merging and the power sharing and distribution is managed by both the power unit in the Terminals and cable combinator.

Figure 38:
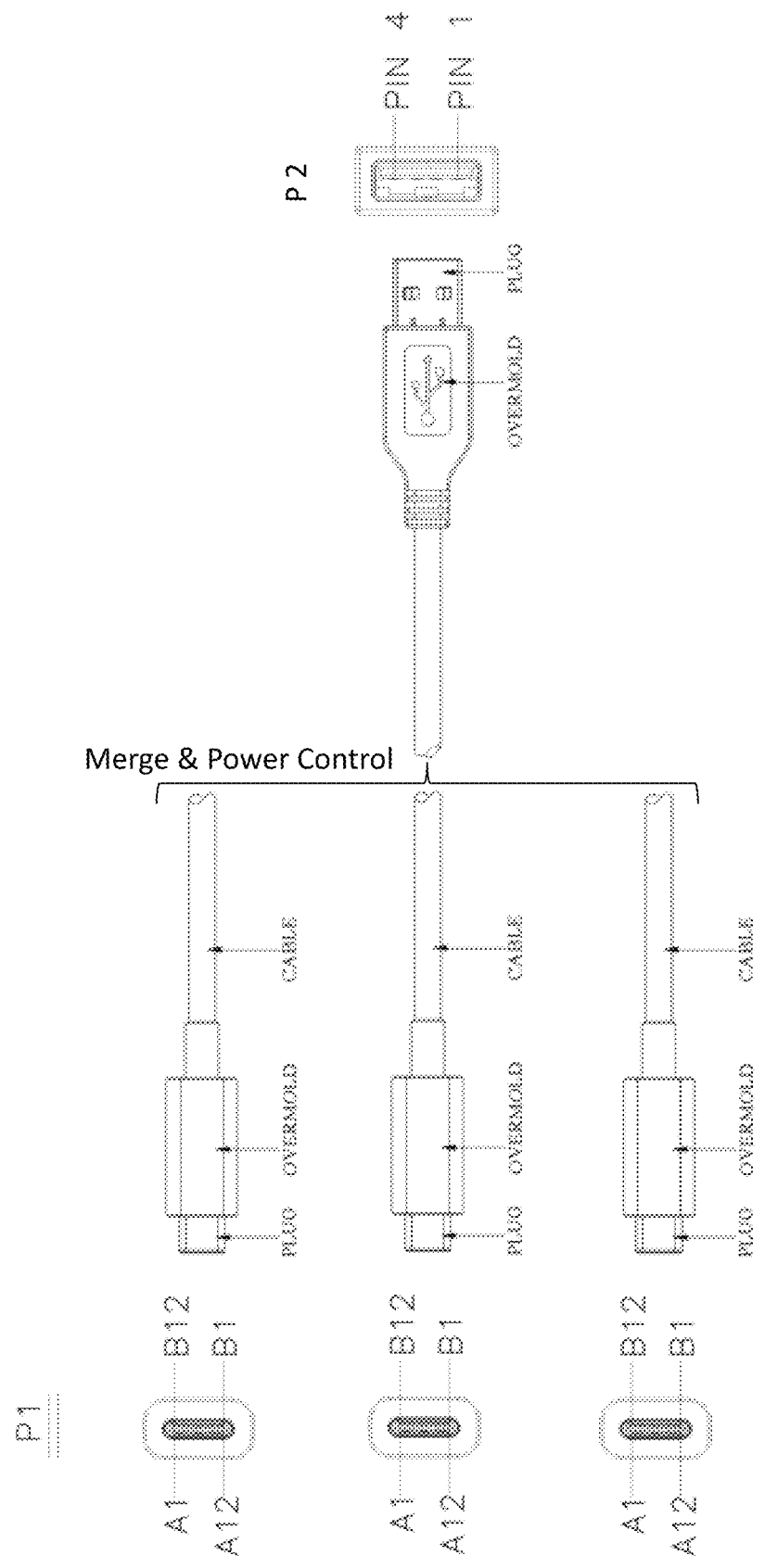
FIG. 38 is a schematic diagram of an embodiment of a USB charging cable.

FIG. 38 shows a Bi-Directional USB Type C Cable that merges into one single cable, which is connects to the power adapter for power source.

Figure 39:
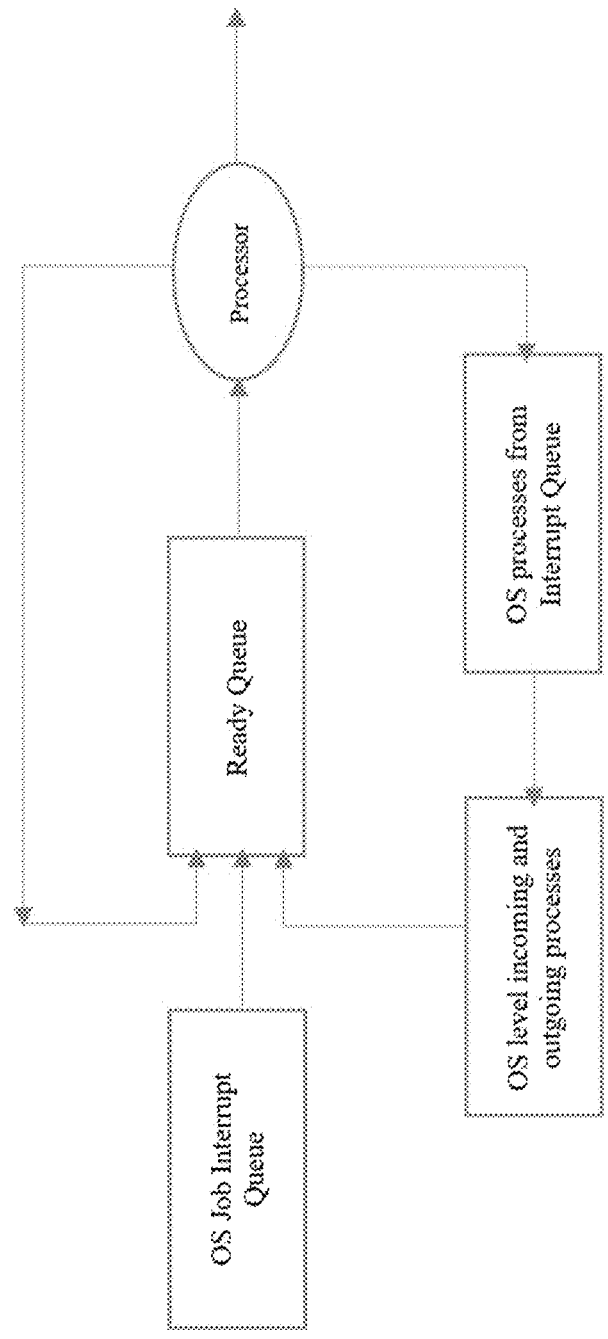
FIG. 39 is a flow chart of an embodiment of a firmware scheduler.

FIG. 39 is the firmware scheduler is of key importance in the interface in order to automatically switch between the two different OS. Based on the game chosen by the user a toggle key is included to automatically move from one architecture to the other (for example, ARM to X86/64 or X86/64 to ARM). Process scheduling is an essential part of a Multiprogramming operating systems. Such operating systems allow more than one process to be loaded into the executable memory at a time and the loaded process shares the CPU using time-based multiplexing.

The customized Linux OS maintains all process scheduling queues. The OS job queue keeps all processes in the system. The queue ready function keeps a list of all processes in the main memory which is ready and waiting for the queue. The processes which are waiting to be serviced will be queued again. The scheduler maintains the switch demand between the two different OS and also boot the OS accordingly based on user demand.

Data Acquisition Firmware

The Universal Game Controller/Console firmware consists of main programs and Interrupt Service Routines (ISR) to communicate with the peripherals including buttons, speakers, glide pad, LEDs, microphone etc. Wi-Fi and Bluetooth modules and also part of the firmware.

Figure 40:
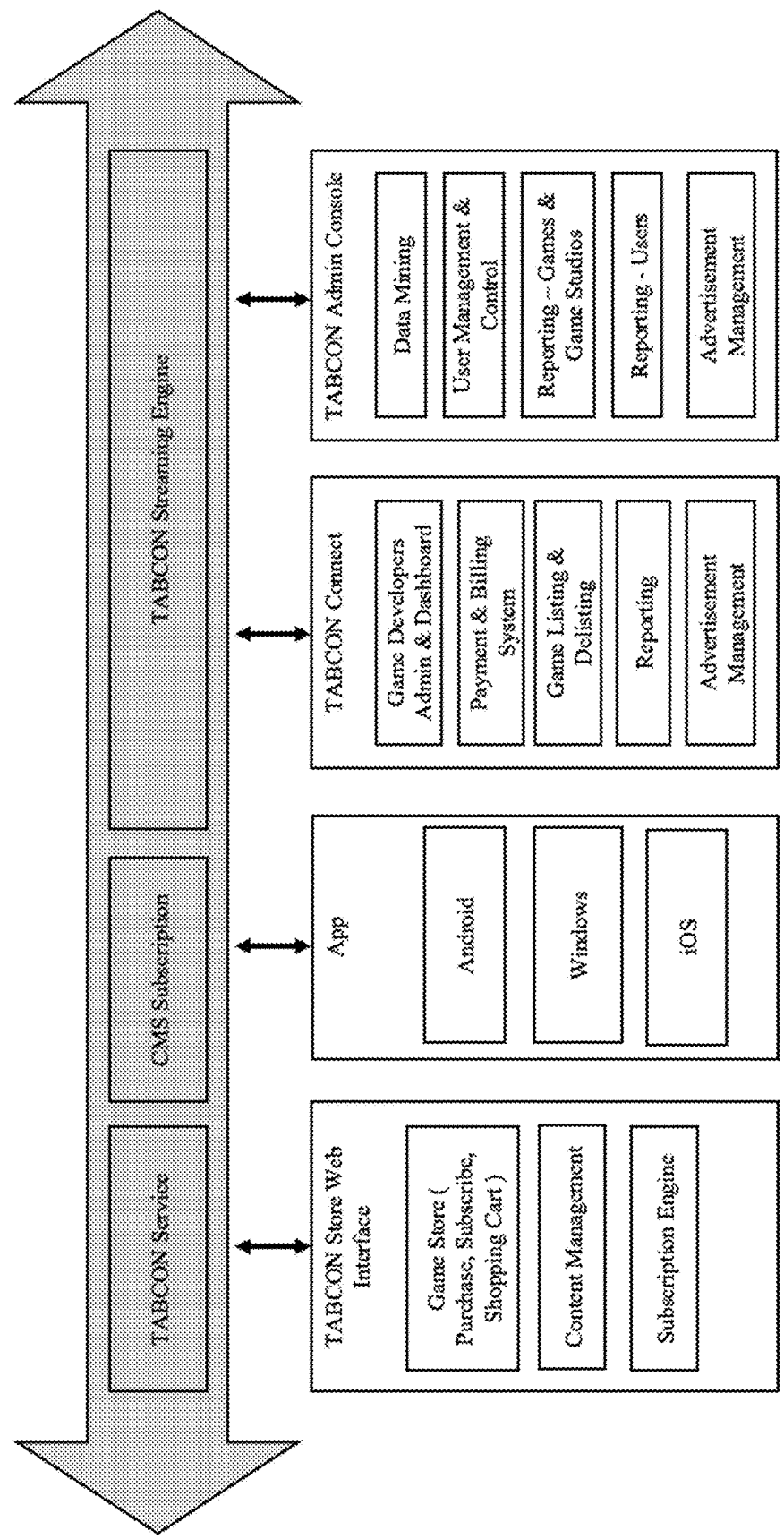
FIG. 40 is a chart of an embodiment of software services modules.
Figure 41:
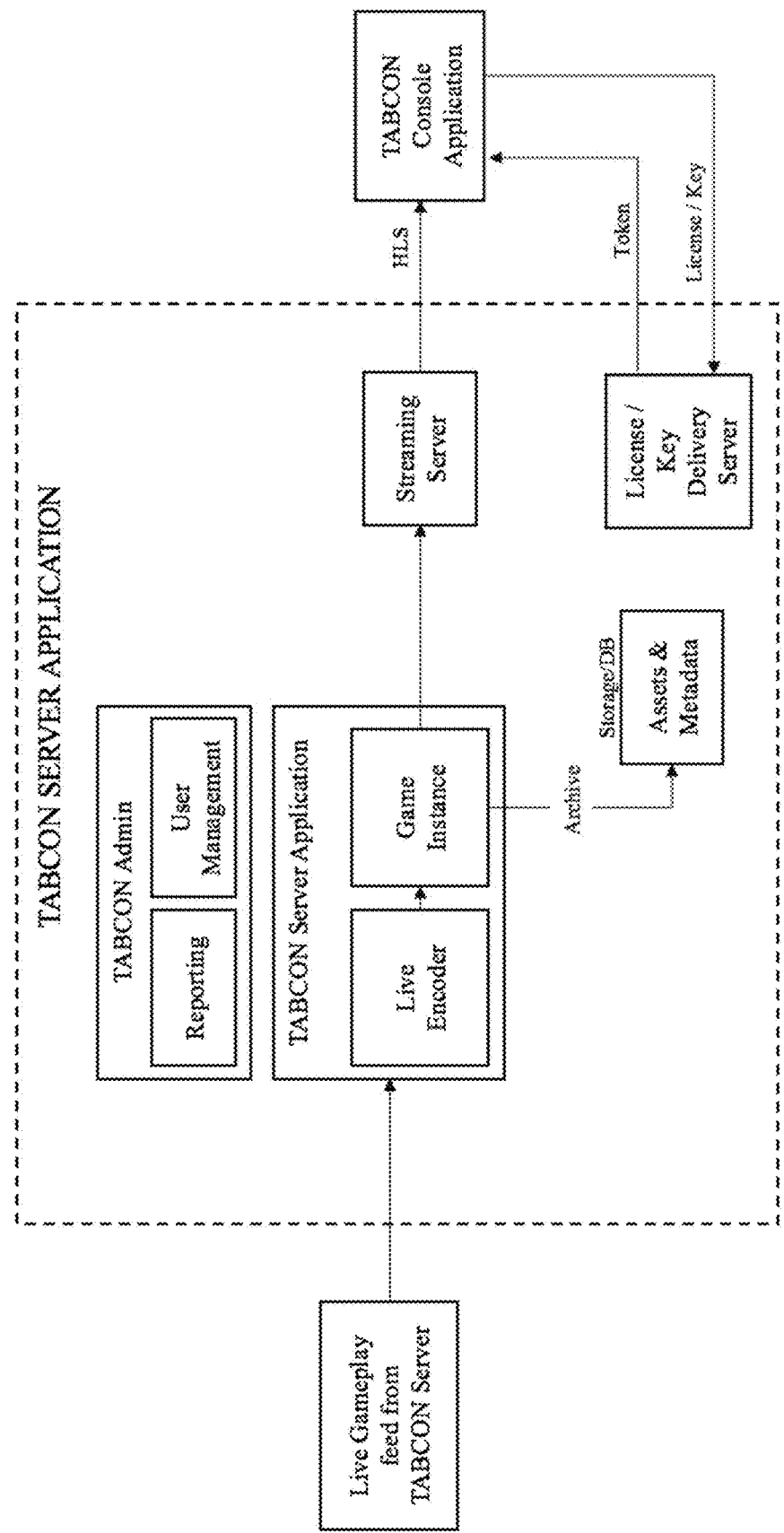
FIG. 41 is a flow chart of an embodiment of a server application.

FIG. 40 shows the Universal Game Controller/Console software services. The Serial Bus connection between the left and right controller/consoles 202, 205 enables the Bi-directional data exchange and communication. The Universal Game Controller/Console consists of the following software modules:
1. Service: A versioned web API service layer with core business logic is heart of the Universal Game Controller/Console system.
2. Streaming Service: To deal with all real time streaming needs of the Universal Game Controller/Console. The Game streaming engine is the backbone of the Cloud gaming/Gaming on demand service. Cloud gaming based on file streaming (progressive downloading) deploys a thin client in which the actual game is run on the Universal Game Controller/Console
3. App: Mobile app to showcase all available games, search and filter options, initiate game services for the subscriber are the core functionalities of the mobile app—and is available for iOS, Android and Windows.
The android app is the client app version of the Store Web Interface—user is able to login, see the available games, saved/purchased games, top games, either download or stream games to play, buy games etc. The application may encompass different areas for enhanced games which are available in the Cloud store. Top 10 Games, New/Updated Games, Popular Games, and Recommended for You, Try a Top Seller, From familiar faces, Adventure Games, New Game Releases categories can help users to pick right game for them.
4. Connect: Connect is a Web Interface for Game Developers to submit games, see sales dashboard, setup bank account, receive payments etc.
5. Web Interface: Web extension of the Mobile App-Games are available through a store either free of charge or at a cost. They can be downloaded directly to a Universal Game Controller/Console through the Store mobile app, or by deploying the game to a device from the store website. User can either download or stream games.
6. Admin Console: admin console may provide dashboard analytics features for the administrator and may provide data mining: collecting data from users and streamed & downloaded games etc.

FIG. 4I shows the server application. This diagram outlines how the Game play from the server interacts with the console application and is delivered to the User. The live game play feed from the server is sent to the server application which then does a live encoding of the game for graphics and data. The game instance is then sent to the console where the console takes the game token and renders the game within the dual architecture system analyzing the instruction set of the game for either ARM or X86/X64. Once the proper instruction set is picked the Assets and Metadata are stored within the server for further game play.

Figure 42:
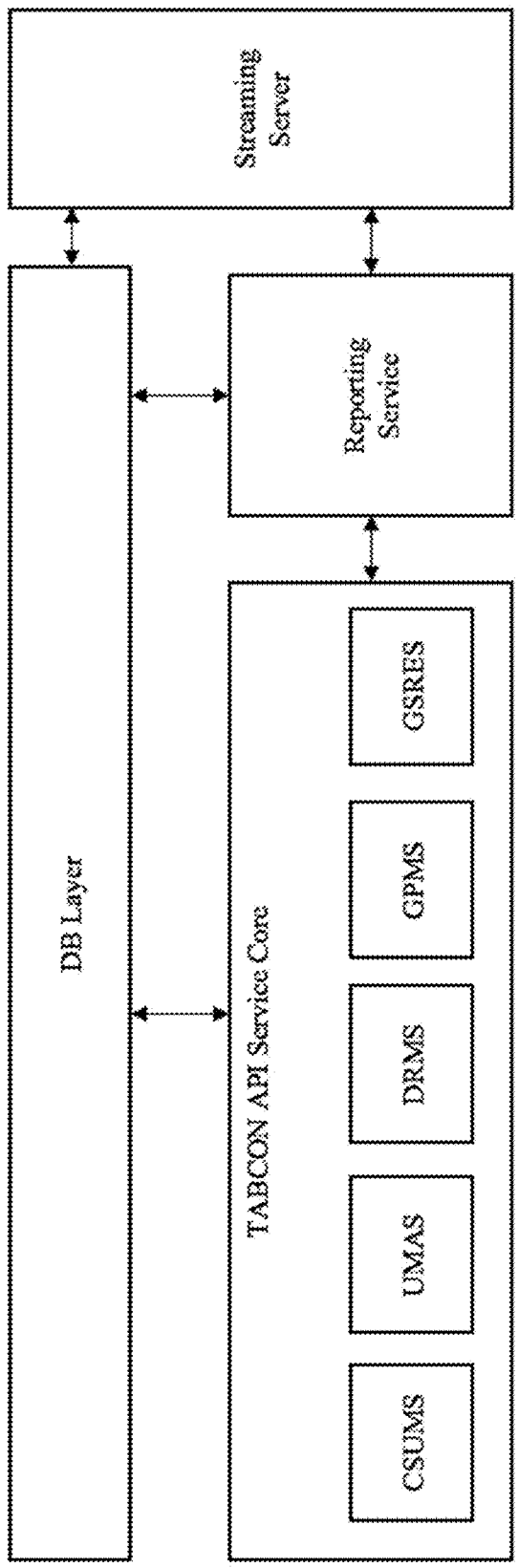
FIG. 42 is a schematic diagram of an embodiment of an API service core component.

FIG. 42 shows the API Service Core Components. REST Web service may provide all business logic behind the system used with the Universal Game Controller/Console (including algorithm for game listing, sorting, rating, suggestion mechanism etc.), developer and subscriber accounts/profile management, payment gateway integration and public APIs. REST stands for Representational State Transfer. There are separate REST APIs (POST/GET/PUT/PATCH/

DELETE) for the following core modules/functionalities. The API Service Core Components have data exchange process between Database (DB) to access and log the metadata of each individual users. The Reporting Service acts as an interface between streaming server and API Service Core to manage the process queues. The Streaming server process the data in DB layer to enable data storage.

Mobile Application

Mobile application is the interface between the user and controller which consumes the following services: CSUMS-DRMS-GSRES-GSMS-PMS.
1. Create/edit user profile
2. Pair with the Universal Game Controller/Console using PIN/Pass Key
3. List/Search/View Games using GSES
4. View GDP—Game Detail Page
5. Download games to phone
6. Sync-up downloaded games to the Universal Game Controller/Console using BT or Wi-Fi
7. Suggestions—"You may like" and "Customer also viewed" categories
8. Editorial—Marketing editorials and game content delivery services
9. Review/Rate the games
10. Direct connectivity with the Universal Game Controller/Console using Wi-Fi, for real time game streaming
11. Payment Integration—PMS
12. User side caching optimizes the performance iOS, Android and Windows 10 based universal mobile applications and any future OS may be used.

Admin Console

Admin console is the back office software interface providing dashboard analytics features for the administrator. AI based engine collects data from users and streamed & downloaded games etc and generates insights and analytics for the admin console.

Figure 43:
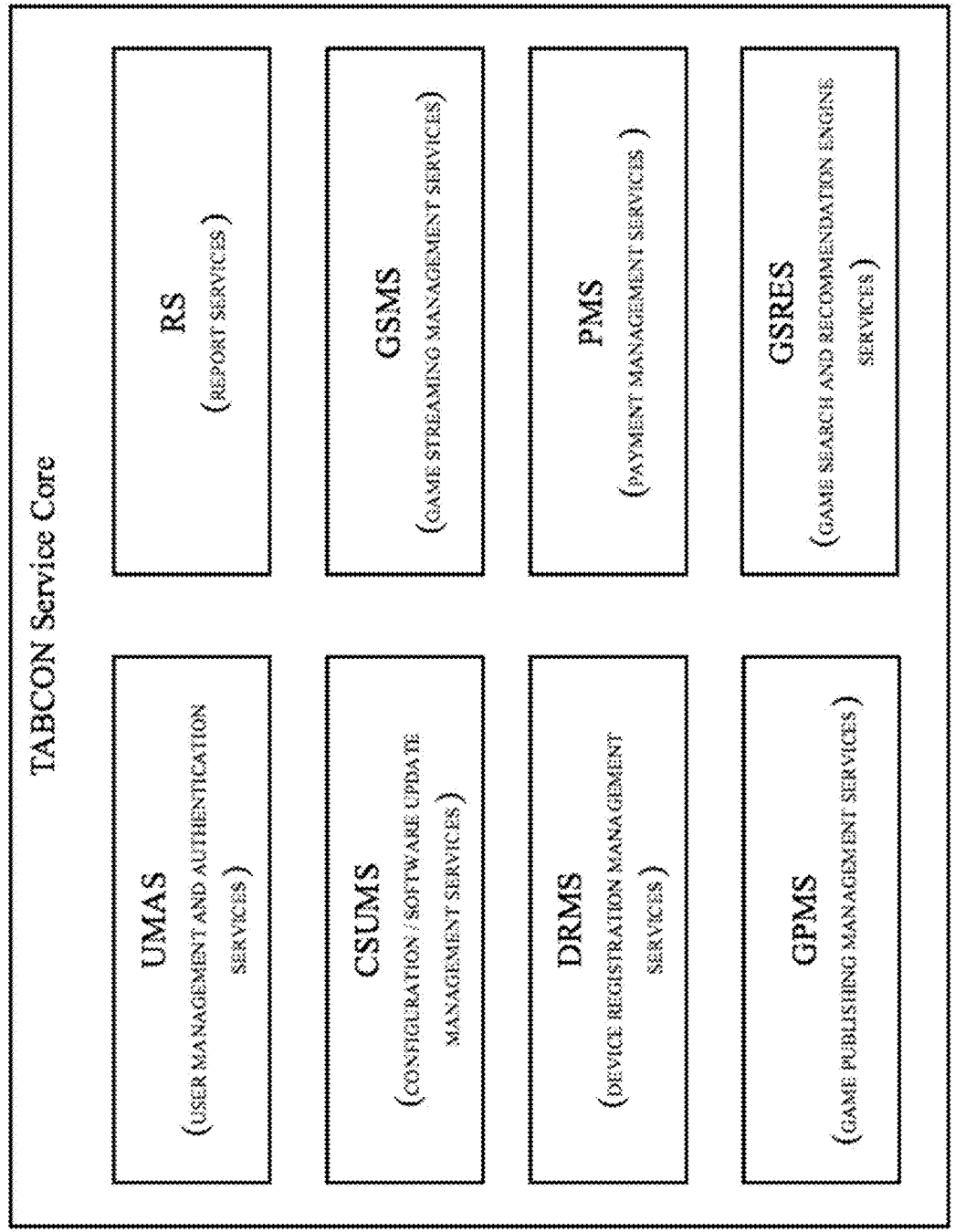
FIG. 43 is a core services chart of an embodiment of the invention.

FIG. 43 shows the Tabcon Service Core.

User Management and Authentication Services—UMAS

UMAS may have the following key functionalities:
1. Create user groups and privileges setting for different set of users—Admin, Publisher, Developer, End-User.
2. Register new users and assigning them to specific groups
3. Authenticating user login across different services and devices
4. Mange user profile information—basic user information, registered devices, saved payment methods, purchased games etc.

Following are APIs that may be used to handle user management, games and developer profile management.
SubscriberLogin
ManageProfile
SubscriberSignUp/CreateSubscriber
EditSubscriber
DeleteSubscriber
GetSubscriber
GetGameCategories
GetListOfGamesByCategory
GetListOfGamesByRating
GetListOfGamesByDeveloper
GetListOfGamesByCountry
GetGamesByDate
RaiseInvoice
Pay
GenerateReport
DeveloperLogin
CreateDeveloperAccount
EditDeveloperAccount
DeleteDeveloperAccount
SubmitGame
ManageGame
DeleteGame
DeveloperAccountDetails Configuration/Software Update Management Services—CSUMS CSUMS may have the following key functionalities:
1. Dynamic parameters configuration based on geographic location, time, model, version etc.
2. Check for the device firmware version updates required.
3. Device validation locking/unlocking based on certain parameters.

Device Registration Management Services—DRMS

DRMS may have the following key functionalities:
1. Device registration for first time configuration and after reset
2. Managing device/user specific configuration remotely Game Publishing Management Services—GPMS GPMS may have the following key functionalities:
1. Publishing games
2. Publisher profile management
3. Agreement/Payment Configuration
4. Game Static Content Management
5. Price management
6. Game review and approval process Game Search and Recommendation Engine Services—GSRES GSRES may have the following key functionalities:
1. Searching games based on name, keywords etc.
2. Algorithm for recommending "You may also like" and "Customer also viewed" categories Report Services—RS Report Service may have the following key functionalities:
1. Real time data for currently active sessions
2. Finance reports
3. Active user and transaction report
4. TC devices reports Game Streaming Management Services—GSMS GSMS Service may have the following key functionalities:
1. API's for initiating streaming with the Tabcon devices, IP-TV, Mobile Phones
2. Services/API's to support RTP/RTCP/HLS Payment Management Services—PMS PMS Service may have the following key functionalities:
1. Integration with Payment Aggregators
2. Manage User Subscriptions Connect Connect SDK is a core module which may help game developers to build and publish games for use with the Universal Game Controller/Console.

Connected Services—CSUMS-GSMS

SDK has "Must Implement" functions and as well as "Optional Functions"

If Game Developer shall share source code the Company supporting the system for the Universal Game Controller/Console, the code may be integrated with the Company's SDK and will be hosted in the Company's Game Server otherwise the game will be hosted in $3^{rd}$ Party/Game Developer's Game Server. In both cases, the Company shall have the full control of the subscription, payment and all other B2B (Business to Business) and B2C (Business to Client) aspects.

Game after implementing the "Must Implement" functions will become compatible with hardware "Must Implement" has function to validate game with server and also streaming support functions.

This SDK with user manual may be provided to the game publisher for integration

Figure 44:
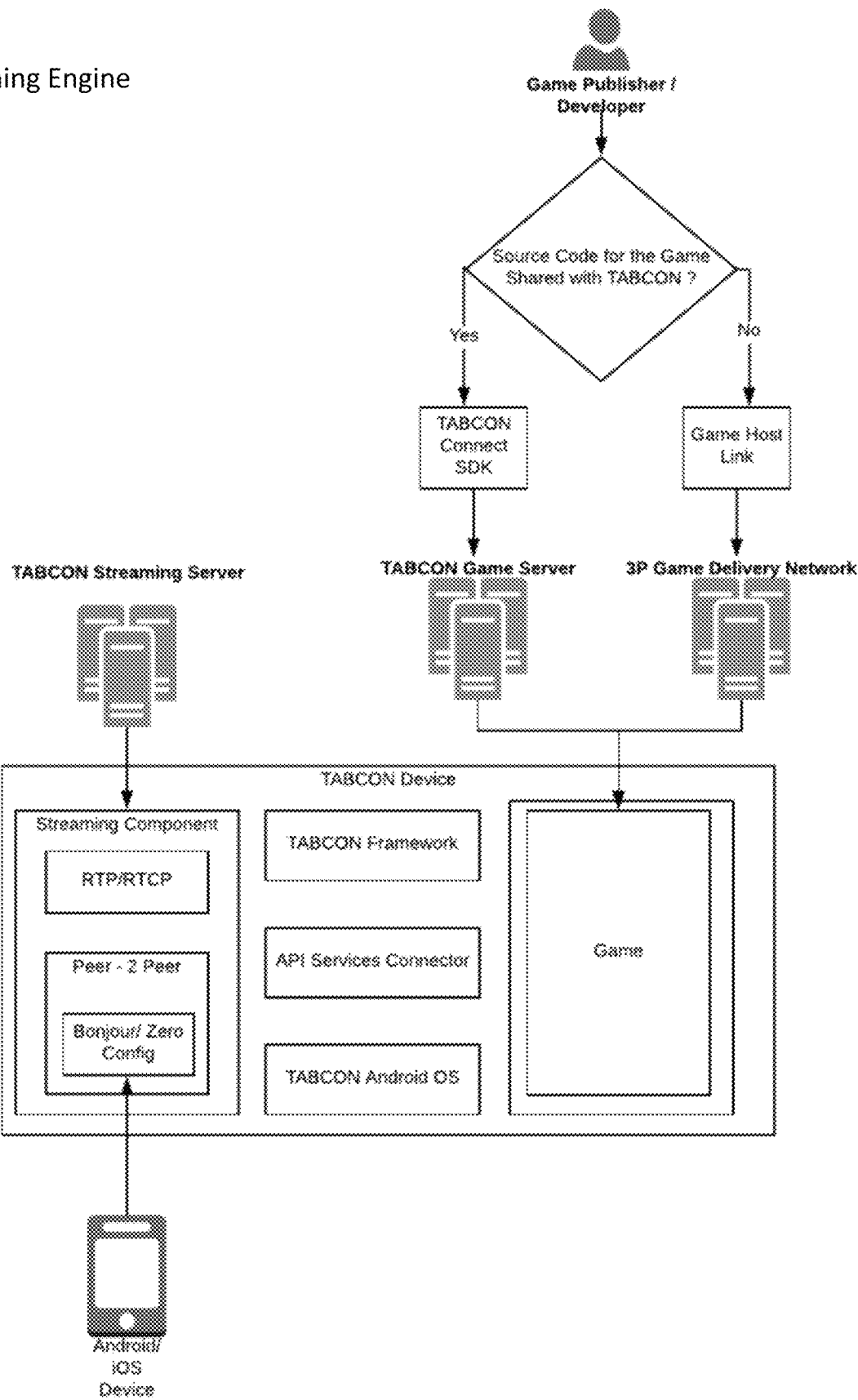
FIG. 44 is a streaming engine flow chart of an embodiment of the invention.
Figure 45A:
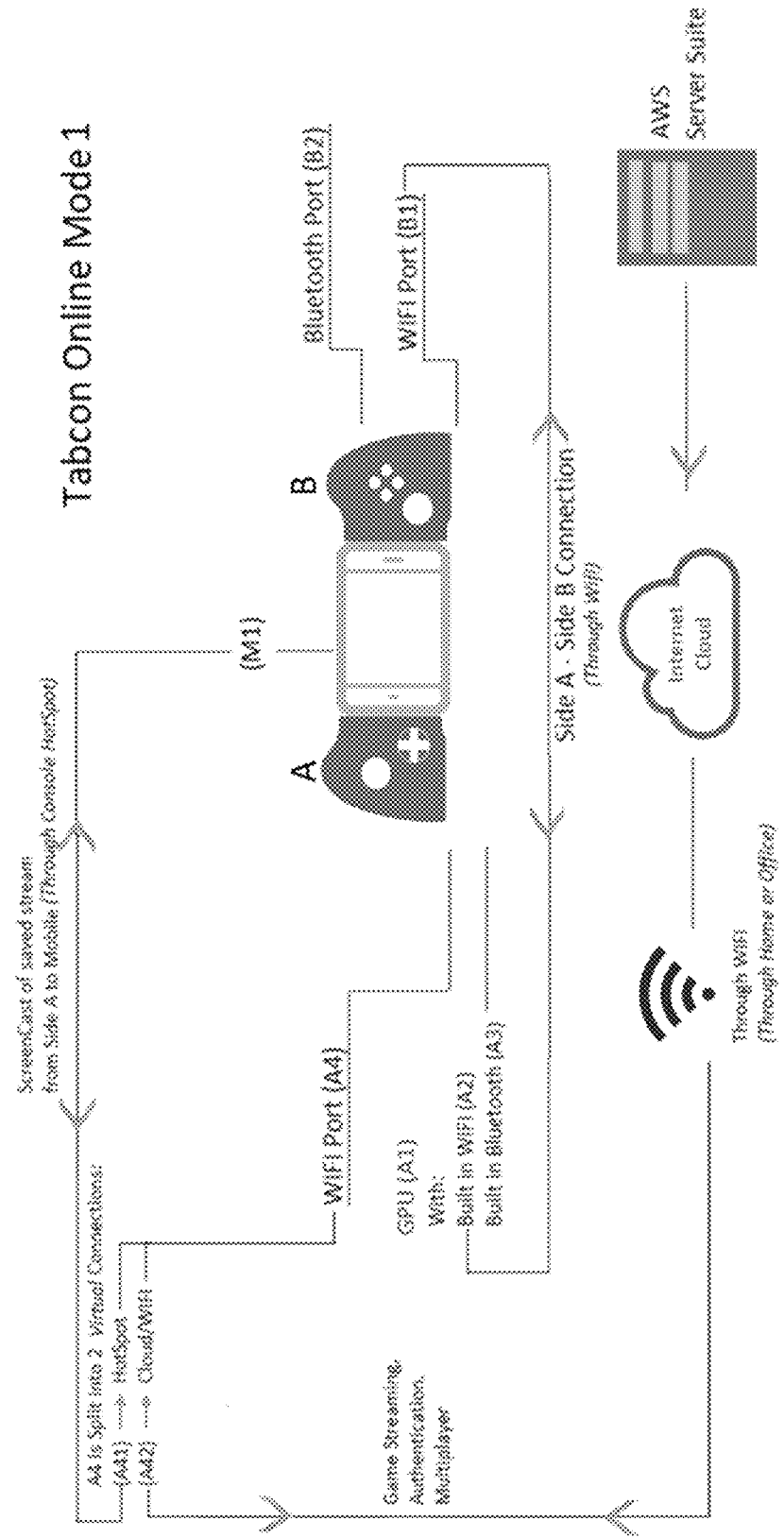
FIGS. 45a and 45b show a diagram of a connectivity network for two modes of online game streaming of an embodiment of the invention.
Figure 45B:
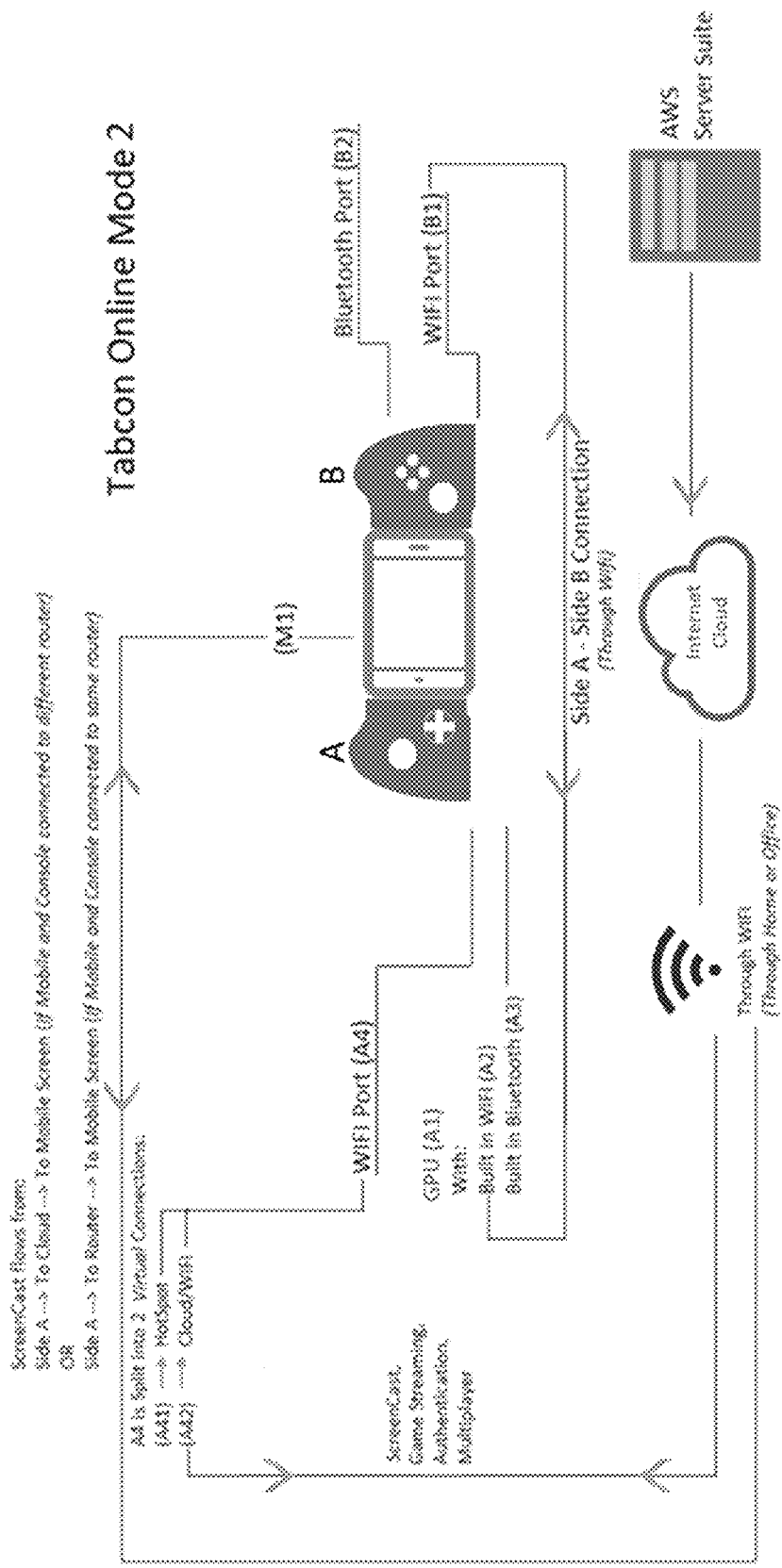

FIG. 44 shows the Streaming Engine.
1. Real-Time Streaming from the Company to Paired Android/iOS/Windows Device
   a. Capturing frame buffer content from the Universal Game Controller/Console
   b. Encoding/Packetizing using custom protocol
   c. Streaming using custom protocol through WiFi
   d. Decoding and rendering the stream using native elements in the app for Android/iOS
2. Real-Time Streaming to the central Streaming Server
   a. Capturing frame buffer content from the Universal Game Controller/Console
   b. Encoding/Packetizing using RTP/RTSP
   c. Streaming to central Streaming Server using RTP/RTSP in WiFi
   d. Streaming Server may be built over any of the available streaming servers or may be independent
   e. Streaming Server may capture/decode these frames to the IP-TV provider for live broadcasting
   f. Streaming Server may also create a CDN/HLS based offline game play streaming FIGS. 45a and b Show Streaming Connectivity. There are two modes for game streaming: online mode 1 and online mode 2. The difference between each mode is based on the internet connectivity a gamer will have when playing a game. In online mode 1 the gamer is using the Company's intranet/hot-spot to create the internet connectivity and stream the games from the cloud. In online mode 2 the gamer is using outside internet connectivity (such as home, or Starbucks) to stream or download the games. The Universal Game Controller/Console connects automatically to either mode 1 or mode 2 depending on the location of the gamer.

Figure 46:
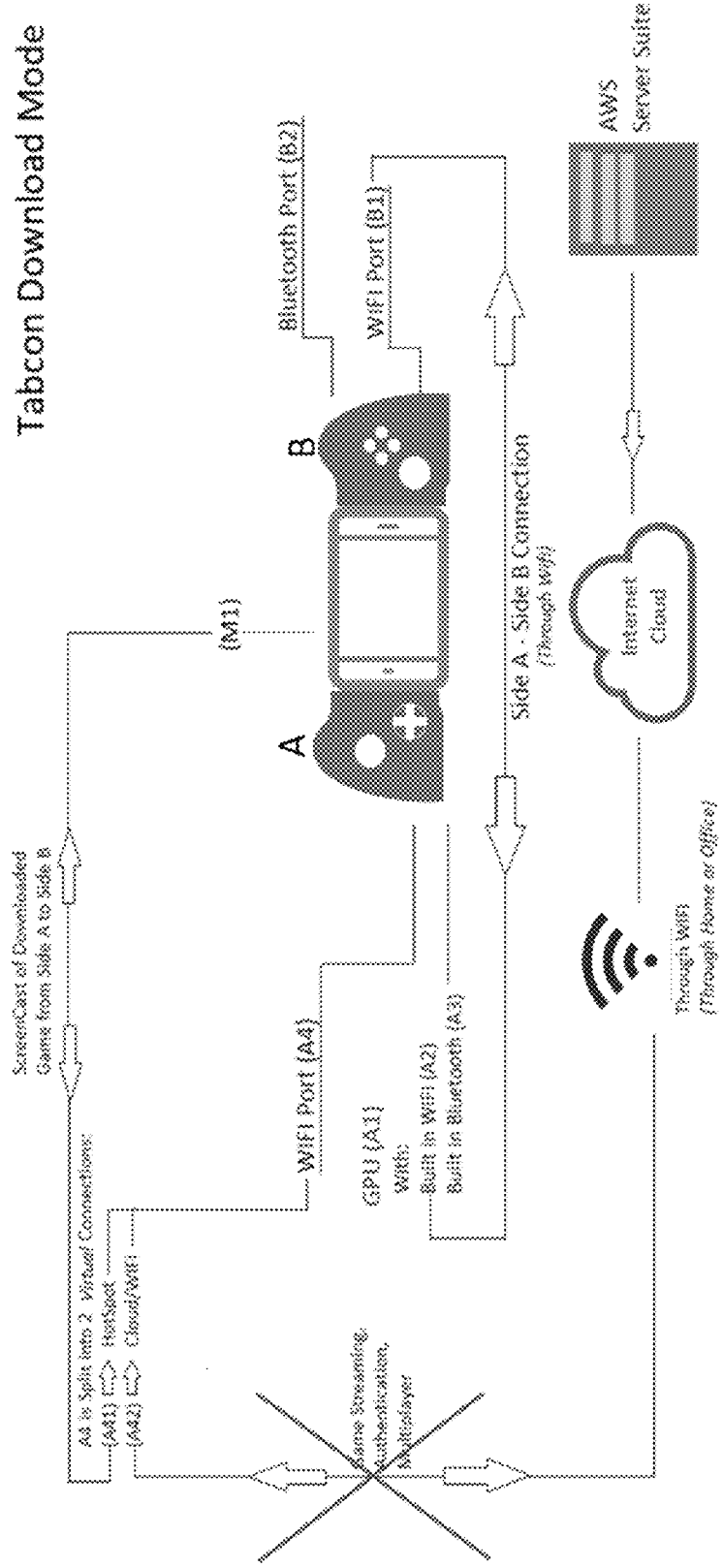
FIG. 46 is a diagram of a connectivity network for download and offline gaming of an embodiment of the invention.

FIG. 46 shows Offline/Download Connectivity. This type of connectivity IS only using the intranet to connect Side A and Side B. With this game play mode users can only play offline when there is no outside router to connect to. This type of game play is for when users are on an airplane mode. Users will have already downloaded games in order to play as there will be no game streaming in this offline mode.

Figure 47:
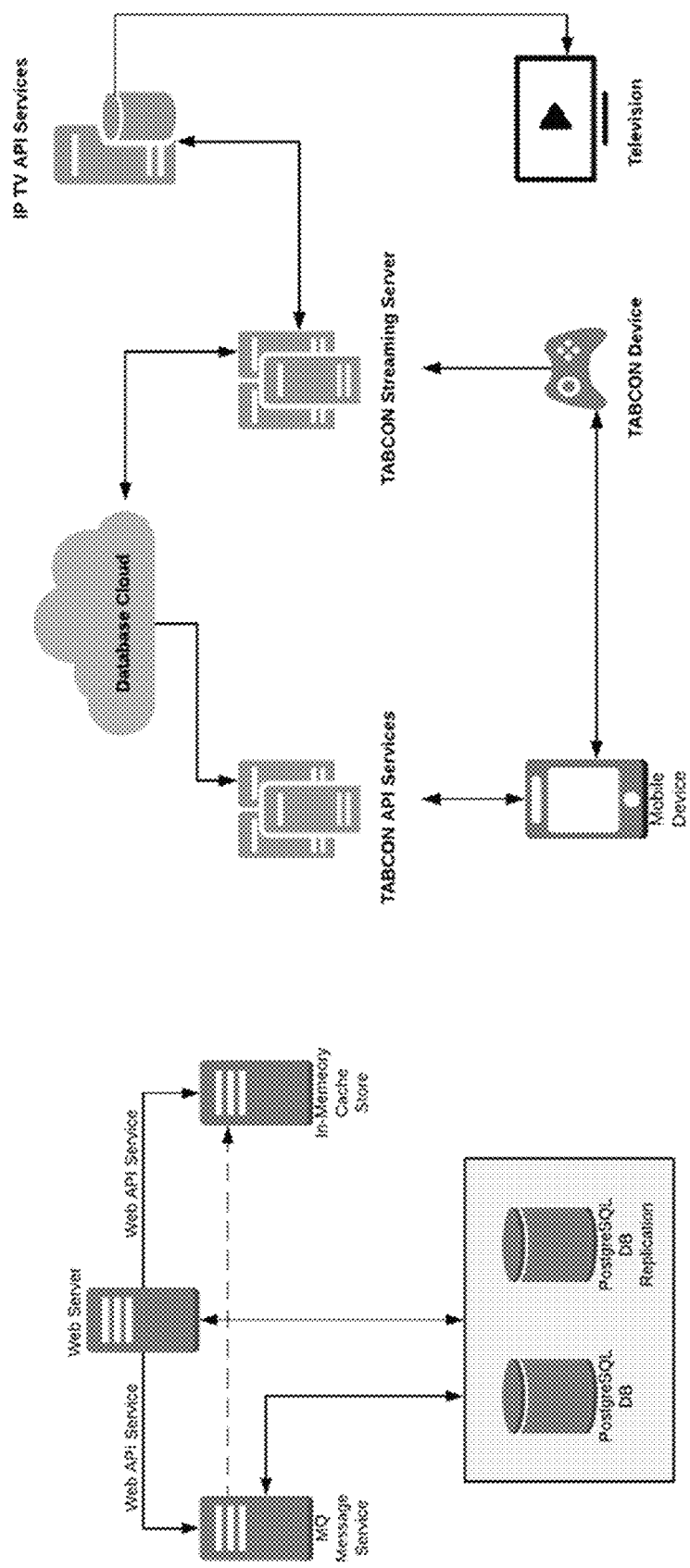
FIG. 47 is a core architecture flow chart of an embodiment of the invention.

FIG. 47 shows the core architecture. RESTful, versioned web API service may be used to manage the business logic. Message Queue (Publisher-Subscriber) layer may be used to improve the backend performance.

PostgreSQL/NoSQL Database may be used as the database. The open source Redis is a cache for storing frequently used information to save (into RAM) from loading (and processing) information from slower sources, such as disks or a database. It can be deployed in a dedicated situation or as a method of using up spare memory in an existing environment.

Figure 48:
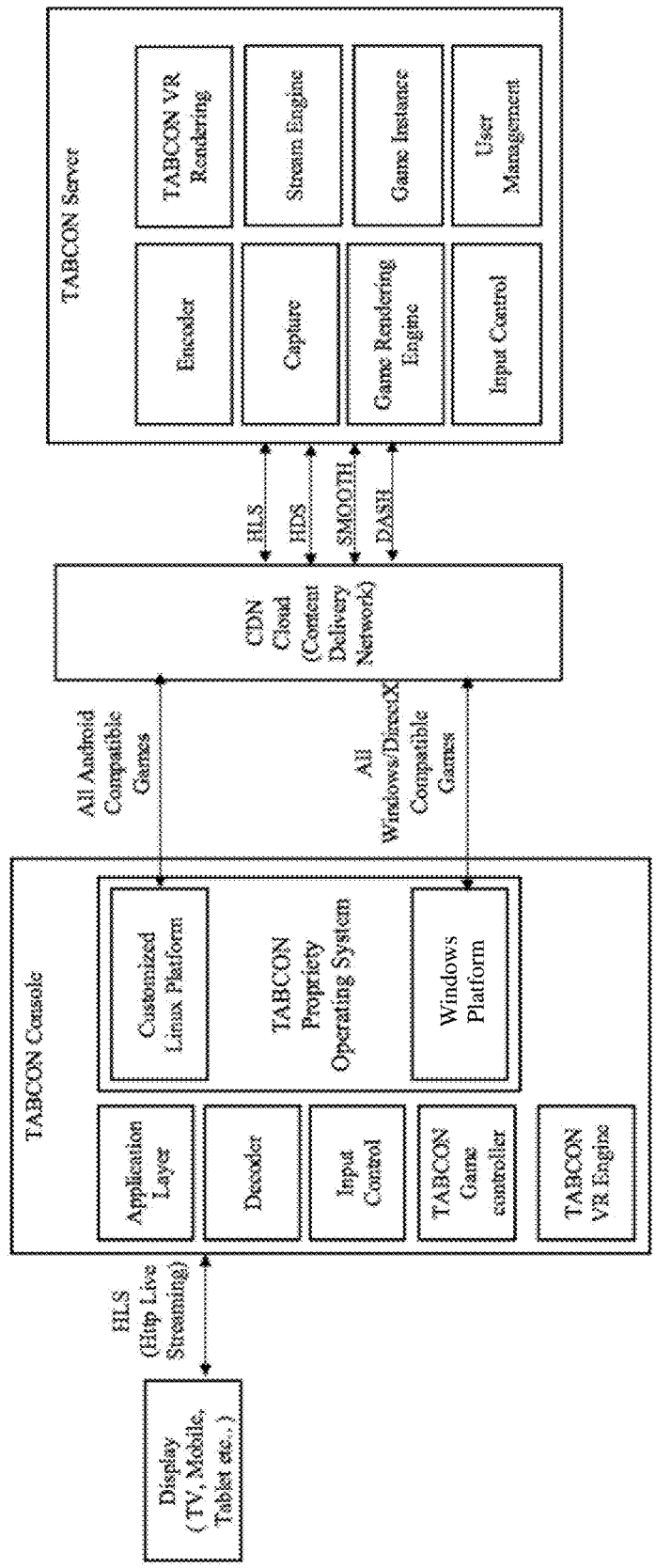
FIG. 48 is a block diagram of the core streaming architecture of an embodiment of the invention.

FIG. 48 shows the core streaming. The Universal Game Controller/Console has imbedded in it the hardware Architecture and operating system which houses the Linux customized platform with the Windows platform. The application layer, Decoder, Input Control, Game Controller, and VR engine are all housed within the Universal Game Controller/Console. The Universal Game Controller/Console then takes all games and communicates with the CDN Cloud (Content Delivery Network) which is connected with the Server and delivers the game to the Display through HTTP Live streaming.

Figure 49:
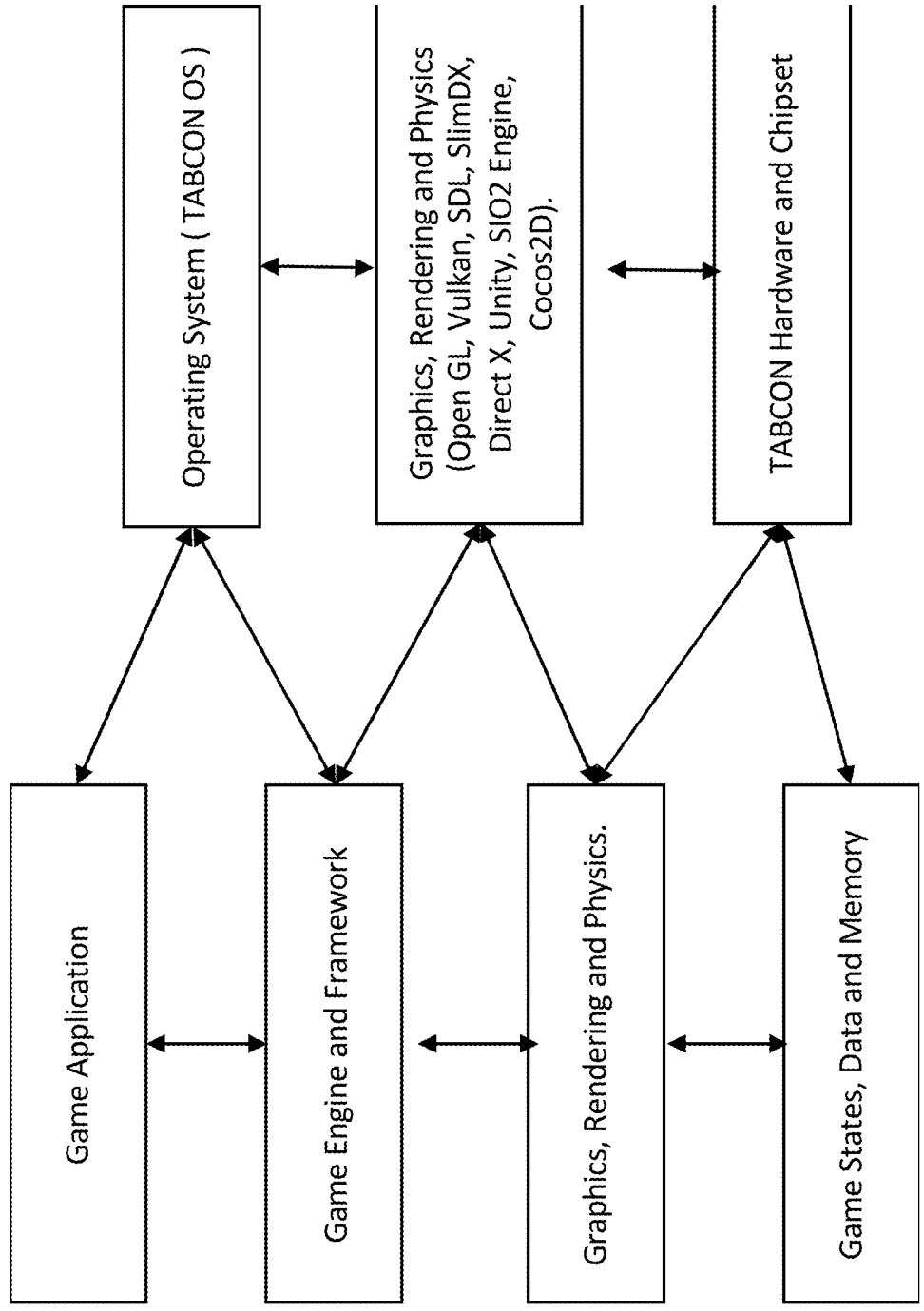
FIG. 49 is a flow chart of game rendering and processing of an embodiment of the invention.

FIG. 49 shows the game rendering and processing. The Universal Game Controller/Console has two main components for Game play and Game control. The first part is the Controller/Console, which has all the controller for Game play and CPU for game play and game processing. The second part is the Server which has the Game Rendering engine and all the User management and control. All game types including Open GL, Vulkan, SDL, SlimDX, DirectX, Unity, SIO2, Unreal, and Cocos2D can be played using the Universal Game Controller/Console. The HLS protocol is used for communication between External Display and the Universal Game Controller/Console, while the intermediate CDN manages the content delivery to each user from the server hosted on the web. The CDN uses a combination of HLS, HDS, SMOOTH and DASH to provide seamless gameplay for all the users The Local hosted game uses the Universal Game Controller/Console for game rendering and processing along with the Device CPU for game render and processing.

Figure 50:
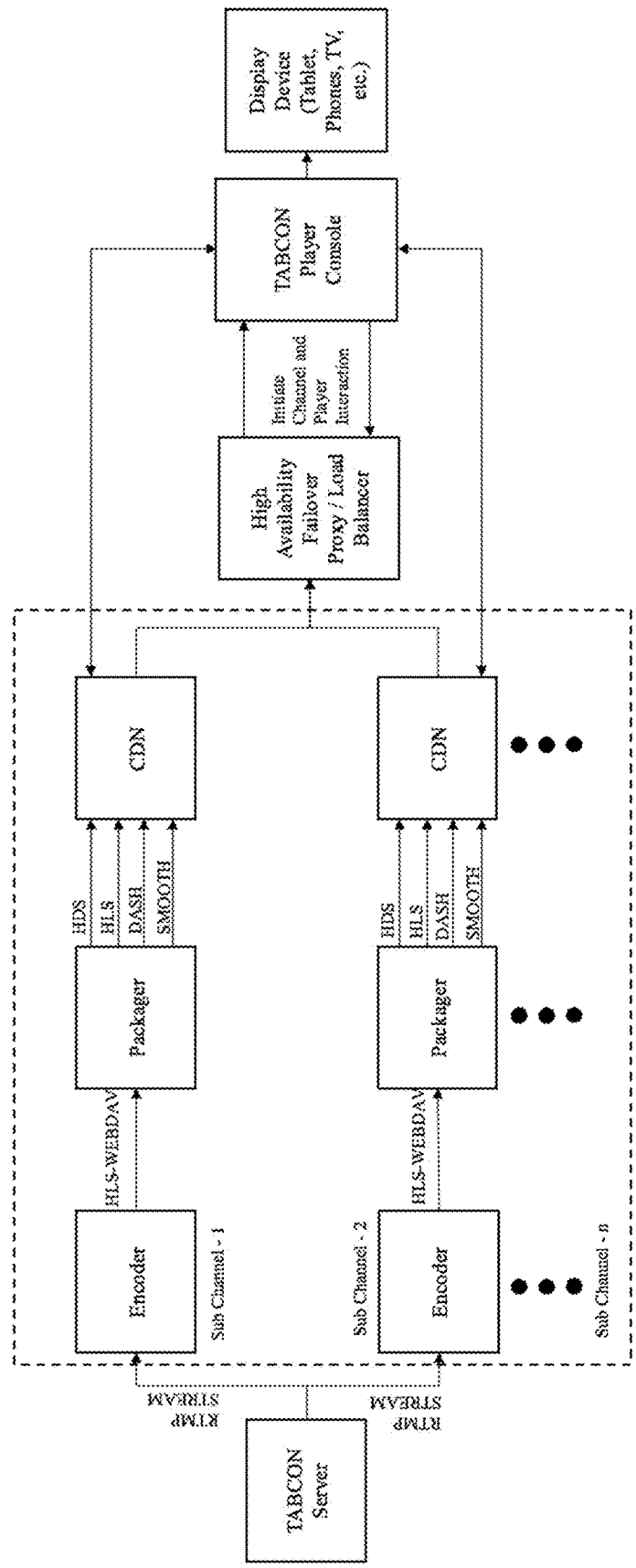
FIG. 50 is a block diagram of an Http live streaming engine of an embodiment of the invention.

FIG. 50 describes that Http Live Streaming (HLS) may be used to broadcast content to the connected smartphone/tablet or Smart TV. HTTP Live Streaming sends audio and video over HTTP from the Universal Game Controller/Console to smartphone/tablet or smart TV. HTTP Live Streaming supports both live broadcasts and pre-recorded content. HTTP Live Streaming supports multiple alternate streams at different bit rates, and the client software can switch streams intelligently as network bandwidth changes. HTTP Live Streaming also provides for media encryption and user authentication over HTTPS.

A combination of HTTP Dynamic Streaming (HDS), MPEG-DASH, HLS and Microsoft Smooth Streaming may be used in the Streaming Server.

While embodiments of the invention have been described in the detailed description, the scope of the claims should not be limited by the preferred embodiments set forth in the examples, but should be given the broadest interpretation consistent with the description as a whole.

What is claimed is:

1. A handheld game console having a first terminal within a first housing and a second terminal within a second housing configured to act together as both a console and controller for gaming, the first terminal and the second terminal each comprising:
   a. a plurality of native hardware systems, each configured to execute computer instructions defined in a corresponding native computing architecture;
   b. a computing module configured to execute binary executable computer-readable instructions, stored in a non-transitory storage, for wirelessly transferring or streaming any game from a remote server to the first second terminal and/or second terminal and wirelessly transferring or streaming the binary executable game files to the corresponding native hardware and streaming the game from the first and/or second terminals to any external display device;
   c. input modules configured to receive a user's one or more gaming commands;
   d. a communication module configured to wirelessly communicate with the remote server and to wirelessly communicate between the first and second terminals and the external display device;
   e. an automatic firmware scheduler to control the plurality of native hardware systems which communicably connects to the native computing architecture systems and is specified by time-based multiplexing in a processor configured to execute computer-readable firmware instructions stored in a non-transitory storage, the computer-readable firmware instructions being configured to:
  i. identify a native hardware system and a binary executable game file corresponding to the game selected by a user through the use of a user interface that communicates with the first and second terminals and the automatic firmware scheduler;
  ii. initialize the native computing architecture systems corresponding to the identified native hardware system; and
  iii. load a customized operating system, and a game engine if required, to execute the binary executable game file on the native hardware system.

2. The game console of claim 1, wherein:
a. the computing module further comprises a first computing submodule of the first terminal and a second computing submodule of the second terminal, the first and second computing submodules being configured to:
  i. wirelessly transfer or stream the game from the remote server, and
  ii. coordinate only wirelessly with the second computing submodule for executing the computer-readable instructions and locally rendering the game within the first and second terminal, which is then wirelessly streamed to the external display device;
b. the input module further comprises a first input submodule of the first terminal and a second input submodule of the second terminal, the first and second input submodules being configured to wirelessly supplement each other in receiving the one or more gaming commands inputs;
c. the wireless communication module further comprises a first communication submodule of the first terminal and a second communication submodule of the second terminal, the first and second communication submodule being further configured to communicate only wirelessly with each other, and with other external communication modules; and
d. the first housing and the second housing are configured to be held by a different one of the user's hands.

3. A handheld game console having a first terminal and a second terminal configured to act as both a wireless console and controller for gaming games, comprising:
a. a computing module comprising a first computing submodule of the first terminal and a second computing submodule of the second terminal, the first and the second computing submodules being configured to:
  i. wirelessly transfer or stream a game from a remote server, and
  ii. coordinate only wirelessly with the second computing submodule for executing computer-readable instructions and locally rendering the game within the first and second terminals and wirelessly streaming the game to any external display device;
b. an input module comprising a first input submodule of the first terminal and a second input submodule of the second terminal, the first and second input submodules being configured to wirelessly supplement each other in receiving one or more gaming inputs;
c. a wireless communication module configured to wirelessly communicate with the remote server and the external display device, comprising a first communication submodule of the first terminal and a second communication submodule of the second terminal, the first and second communication submodule being further configured to communicate wirelessly with each other through communication protocols;
d. a housing comprising a first sub-housing for the first terminal and a second sub-housing for the second terminal, the first and the second sub-housings being configured to house the first and second computing submodules, the first and second input submodules and the first and second communication submodules respectively;
f. a plurality of native hardware systems, each configured to execute computer instructions defined in corresponding native computing architecture systems; and
g. an automatic firmware scheduler communicably connected to the native hardware systems and including a plurality of native processors configured to execute computer-readable firmware instructions stored in a non-transitory storage, the computer-readable firmware instructions being configured to:
  i. first, identify the native computing architecture system for a binary executable game file from the game selected by the user through a user interface;
  ii. second, initialize the native computing architecture system corresponding to the identified native hardware system; and
  iii. third, load a customized operating system and then the binary executable game file to be executed on the identified native hardware system, and execute the game.

4. The game console of claim 3, wherein the first terminal and second terminal each further comprise a clamping mechanism configured to couple to the external display device, and said clamping mechanism is also configured to clamp to an external battery when not clamped to the external display device.

5. The game console of claim 4, wherein the first terminal and second terminal each further comprise a locking mechanism configured to prevent the clamping mechanism from inadvertently opening.

6. The game console of claim 4, wherein the first and second terminals couple through the clamping mechanisms to opposite edges of the external display device or the external battery.

7. The game console of claim 6, wherein the external display device is selected from: a tablet computer, mobile phone, or a smart TV.

8. The game console of claim 3, wherein the first terminal and second terminal each further comprise a rechargeable battery.

9. The game console of claim 3 further comprises an external charging battery configured to charge at least one of the first terminal and the second terminal when at least one of the first terminal and the second terminal is coupled to the external charging battery.

10. The game console of claim 9, wherein the external charging battery further comprises magnetic power connectors on each of two sides to connect the first terminal on one side of the battery and connect the second terminal on the other side of the battery.

11. The game console of claim 3 further comprises at least one module selected from a group consisting of: a speaker, an audio jack, a microphone and combinations thereof.

12. A handheld game console for supporting video games of various platforms played through a user's commands and inputs comprising:
a. plurality of native hardware systems, each configured to execute binary executable game files and computer instructions defined in a corresponding native computing architecture system; and b. an automatic firmware scheduler coupled with the plurality of native hardware systems which controls the native hardware systems and includes a plurality of processors configured to execute computer-readable firmware instructions stored in a non-transitory storage, the computer-readable firmware instructions being configured to:
 i. identify a native hardware system and a binary executable game file corresponding to a game to be rendered per a user command,
 ii. initialize the computing architecture system corresponding to the identified native hardware system, and
 iii. load an operating system with the binary executable game file to be executed on the identified native hardware system;

c. a first terminal and a second terminal wherein each of the first terminal and the second terminal comprises:
 i. a computing submodule configured to execute one or more native hardware computer-readable instructions and binary executable game files;
 ii. an input submodule configured to receive a user's one or more gaming commands inputs,
 iii. a communication submodule configured to wirelessly communicate with a remote server and any external display device, and
 iv. a sub-housing configured to house the computing submodule, input submodule and the communication submodule and be held by a user's hand;

d. the computing submodule of the first terminal is configured to coordinate wirelessly with the computing submodule of the second terminal for executing the one or more computer-readable instructions and binary executable game files;

e. the input submodules of the first and second terminals are configured to wirelessly supplement each other in receiving the one or more gaming commands;

f. the wireless communication submodules of the first and the second terminals are further configured to communicate wirelessly with each other; and g. and wherein the first terminal is further configured to:
 i. wirelessly transfer or stream gaming data of the game from the remote server;
 ii. process the one or more gaming commands received by the input submodules of the first and second terminals; and
 iii. render a game stream within the native hardware of the first and second terminal with the gaming data and the one or more gaming commands to be wirelessly streamed to the external display device.

13. The game console of claim 12, wherein the first terminal and second terminal each further comprise a clamping mechanism configured to couple to the external display device or to an external battery.

14. The game console of claim 13, wherein the first terminal and second terminal each further comprise a locking mechanism configured to prevent the clamping mechanism from inadvertently opening.

15. The game console of claim 13, wherein the first terminal and second terminal each further comprises a rechargeable battery and the battery of the first terminal is further configured to charge at the same time as the battery of the second terminal.

16. The game console of claim 13, wherein at least one of the first and second terminals further comprises at least one module selected from a group consisting of: a speaker, an audio jack, a microphone, and combinations thereof.

17. A handheld game console for natively executing binary executable game files comprising:
 a. a first terminal and a second terminal, each comprising:
  i. a plurality of native hardware systems, and hosting corresponding native computing architecture systems configured to execute native binary executable game files defined in a corresponding one of the native hardware systems, and
  ii. an automatic hardware scheduler coupled with a native firmware scheduler communicably connected to the native computing architecture systems and comprising a processor configured to execute computer-readable firmware instructions stored in a non-transitory storage, the computer-readable firmware instructions being configured to:
   (1) identify a native hardware system and a binary executable game file corresponding to a game to be rendered per a user command;
   (2) initialize the native computing architecture system corresponding to the identified native hardware system; and
   (3) load an operating system with the binary executable game file to be executed on the identified native hardware system; and
 the first terminal is further configured to:
  iii. wirelessly cloud stream a game to an external display device,
  iv. process one or more gaming commands inputs, received by an input module layout configured to receive one or more gaming commands inputs, and
  v. render a game stream with the gaming data and the one or more gaming commands inputs to be streamed to the external display device.

18. The game console of claim 17, wherein the first terminal and second terminal each further comprise a clamping mechanism configured to couple to the external display device.

19. The game console of claim 18, wherein the first terminal and second terminal each further comprise a locking mechanism configured to prevent the clamping mechanism from inadvertently opening.

20. The game console of claim 18, wherein the first terminal and second terminal each further comprise a rechargeable battery.

21. A method for supporting video games of various platforms comprising the steps of:
 a. providing a native computing architecture system comprising an operating system and a hardware architecture to run a binary executable game file natively;
 b. when a user command selecting a game to be executed is received, an automatic firmware scheduler identifies a native computing architecture and a binary executable game file corresponding to the game for execution;
 c. initializing an identified native computing architecture system corresponding to the native hardware, among the native hardware available;
 d. loading a native operating system with the binary executable game file to be executed on the identified native hardware system;
 e. progressively downloading the game from a streaming server into the identified native computing architecture system;
 f. reconstructing game data of the game;
 g. live streaming the reconstructed game data to any external display device;

h. providing a first terminal and a second terminal, wherein each of the first terminal and the second terminal are configured to:
  i. execute one or more computer-readable instructions of the game,
  ii. receive a user's one or more inputs,
  iii. communicate wirelessly with each other, and
  iv. be held by a user's hand;
i. combining the one or more user inputs received by the first and second terminals into one or more gaming commands; and
j. rendering the one or more gaming commands into the reconstructed game data to be wirelessly live streamed to the external display device.

22. The method of claim 21, wherein the first terminal and second terminal each further comprise a clamping mechanism configured to couple to the external display device.

23. The method of claim 22, wherein the first terminal and second terminal each further comprise a locking mechanism within the clamping mechanism configured to prevent the clamping mechanism from inadvertently opening.

24. A handheld game console having a first terminal and a second terminal configured to act as both a console and controller for gaming, comprising:
  a. a computing module comprising a first computing submodule of the first terminal and a second computing submodule of the second terminal, the first and second computing submodule being configured to:
    i. wirelessly receive a stream of a binary executable game files from a remote server; and
    ii. wirelessly download a binary executable game file stored on a remote server for a subsequent local execution on a corresponding native hardware housed in the first or second terminal respectively and;
    wherein said stream and download may occur consecutively or concurrently and on the same or different native hardware, and wherein the first and second computing submodules coordinate wirelessly via communication protocols for executing computer-readable instructions on the corresponding native hardware required by the binary executable game files and stream the game to any external display device;
  b. an input module comprising a first input submodule of the first terminal and a second input submodule of the second terminal, the first and second input submodules being configured wirelessly to supplement each other in receiving one or more gaming input commands;
  c. a communication module, configured to wirelessly communicate with the remote server and the external display device comprising a first communication submodule of the first terminal and a second communication submodule of the second terminal, the first and second communication submodules being further configured to communicate wirelessly with each other via communication protocols;
  d. a housing comprising a first sub-housing of the first terminal and a second sub-housing for the second terminal, the first and the second sub-housings being configured to house the wireless computing submodules, the input submodules and the communication submodules;
  e. a plurality of native computing architecture systems, each configured to execute computer instructions and binary executable game files defined in one of a corresponding plurality of native hardware systems; and
  f. an automatic firmware scheduler coupled with the plurality of native hardware systems that communicably connect to the native computing architecture systems and including a processor configured to execute computer-readable firmware instructions stored in a non-transitory storage, the computer-readable firmware instructions being configured to:
    i. identify a binary executable game file and its corresponding native hardware system to be executed for the game selected;
    ii. initialize one of the native computing architecture systems corresponding to the identified native computing architecture; and
    iii. load a customized operating system and automatic firmware scheduler capable of identifying a plurality of binary executable game files to be executed on the one of the native hardware systems.

25. The game console of claim 24, wherein the first terminal and second terminal each further comprise an internal rechargeable battery.

26. The game console of claim 24 further comprises an external charging battery configured to charge at least one of the first terminal and the second terminal when at least one of the first terminal and the second terminal is coupled to the external charging battery through multiple pinpoint style connectors.

27. The game console of claim 26, wherein the external charging battery further comprises a port configured to charge any external device during gaming or not gaming.

28. The game console of claim 24 further comprises at least one module selected from a group consisting of: a speaker, an audio jack, a microphone and combinations thereof.

29. The game console of claim 24, wherein the first terminal and second terminal each further comprise a clamping mechanism configured to couple to the external display device on opposing edges of the external display device.

30. The game console of claim 29, wherein the first terminal and second terminal each further comprise a locking mechanism configured to prevent the clamping mechanism from inadvertently opening.

31. The game console of claim 24, wherein when the external display device is portable, the first terminal and second terminal are each configured to couple to an opposite edge of the external display device, either in landscape or portrait orientation.

32. The game console of claim 30, wherein the external display device supports wireless communications through Wi-fi and internal computing capabilities to manage the stream of the binary executable game files between the handheld game console and the external display device.

\* \* \* \* \*